United States Patent
Lau et al.

(10) Patent No.: US 12,380,754 B2
(45) Date of Patent: Aug. 5, 2025

(54) METHODS AND APPARATUS FOR PROVIDING ENHANCED AUTOMATED ACCESS TO A DISPATCHED PERSONAL DELIVERY DEVICE OPERATIVE TO TRANSPORT A SHIPMENT ITEM

(71) Applicant: FedEx Corporate Services, Inc., Collierville, TN (US)

(72) Inventors: Christine Joanpui Lau, Frisco, TX (US); Ryan William Hamilton, Frisco, TX (US)

(73) Assignee: Federal Express Corporation, Memphis, IN (US)

( * ) Notice: Subject to any disclaimer, the term of this patent is extended or adjusted under 35 U.S.C. 154(b) by 223 days.

(21) Appl. No.: 17/185,252

(22) Filed: Feb. 25, 2021

(65) Prior Publication Data

US 2022/0269268 A1 Aug. 25, 2022

(51) Int. Cl.
*G07C 9/25* (2020.01)
*B60K 35/00* (2006.01)
(Continued)

(52) U.S. Cl.
CPC .............. *G07C 9/253* (2020.01); *B60K 35/00* (2013.01); *G06Q 10/083* (2013.01); *G06V 20/56* (2022.01);
(Continued)

(58) Field of Classification Search
CPC . G07C 9/27; G07C 9/28; G07C 9/253; G06Q 10/083; G06Q 50/28; G06V 20/56; G06V 40/103
See application file for complete search history.

(56) References Cited

U.S. PATENT DOCUMENTS 5,111,401 A 5/1992 Everett, Jr. et al.
5,522,471 A 6/1996 Hilgendorf
(Continued)

FOREIGN PATENT DOCUMENTS

EP 2651787 B1 5/2016
JP S61-158565 U 10/1986
(Continued)

OTHER PUBLICATIONS

Japanese Patent Application No. JP2021-180157 Notice of Reason for Rejection dated Nov. 29, 2022.
(Continued)

*Primary Examiner* — Nabil H Syed
(74) *Attorney, Agent, or Firm* — Withers & Keys, LLC

(57) ABSTRACT

Systems, apparatus, and methods are described for providing enhanced automated access to a dispatched personal delivery device that can transport a shipment item within the device according to a dispatched logistics transaction. External sensors (e.g., cameras, proximity sensors, microphones) on the delivery device detect a person outside the dispatched personal delivery device. A controller on the delivery device authenticates that the detected person is an authorized participant to the dispatched logistics transaction based upon sensor data generated by the external sensors. An actuator on the dispatched personal delivery device provides access to within the dispatched personal delivery device to permit the dispatched logistics transaction by the detected person when the detected person has been authenticated to be the authorized participant to the dispatched logistics transaction. The delivery device may then auto-confirm the transaction using internal sensors, and interact with a server, which may instruct the delivery device with corrective actions.

108 Claims, 19 Drawing Sheets

(51) Int. Cl.
  *G06Q 10/083* (2023.01)
  *G06V 20/56* (2022.01)
  *G06V 40/10* (2022.01)
  *G07C 9/27* (2020.01)
  *G07C 9/28* (2020.01)
  *B60K 35/22* (2024.01)

(52) U.S. Cl.
  CPC .......... *G06V 40/103* (2022.01); *G07C 9/27* (2020.01); *G07C 9/28* (2020.01); *B60K 35/22* (2024.01)

(56) References Cited

U.S. PATENT DOCUMENTS

| | | | |
|---|---|---|---|
| 6,484,083 B1 | 11/2002 | Hayward et al. | |
| 7,613,544 B2 | 11/2009 | Park et al. | |
| 8,370,990 B2 | 2/2013 | Yu et al. | |
| 8,516,152 B2 | 8/2013 | Nandagopal et al. | |
| 8,626,383 B2 | 1/2014 | Prudhomme-Lacroix et al. | |
| 8,757,309 B2 | 6/2014 | Schmitt et al. | |
| 8,797,976 B2 | 8/2014 | Hyoudou | |
| 8,882,368 B2 | 11/2014 | Hayashi | |
| 8,989,053 B1 | 3/2015 | Skaaksrud et al. | |
| 9,120,622 B1 | 9/2015 | Elazary et al. | |
| 9,244,147 B1 | 1/2016 | Soundararajan et al. | |
| 9,256,852 B1 | 2/2016 | Myllymaki | |
| 9,352,745 B1 | 5/2016 | Theobald | |
| 9,403,566 B2 | 8/2016 | Jacobsen et al. | |
| 9,471,059 B1 | 10/2016 | Wilkins | |
| 9,527,605 B1 | 12/2016 | Gentry et al. | |
| 9,598,237 B2 | 3/2017 | Cyrulik et al. | |
| 9,741,010 B1 | 8/2017 | Heinla | |
| 9,770,825 B2 | 9/2017 | Goldenberg et al. | |
| 9,781,683 B2 | 10/2017 | Nadakuduti et al. | |
| 9,781,686 B2 | 10/2017 | Velu | |
| 9,796,529 B1 | 10/2017 | Hoareau et al. | |
| 9,866,984 B2 | 1/2018 | Kim et al. | |
| 9,930,027 B2 | 3/2018 | Canavor et al. | |
| 9,992,623 B2 | 6/2018 | Skaaksrud | |
| 10,022,867 B2 | 7/2018 | Saboo et al. | |
| 10,115,141 B1 | 10/2018 | Warman et al. | |
| 10,127,514 B2 | 11/2018 | Napoli | |
| 10,207,403 B1 | 2/2019 | Wiley | |
| 10,265,871 B2 | 4/2019 | Hance et al. | |
| 10,286,558 B1 | 5/2019 | Asada et al. | |
| 10,338,591 B2 | 7/2019 | Baalke et al. | |
| 10,421,326 B2 | 9/2019 | Wiley et al. | |
| 10,438,162 B2 | 10/2019 | Sharma et al. | |
| 10,514,690 B1 | 12/2019 | Siegel et al. | |
| 10,537,195 B1* | 1/2020 | Giles | A47G 29/20 |
| 10,538,190 B1* | 1/2020 | Metellus | B60F 5/02 |
| 10,545,509 B1 | 1/2020 | Jessen et al. | |
| 10,549,915 B1 | 2/2020 | Theobal | |
| 10,556,334 B1 | 2/2020 | Theobal | |
| 10,678,242 B2 | 6/2020 | Wiley | |
| 10,730,626 B2 | 8/2020 | Gil et al. | |
| 10,807,715 B2 | 10/2020 | Shannon | |
| 10,850,709 B1* | 12/2020 | Nagata | G07C 9/00563 |
| 10,857,679 B1 | 12/2020 | Cousins et al. | |
| 10,874,240 B2 | 12/2020 | Lewis et al. | |
| 10,875,174 B2 | 12/2020 | Skaaksrud et al. | |
| 11,008,169 B2 | 5/2021 | Dudek et al. | |
| 11,010,706 B1 | 5/2021 | Wier et al. | |
| 11,027,419 B2 | 6/2021 | Skaaksrud et al. | |
| 11,027,420 B2 | 6/2021 | Skaaksrud et al. | |
| 11,027,551 B2 | 6/2021 | Ono et al. | |
| 11,077,551 B2 | 8/2021 | Skaaksrud et al. | |
| 11,090,802 B2 | 8/2021 | Skaaksrud et al. | |
| 11,115,629 B1* | 9/2021 | Lemberger | G10L 13/00 |
| 11,117,255 B2 | 9/2021 | Skaaksrud et al. | |
| 11,135,717 B2 | 10/2021 | Skaaksrud et al. | |
| 11,222,299 B1 | 1/2022 | Baalke et al. | |
| 11,224,969 B2 | 1/2022 | Skaaksrud et al. | |
| 11,231,706 B1 | 1/2022 | Curlander et al. | |
| 11,235,457 B2 | 2/2022 | Skaaksrud et al. | |
| 11,278,172 B2 | 3/2022 | Yang et al. | |
| 11,331,790 B2 | 5/2022 | Skaaksrud et al. | |
| 11,478,924 B2 | 10/2022 | Skaaksrud et al. | |
| 11,491,641 B2 | 11/2022 | Skaaksrud et al. | |
| 11,491,642 B2 | 11/2022 | Skaaksrud et al. | |
| 11,491,643 B2 | 11/2022 | Skaaksrud et al. | |
| 11,679,494 B2 | 6/2023 | Skaaksrud et al. | |
| 11,682,253 B2 | 6/2023 | Skaaksrud et al. | |
| 11,699,316 B2 | 7/2023 | Skaaksrud et al. | |
| 11,704,954 B2 | 7/2023 | Skaaksrud et al. | |
| 11,783,657 B2 | 10/2023 | Skaaksrud et al. | |
| 11,842,590 B2 | 12/2023 | Skaaksrud et al. | |
| 11,900,747 B2 | 2/2024 | Skaaksrud et al. | |
| 11,983,660 B2 | 5/2024 | Heinla | |
| 2001/0032147 A1 | 10/2001 | Siegel | |
| 2001/0052680 A1 | 12/2001 | Bennington | |
| 2002/0032612 A1 | 3/2002 | Williams et al. | |
| 2003/0093187 A1 | 5/2003 | Walker | |
| 2005/0098556 A1 | 5/2005 | Kellerer | |
| 2006/0079997 A1 | 4/2006 | McLurkin et al. | |
| 2007/0219666 A1 | 9/2007 | Filippov et al. | |
| 2007/0299791 A1 | 12/2007 | Mack | |
| 2008/0134589 A1 | 6/2008 | Abrams et al. | |
| 2008/0294287 A1 | 11/2008 | Kawano et al. | |
| 2009/0044655 A1 | 2/2009 | DeLouis et al. | |
| 2010/0235206 A1 | 9/2010 | Miller et al. | |
| 2010/0263948 A1 | 10/2010 | Couture et al. | |
| 2011/0228686 A1 | 9/2011 | Hyoudou | |
| 2011/0238205 A1 | 9/2011 | Kemp et al. | |
| 2012/0124235 A1 | 5/2012 | Nandagopal et al. | |
| 2012/0235791 A1 | 9/2012 | Donlan et al. | |
| 2013/0011234 A1 | 1/2013 | Pretlove et al. | |
| 2013/0033381 A1* | 2/2013 | Breed | G08B 13/2417 340/568.1 |
| 2013/0298652 A1 | 11/2013 | Gillette, II | |
| 2014/0032034 A1 | 1/2014 | Raptopoulos et al. | |
| 2014/0042199 A1 | 2/2014 | Gregory, Jr. | |
| 2014/0054361 A1 | 2/2014 | Derby et al. | |
| 2014/0136414 A1 | 5/2014 | Abhyanker | |
| 2014/0254896 A1 | 9/2014 | Zhou et al. | |
| 2015/0006005 A1 | 1/2015 | Yu et al. | |
| 2015/0083509 A1 | 3/2015 | Borroni-Bird et al. | |
| 2015/0153175 A1 | 6/2015 | Skaaksrud | |
| 2015/0154431 A1 | 6/2015 | Skaaksrud et al. | |
| 2015/0154536 A1 | 6/2015 | Skaaksrud et al. | |
| 2015/0154545 A1 | 6/2015 | Skaaksrud et al. | |
| 2015/0154546 A1 | 6/2015 | Skaaksrud et al. | |
| 2015/0156100 A1 | 6/2015 | Skaaksrud | |
| 2015/0156253 A1 | 6/2015 | Skaaksrud et al. | |
| 2015/0156605 A1 | 6/2015 | Skaaksrud et al. | |
| 2015/0156718 A1 | 6/2015 | Skaaksrud | |
| 2015/0156747 A1 | 6/2015 | Skaaksrud et al. | |
| 2015/0186840 A1 | 7/2015 | Torres et al. | |
| 2015/0347959 A1 | 12/2015 | Skaaksrud | |
| 2016/0012446 A1* | 1/2016 | Parnell | G06Q 20/341 705/18 |
| 2016/0037478 A1 | 2/2016 | Skaaksrud et al. | |
| 2016/0140315 A1 | 5/2016 | Diaz et al. | |
| 2016/0167724 A1 | 6/2016 | Kilibarda | |
| 2016/0174162 A1 | 6/2016 | Nadakuduti et al. | |
| 2016/0180289 A1* | 6/2016 | Siris | G06Q 10/0833 702/150 |
| 2016/0185466 A1 | 6/2016 | Dreano, Jr. | |
| 2016/0194195 A1 | 7/2016 | Kabre et al. | |
| 2016/0207418 A1 | 7/2016 | Bergstrom et al. | |
| 2016/0235236 A1 | 8/2016 | Byers et al. | |
| 2016/0236869 A1 | 8/2016 | Kimura et al. | |
| 2016/0320773 A1 | 11/2016 | Skaaksrud | |
| 2016/0353239 A1 | 12/2016 | Kjellsson et al. | |
| 2017/0012830 A1 | 1/2017 | Skaaksrud et al. | |
| 2017/0026916 A1 | 1/2017 | Velu | |
| 2017/0068250 A1 | 3/2017 | Wiechers | |
| 2017/0090484 A1 | 3/2017 | Obaidi | |
| 2017/0091710 A1 | 3/2017 | Van Dyke | |
| 2017/0124789 A1 | 5/2017 | Rephlo | |
| 2017/0161673 A1* | 6/2017 | High | G06Q 10/083 |
| 2017/0225336 A1 | 8/2017 | Deyle et al. | |
| 2017/0259811 A1 | 9/2017 | Couture et al. | |
| 2018/0012433 A1 | 1/2018 | Ricci | |

(56) References Cited

U.S. PATENT DOCUMENTS

| | | |
|---|---|---|
| 2018/0013211 A1 | 1/2018 | Ricci |
| 2018/0014988 A1 | 1/2018 | Diaz-Flores et al. |
| 2018/0022405 A1 | 1/2018 | Gecchelin et al. |
| 2018/0024554 A1 | 1/2018 | Brady et al. |
| 2018/0056985 A1 | 3/2018 | Couture et al. |
| 2018/0070753 A1 | 3/2018 | Eveloff et al. |
| 2018/0111683 A1 | 4/2018 | Di Benedetto et al. |
| 2018/0127211 A1 | 5/2018 | Jarvis et al. |
| 2018/0127212 A1 | 5/2018 | Jarvis et al. |
| 2018/0130017 A1 | 5/2018 | Gupte |
| 2018/0139152 A1 | 5/2018 | Shaw et al. |
| 2018/0169685 A1 | 6/2018 | Taylor et al. |
| 2018/0229843 A1 | 8/2018 | Costanzo et al. |
| 2018/0326886 A1 | 11/2018 | Sibley |
| 2018/0330319 A1 | 11/2018 | Liang et al. |
| 2018/0365635 A1 | 12/2018 | Lucrecia et al. |
| 2019/0028904 A1 | 1/2019 | Carpenter et al. |
| 2019/0032390 A1* | 1/2019 | Myers ............... E05B 81/08 |
| 2019/0033883 A1 | 1/2019 | Ferguson et al. |
| 2019/0034967 A1 | 1/2019 | Ferguson et al. |
| 2019/0043370 A1 | 2/2019 | Mulhall et al. |
| 2019/0047460 A1 | 2/2019 | Goldberg et al. |
| 2019/0057342 A1 | 2/2019 | Ferguson et al. |
| 2019/0072979 A1 | 3/2019 | Sukhomlinov et al. |
| 2019/0113935 A1 | 4/2019 | Kuo et al. |
| 2019/0121368 A1 | 4/2019 | Bussetti et al. |
| 2019/0130770 A1 | 5/2019 | Di Benedetto et al. |
| 2019/0161190 A1 | 5/2019 | Gil et al. |
| 2019/0200510 A1 | 7/2019 | Chrysanthakopoulos et al. |
| 2019/0200519 A1 | 7/2019 | Chrysanthakopoulos et al. |
| 2019/0220032 A1 | 7/2019 | Skorinko |
| 2019/0232504 A1 | 8/2019 | Radetzki et al. |
| 2019/0241079 A1 | 8/2019 | Huo |
| 2019/0250643 A1 | 8/2019 | Takizawa |
| 2019/0283239 A1 | 9/2019 | Skaaksrud et al. |
| 2019/0283240 A1 | 9/2019 | Skaaksrud et al. |
| 2019/0283252 A1 | 9/2019 | Skaaksrud et al. |
| 2019/0283648 A1 | 9/2019 | Skaaksrud et al. |
| 2019/0283962 A1 | 9/2019 | Skaaksrud et al. |
| 2019/0286138 A1 | 9/2019 | Skaaksrud et al. |
| 2019/0286139 A1 | 9/2019 | Skaaksrud et al. |
| 2019/0286152 A1 | 9/2019 | Skaaksrud et al. |
| 2019/0286164 A1 | 9/2019 | Skaaksrud et al. |
| 2019/0287046 A1 | 9/2019 | Skaaksrud et al. |
| 2019/0287047 A1 | 9/2019 | Skaaksrud et al. |
| 2019/0287051 A1* | 9/2019 | Heinla ............... G06Q 50/28 |
| 2019/0287059 A1 | 9/2019 | Skaaksrud et al. |
| 2019/0287062 A1 | 9/2019 | Skaaksrud et al. |
| 2019/0287063 A1 | 9/2019 | Skaaksrud et al. |
| 2019/0327448 A1* | 10/2019 | Fu ............... G08B 3/10 |
| 2020/0057990 A1 | 2/2020 | Kissel, Jr. |
| 2020/0102147 A1 | 4/2020 | Sullivan et al. |
| 2020/0103882 A1 | 4/2020 | Sullivan et al. |
| 2020/0250998 A1 | 8/2020 | Priest |
| 2020/0310414 A1 | 10/2020 | Torii et al. |
| 2020/0349786 A1* | 11/2020 | Ho ............... G06V 40/172 |
| 2020/0353893 A1* | 11/2020 | Salomao ............... B60R 25/305 |
| 2021/0072751 A1 | 3/2021 | Gillett |
| 2021/0132625 A1 | 5/2021 | Gillett |
| 2021/0213604 A1 | 7/2021 | Lee et al. |
| 2021/0221508 A1 | 7/2021 | Yamato |
| 2021/0256467 A1 | 8/2021 | Zuckerman et al. |
| 2021/0304559 A1* | 9/2021 | Cupersmith ....... G06Q 20/3674 |
| 2021/0308860 A1 | 10/2021 | Skaaksrud et al. |
| 2021/0319582 A1* | 10/2021 | Sangeneni ............. G06Q 50/28 |
| 2021/0354287 A1 | 11/2021 | Skaaksrud et al. |
| 2021/0365051 A1 | 11/2021 | Bokeno et al. |
| 2021/0379758 A1 | 12/2021 | Chu et al. |
| 2021/0380244 A1 | 12/2021 | Leverman |
| 2021/0395011 A1 | 12/2021 | Crawford, Jr. et al. |
| 2022/0004974 A1 | 1/2022 | Heinla |
| 2022/0017222 A1 | 1/2022 | Benner |
| 2022/0027844 A1* | 1/2022 | Miller ............... G06Q 10/0833 |
| 2022/0076326 A1 | 3/2022 | Mahajan et al. |
| 2022/0119103 A1 | 4/2022 | Braun et al. |
| 2022/0134547 A1 | 5/2022 | Cristache |
| 2023/0405830 A1 | 12/2023 | Hashimoto |
| 2024/0037487 A1 | 2/2024 | Clise |
| 2024/0073037 A1 | 2/2024 | McFarland, Jr. et al. |
| 2024/0257594 A1 | 8/2024 | Skaaksrud et al. |

FOREIGN PATENT DOCUMENTS

| | | |
|---|---|---|
| JP | 2017200846 A | 11/2017 |
| WO | 2015099890 A2 | 7/2015 |
| WO | 2017064202 A1 | 4/2017 |
| WO | 2018040541 A1 | 3/2018 |

OTHER PUBLICATIONS

Korpela et al., "Applied Robotics for Installation and Base Operations for Industrial Hygiene", IEEE, 2015, pp. 1-6.

Mondada et al., "Swarm-Bot: From Concept to Implementation", IEEE, Oct. 2003, pp. 1626-1631.

Purohit et al., "SensorFly: Controlled-mobile Sensing Platform for Indoor Emergency Response Applications", IEEE, 2011, pp. 223-234.

U.S. Appl. No. 17/402,727 Non-Final Office Action dated Mar. 6, 2023.

Cruz et al., "Modular building blocks for the development of AUVs-from Mares to TriMares", 2013, IEEE, pp. 1-8.

Ecaran et al., "Design of a modular mobile multi robot system: ULGEN (universal-generative robot)", 2013, IEEE, pp. 8-15.

Mayer et al., "Movement-Modular Versatile Mobility Enhancement System", Oct. 14, 2007, IEEE International Conference on Robotics and Automation, pp. 2892-2897.

Meyer et al., "A Flexible Real-Time Control System for Autonomous Vehicles", ISR / ROBOTIK, 2010, pp. 860-867, ISBN 978-3-8007-3273-9.

Bouloubasis et al., "Cooperative Transport of Extended Payloads", IEEE, 2005, pp. 882-887.

Grob et al., "Autonomous Self-Assembly in Swarm-Bots", IEEE Transactions on Robotics, Dec. 2006, pp. 1115-1130, vol. 22, No. 6.

Grob et al., "Object Transport by Modular Robots that Self-assemble", May 2006, IEEE International Conference, pp. 2558-2564.

Herbrechtsmeier et al., "AMiRo: A Modular & Customizable Open-Source Mini Robot Platform", 2016, IEEE, pp. 687-692.

Lembke et al., "RoboMote: Mobile Autonomous Aardware Platform for Wireless Ad-hoc Sensor Networks", 2011, IEEE, pp. 940-944.

Lisowski et al., "Specifications of a small electric vehicle: modular and distributed approach", 1987, IEEE, pp. 919-924.

Paulos et al., "Automated Self-Assembly of Large Maritime Structures by a Team of Robotic Boats", IEEE Transactions on Automaiton Science and Engineering, Jul. 2015, pp. 958-968, vol. 12, No. 3.

Sahin, "GroundScouts: Architecture for a Modular Micro Robotic Platform for Swarm Intelligence and Cooperative Robotics", 2004 IEEE International Conference on Systems, Man and Cybernetics, pp. 929-934.

Szabo et al., "Control System Architecture for a Remotely Operated Unmanned Land Vehicle", 1990, IEEE, pp. 876-882.

Taher et al., "Multi-domain Autonomous Mobile Network for Sensing", 2016, IEEE, 6 pages.

Wang et al., "MASmote—A Mobility Node for MAS-net (Mobile Actuator Sensor Networks)", 2004, IEEE, p. 816-821.

Wilcox, "Athlete: A Mobility and Manipulation System for the Moon", 2007, IEEE, pp. 1-10.

International Application No. PCT/US22/15552 International Search Report and Written Opinion dated Jun. 21, 2022.

U.S. Appl. No. 17/713,319 Non-Final Office Action dated Mar. 27, 2023.

U.S. Appl. No. 17/402,727 Notice of Allowance mailed Jun. 22, 2023.

U.S. Appl. No. 16/351,683 Non-Final Office Action dated Aug. 24, 2023.

U.S. Appl. No. 17/948,303 Notice of Allowance mailed Mar. 18, 2024.

(56) References Cited

OTHER PUBLICATIONS

Fahrnberger, "SIMS: A Comprehensive Approach for a Secure Instant Messaging Sifter", 2014, IEEE, p. 164-173.
Kechar et al., "Communication Architecture Based on Intelligent Autonomous Vehicles for Container Terminals", 2012, IEEE, p. 769-774.
Soafacts, Service-Oriented Architecture, www.soafacts.org, 2012, IEEE, p. 207-358.
Whitestein et al., "Dynamic Dispatching and Transport Optimization—Real-World Experience with Perspectives on Pervasive Technology Integration", 2009, IEEE, p. 1-9.
U.S. Appl. No. 16/351,683 Office Action mailed Dec. 11, 2024.
U.S. Appl. No. 17/950,313 Office Action dated Dec. 30, 2024.
U.S. Appl. No. 18/429,096 Office Action dated Oct. 1, 2024.

* cited by examiner

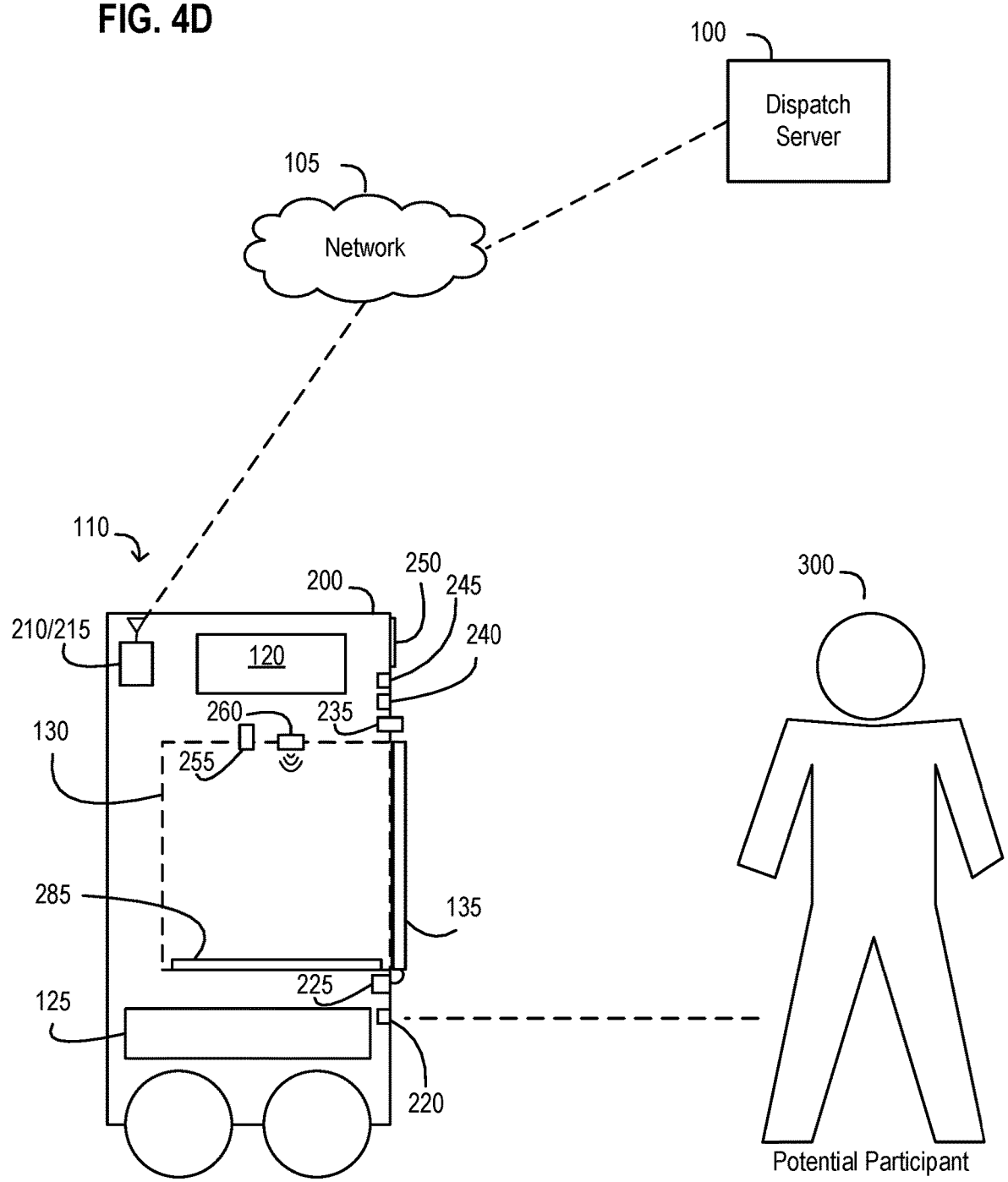

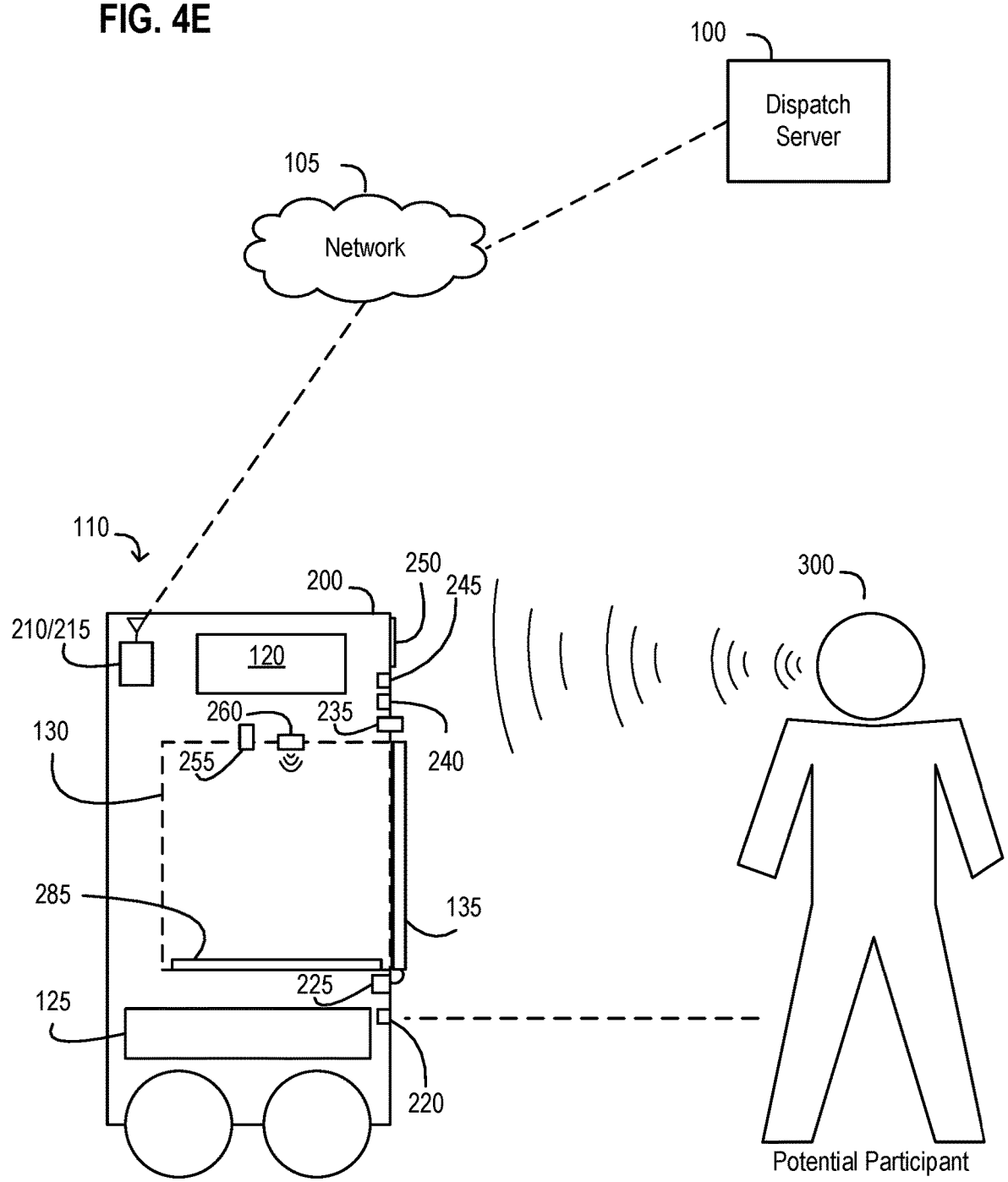

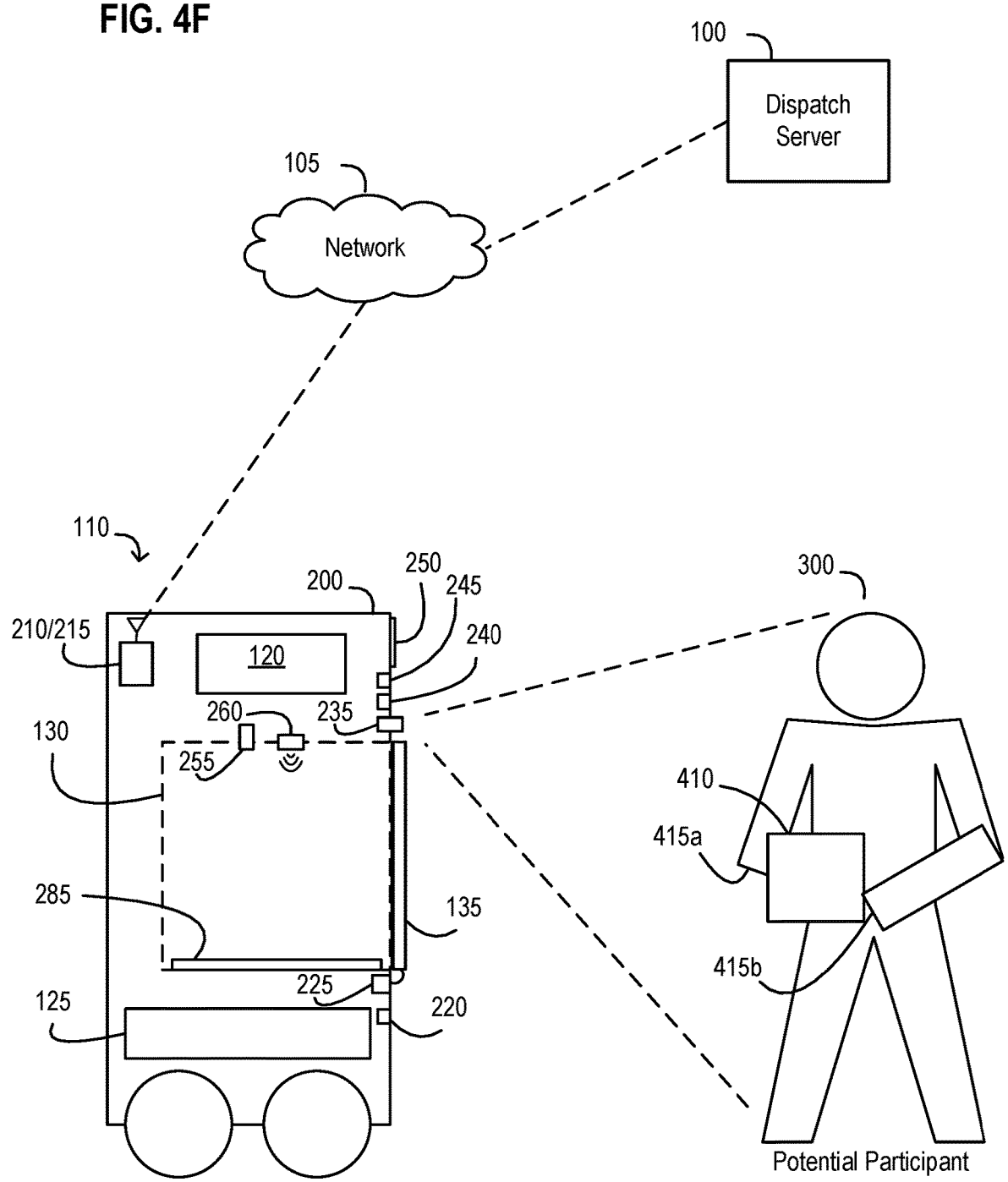

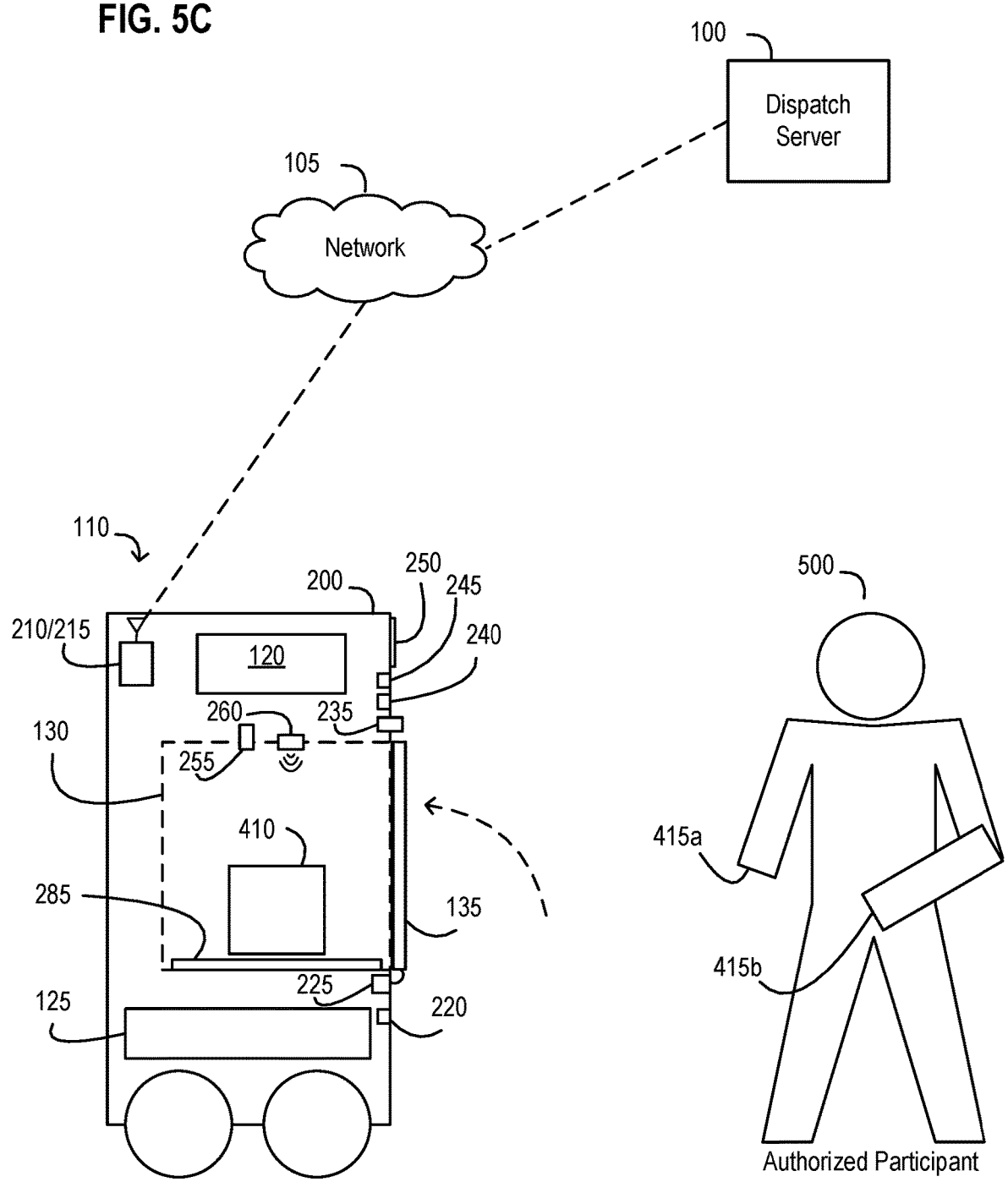

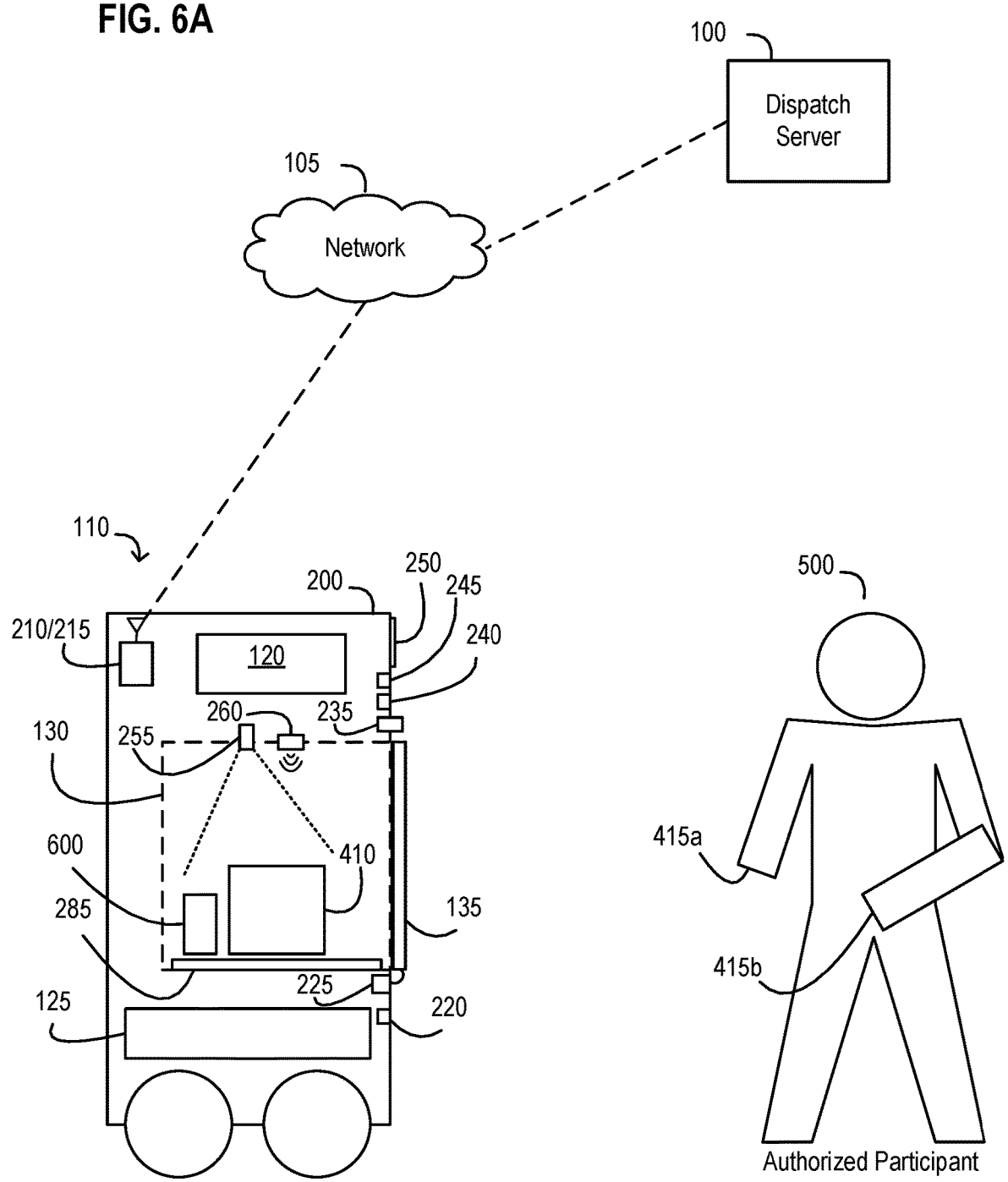

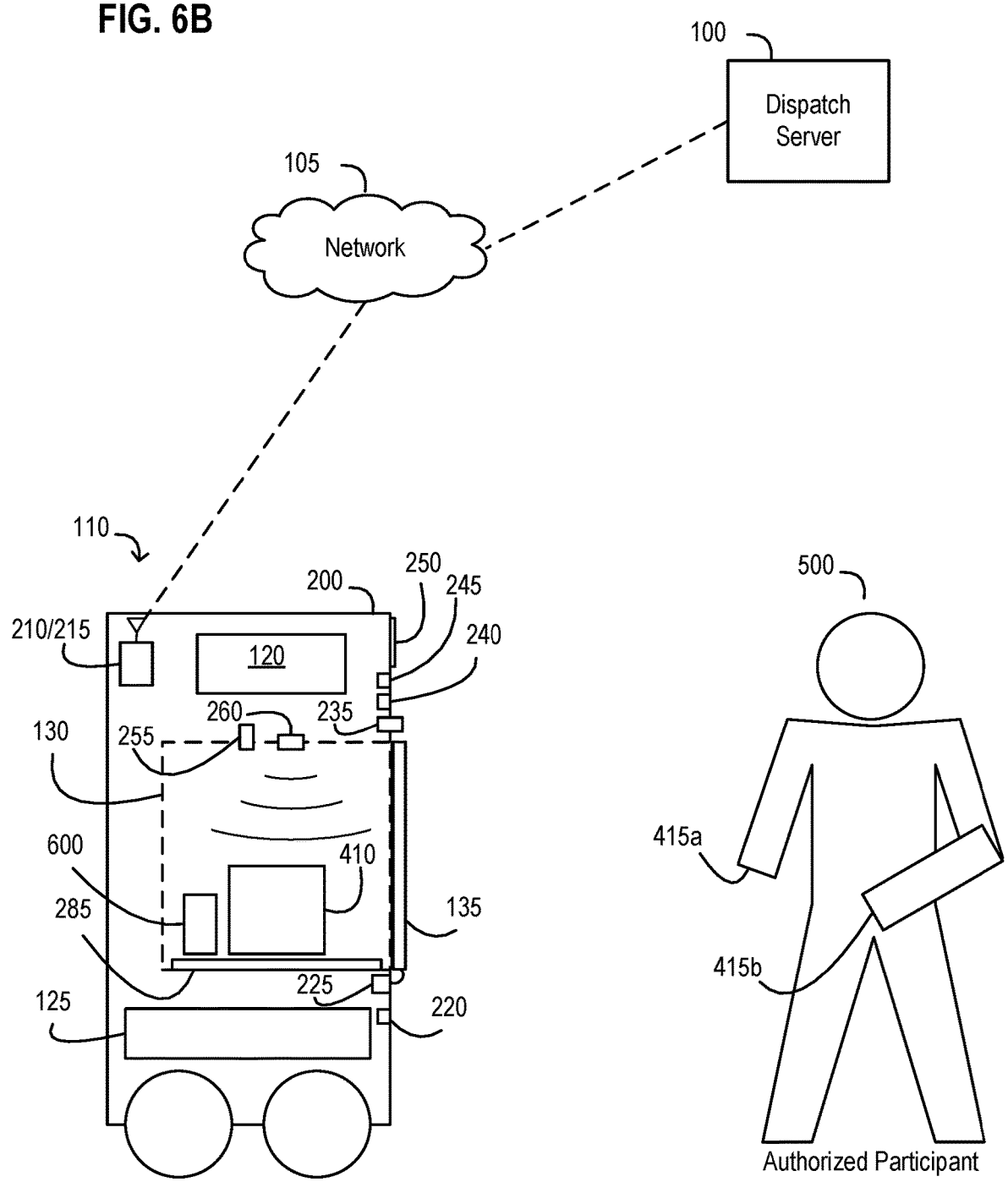

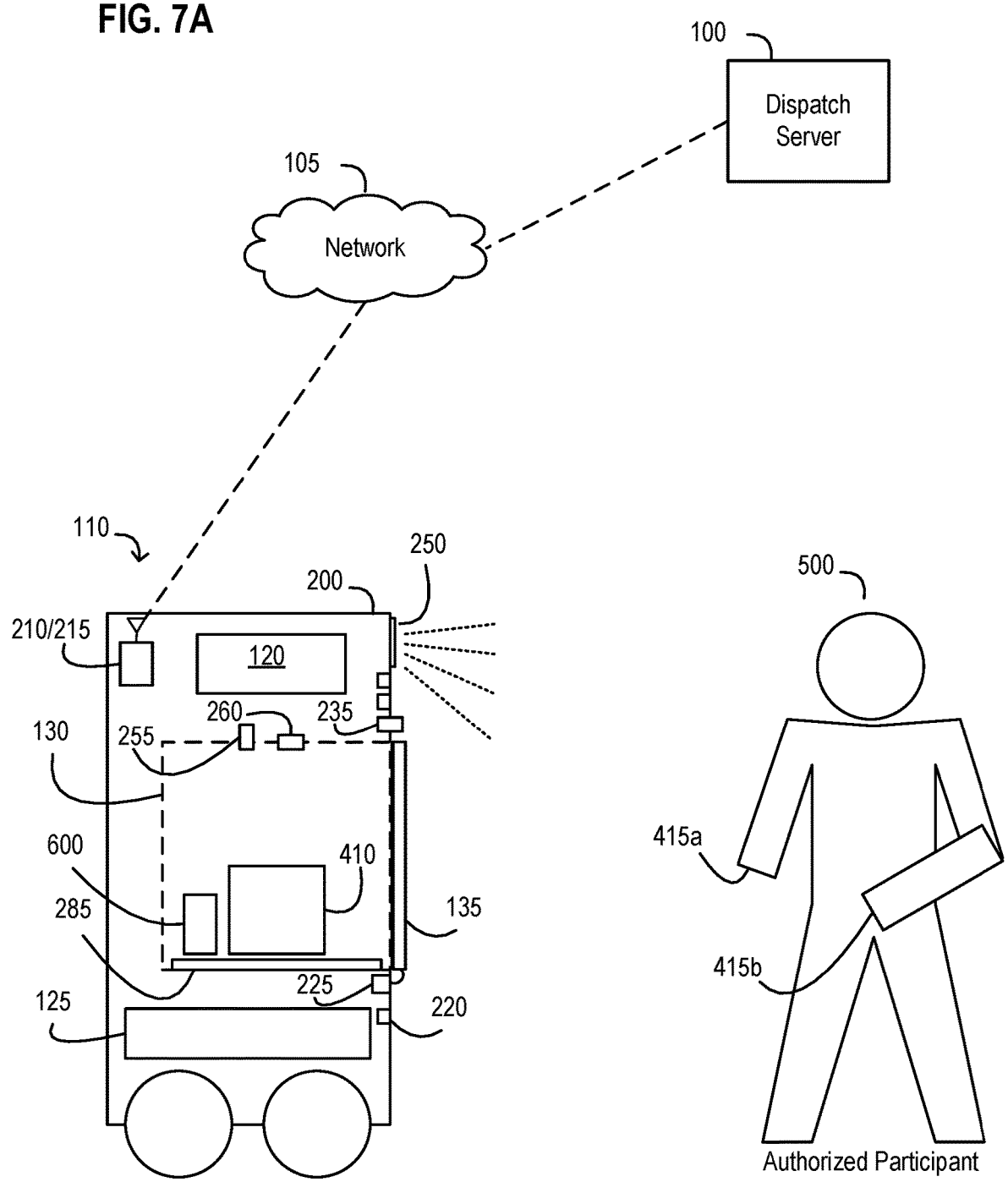

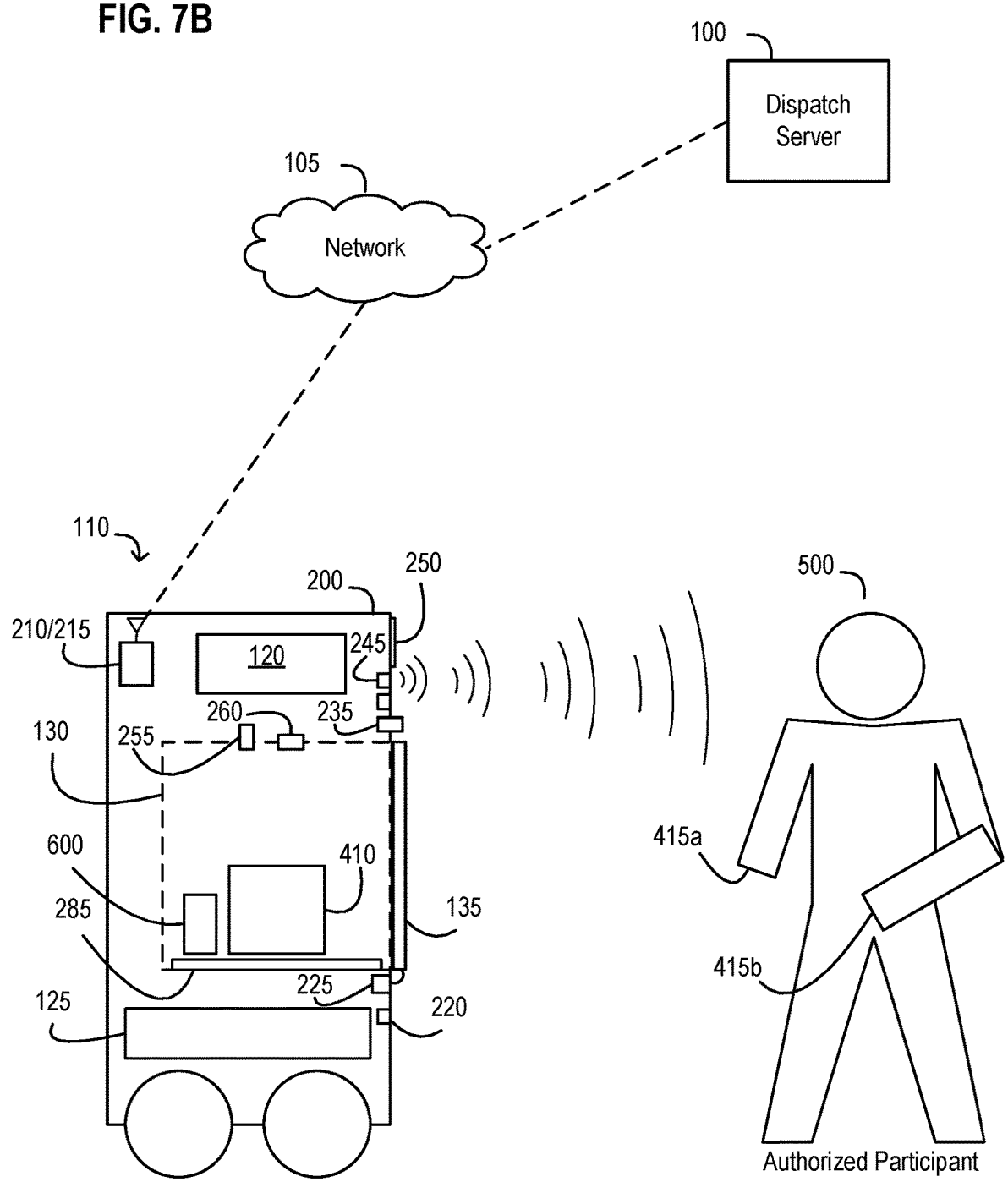

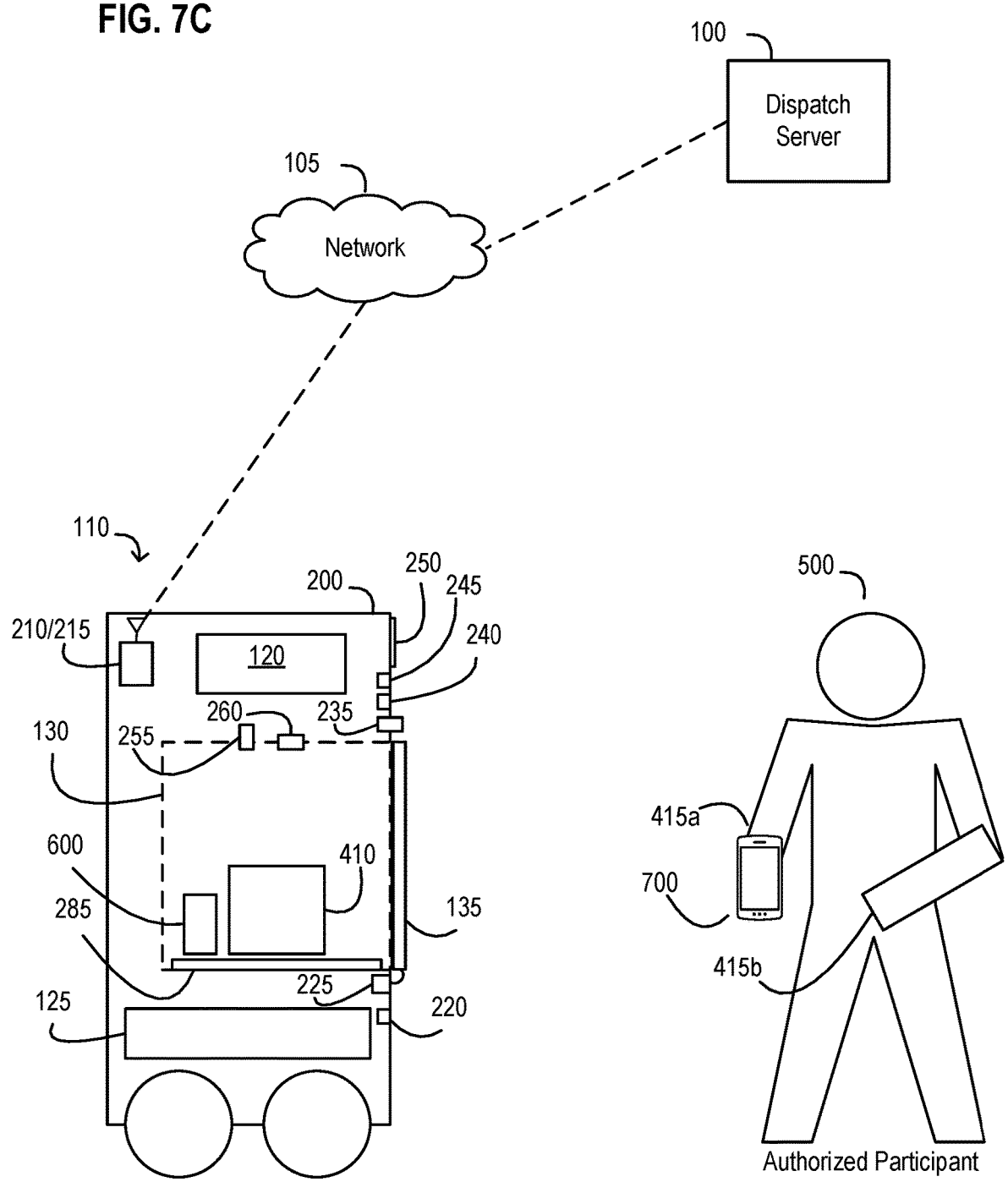

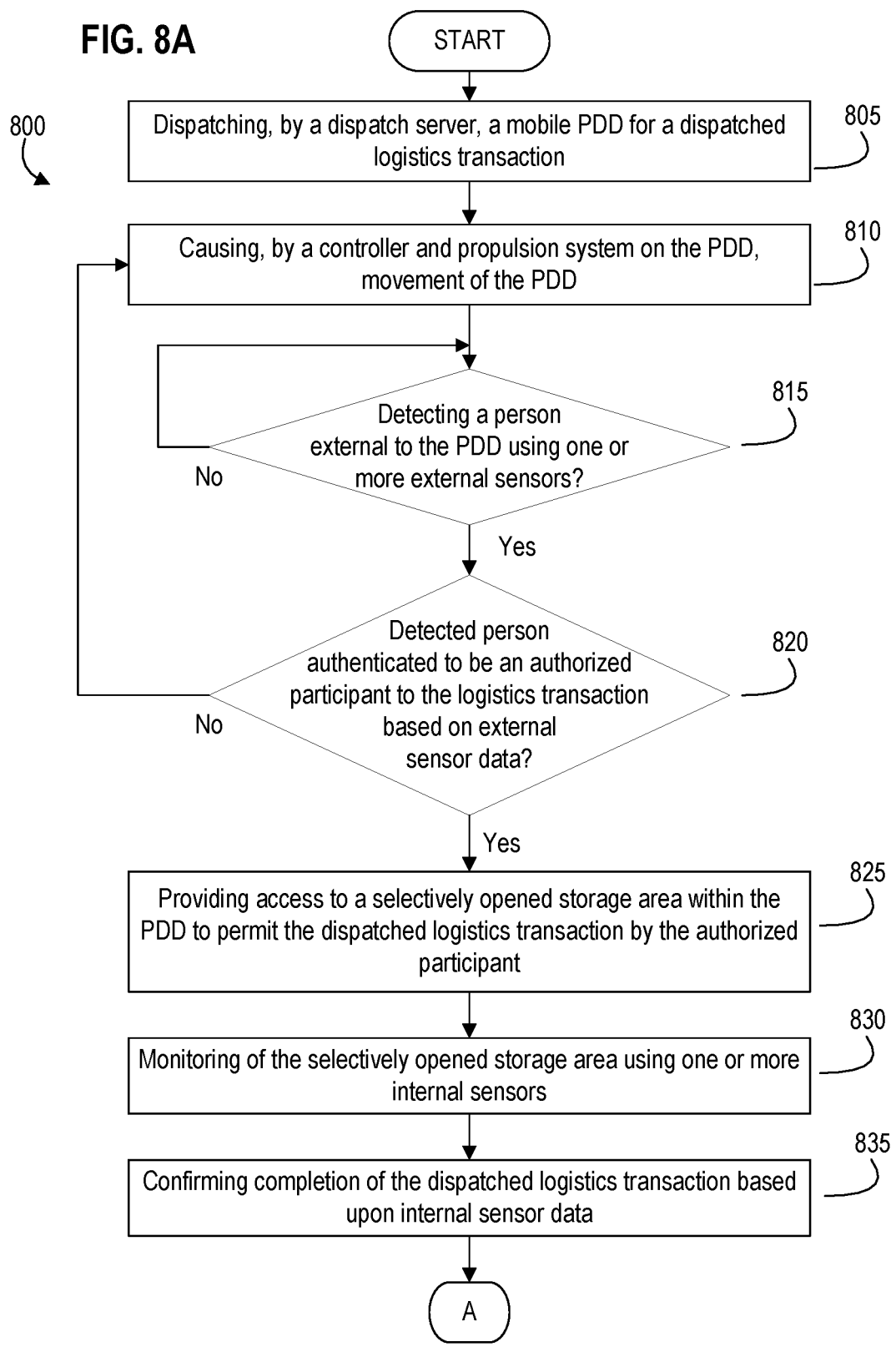

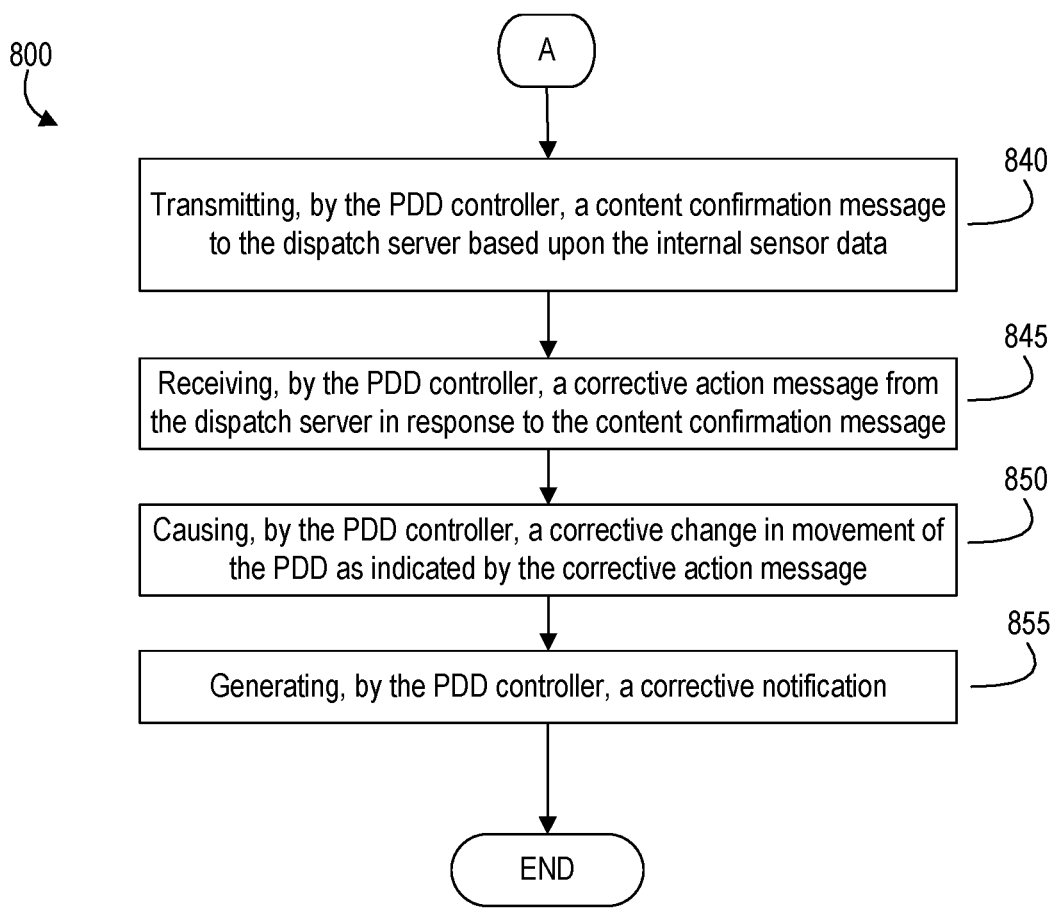

METHODS AND APPARATUS FOR PROVIDING ENHANCED AUTOMATED ACCESS TO A DISPATCHED PERSONAL DELIVERY DEVICE OPERATIVE TO TRANSPORT A SHIPMENT ITEM

FIELD OF THE DISCLOSURE

The present disclosure generally relates to systems, apparatus, and methods in the field of logistics and dispatched delivery vehicles and, more particularly, to various aspects of enhanced systems, apparatus, and methods related to deployment and use of an enhanced personal delivery device (such as an autonomous logistics vehicle) capable of transporting one or more shipment items as part of a dispatched logistics transaction.

BACKGROUND

When picking up shipment items and objects to be transported between locations or dropping off such items and objects as part of a dispatched logistics operation or transaction (e.g., a retail order pickup and delivery, a restaurant order pickup and delivery, and the like), existing systems may deploy manned delivery vans and/or courier personnel to manage and implement the transaction to pickup and/or deliver items and objects from people, residential locations, and businesses. Using delivery vans and courier personnel may unfortunately incur an undesired cost for certain types of logistics transactions where an automated dispatched delivery transport vehicle (generally referred to as a personal delivery device) may be better suited and help streamline the transaction to improve time effectiveness in the transaction and to reduce costs. However, the deployment of automated dispatched delivery transport vehicles, such as an autonomous logistics delivery vehicle or autonomous mobile logistics bot, still exposes problems with how a participant to the dispatched logistics transaction (e.g., loading or unloading of one or more items into or out of the vehicle) interacts with the delivery device.

For example, one issue when deploying a dispatched personal delivery device (such as an autonomous logistics delivery vehicle or autonomous mobile logistics bot) for a particular logistics transaction may be identifying and authenticating who is loading and/or unloading the delivery device as part of the logistics transaction. In some situations, a person that is supposed to be interacting with the delivery device may have their hands full and be unable to physically interact with the delivery device (e.g., unable to push a keypad or other user input device on the delivery device, and the like). Another issue in such a situation may be concerns and issues with what is being loaded and/or unloaded into and off of the delivery device. There may, for example, be issues with a person authenticated to participate in the logistics transaction loading the wrong item or items, or unloading the wrong item or items, loading/unloading an incorrect number of items, or not loading/unloading all of what is supposed to be involved in the particular dispatched logistics transaction.

Catching an errant load or unload operation involving a personal delivery device after the fact may induce further problems. For example, once the delivery device has moved away from the loading/unloading location and reached its next location may incur expensive financial and time delays in the transaction. In some situations, catching an errant load or unload operations as part of the transaction with the personal delivery device may cause spoilage of what was supposed to be picked up. Further, the occurrence and delayed recognition of an error load or unload operation involving a dispatched personal delivery device may make it impossible for the originally dispatched personal delivery device to return to the load/unload location, meet the person involved with the errant load/unload operation. Instead, such a situation may incur costly secondary dispatches of one or more additional delivery vehicles in order to meet requirements of the original logistics transaction.

To address these requirements, concerns, and problems, there remains a need for improved enhanced systems, apparatus, and methods related to deployment and use of an enhanced personal delivery device (such as an autonomous logistics vehicle) capable of transporting one or more shipment items as part of a dispatched logistics transaction that may, for example, facilitate innovative technical solutions on enhanced interactions with the delivery device, auto-confirmations using deployed sensor-based systems on the delivery device, and initiate responsive actions using such technical solutions that avoid one or more of the problems noted above.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a method for providing enhanced automated access to a dispatched personal delivery device operative to transport a shipment item within a selectively opened storage area within the dispatched personal delivery device as part of a dispatched logistics transaction involving the shipment item. In this aspect, the method generally has a first of multiple external sensors on the dispatched personal delivery device detecting a person disposed external to the dispatched personal delivery device. The method then has a controller on the dispatched personal delivery device authenticating that the detected person disposed external to the dispatched personal delivery device is an authorized participant to the dispatched logistics transaction based upon sensor data generated by the first of the external sensors and provided to the controller. The method then has an actuator on the dispatched personal delivery device operatively coupled to the controller providing access to the selectively opened storage area within the dispatched personal delivery device to permit the dispatched logistics transaction by the detected person when the detected person has been authenticated to be the authorized participant to the dispatched logistics transaction.

Another aspect of the disclosure relates to an improved personal delivery device apparatus. In this aspect, the improved personal delivery device apparatus uses enhanced automated access as part of a dispatched logistics transaction initiated by a dispatch server, where the dispatched logistics transaction involves a shipment item and a person disposed external to the personal delivery device apparatus. In more detail, the personal delivery device apparatus in this aspect has a mobile delivery frame, a selectively opened storage area within the frame, an actuated door on the frame, an actuator coupled to the door, a propulsion system, a controller disposed within the frame, a wireless communication interface, and external sensors. The selectively opened storage area is disposed within the mobile delivery frame and is configured to maintain and transport the shipment item. The actuated door disposed on the mobile delivery frame provides actuated access to the selectively opened storage area. The actuator coupled to the actuated door is responsive to a door actuation signal to articulate the actuated door between a closed position sealing the selectively opened storage area and an open position providing access to the selectively opened storage area. The propulsion system disposed on the mobile delivery frame is operative to move the mobile delivery frame in response to a motion control signal. The wireless communication interface coupled to the controller is operative to communicate with the dispatch server. The external sensors are disposed on the mobile delivery frame, coupled to the controller, and monitor an external environment relative to the mobile delivery frame. The controller disposed within the mobile delivery frame is operative to generate the door actuation signal to cause the actuator to articulate the actuated door, and operative to generate the motion control signal that controls the propulsion system. The controller is further operative, via programming that specially adapts operation of the personal delivery device apparatus, to at least (a) detect, using a first of the external sensors, the person disposed external to the mobile delivery frame; (b) authenticate that the detected person disposed external to the mobile delivery frame is an authorized participant to the dispatched logistics transaction based upon sensor data generated by the first of the external sensors and provided to the controller; and (c) activate the actuator to articulate the actuated door to provide actuated access to the selectively opened storage area within the mobile delivery frame to permit the dispatched logistics transaction by the detected person when the detected person has been authenticated to be the authorized participant to the dispatched logistics transaction.

Yet another aspect of the disclosure relates to an enhanced dispatching system for a dispatched logistics transaction related to a shipment item. In this aspect, such a system combines an exemplary personal delivery device with a dispatch server as an embodiment of an enhanced dispatching system for a dispatched logistics transaction related to a shipment item. In general, such a system may have a mobile personal delivery device and a dispatch server that collectively and interactively operates by initiating the dispatched logistics transaction, detecting the potential participant to the logistics transaction, authenticating whether the detected potential participant is an authorized participant in a touchless autonomous or server-assisted manner, providing access to storage within the dispatched exemplary personal delivery device, auto-confirming aspects of the logistics transaction via autonomous and/or server-assisted interactions with the exemplary personal delivery device, and causing responsive autonomous and/or server-directed corrective operation of the mobile personal delivery device (e.g., movement of the mobile personal delivery device, and/or corrective notification(s) to the authorized participant of the dispatched logistics transaction) so as to provide a robust technical solution to one or more of the problems set out above.

Each of these aspects respectively effect improvements to the technology of logistics delivery devices, such as automated or autonomous delivery vehicles that may be dispatched to fulfill a particular logistics transaction. Additional advantages of this and other aspects of the disclosed embodiments and examples will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIGS. 4A-4F are a series of diagrams illustrating an exemplary personal delivery device apparatus detecting and attempting to authenticate the potential participant as a person disposed external to the personal delivery device apparatus and as an authorized participant to a dispatched logistics transaction in accordance with an embodiment of the invention;

FIGS. 5A-5C are a series of diagrams illustrating exemplary enhanced access to a storage area within the exemplary personal delivery device apparatus in accordance with an embodiment of the invention;

FIGS. 6A-6B are a series of diagrams illustrating exemplary auto-confirmation of what is stored within the storage area within the exemplary personal delivery device apparatus as a result of the dispatched logistics transaction in accordance with an embodiment of the invention;

FIGS. 7A-7C are a series of diagrams illustrating exemplary corrective notifications as exemplary responsive actions based upon auto-confirmation in accordance with an embodiment of the invention; and FIGS. 8A-8B collectively represent a flow diagram of an embodiment of an exemplary method for providing enhanced automated access to a dispatched personal delivery device operative to transport a shipment item in accordance with an embodiment of the invention.

DESCRIPTION OF THE EMBODIMENTS

Figure 1:
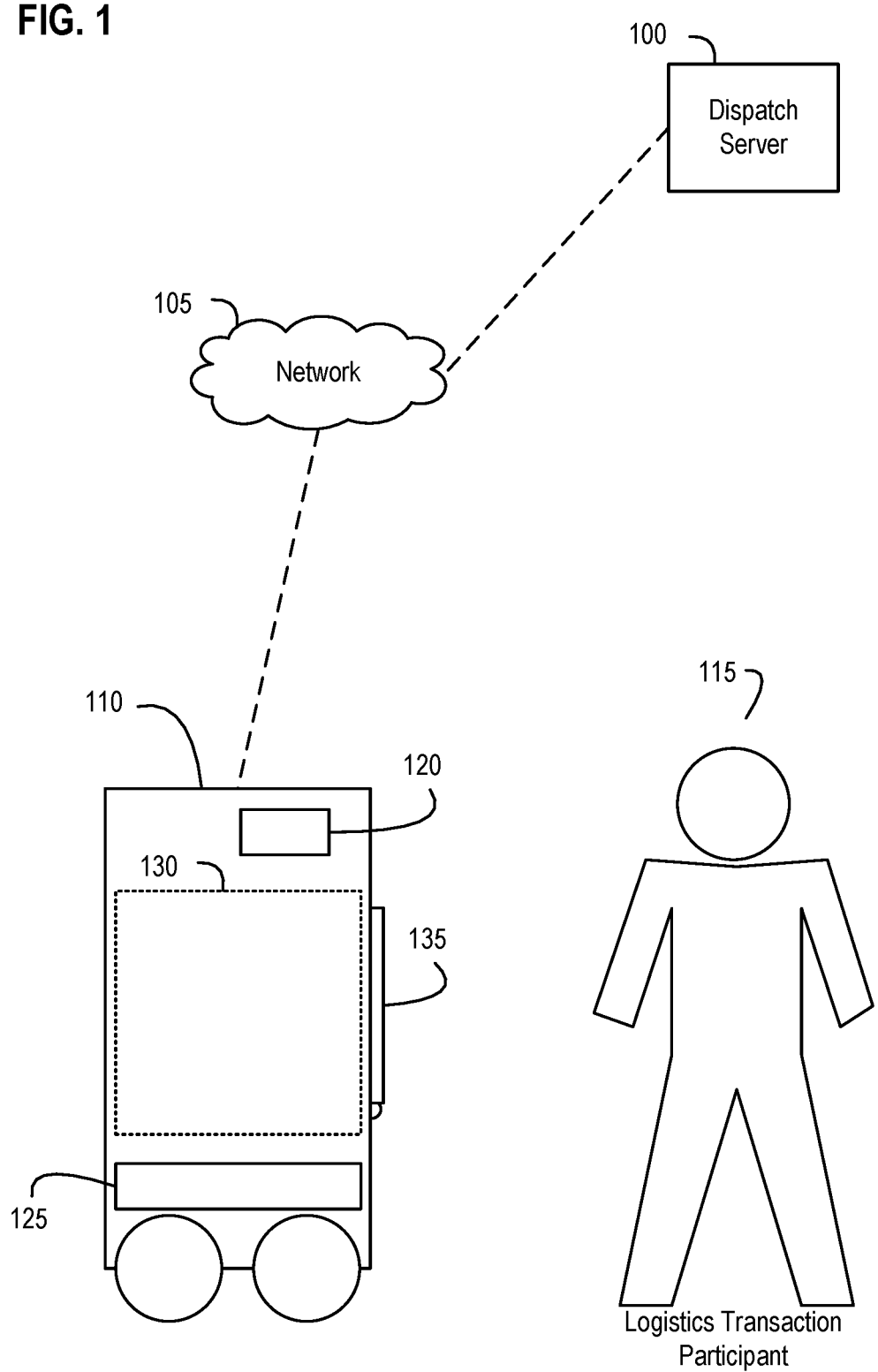
FIG. 1 is a diagram of an exemplary personal delivery device apparatus that uses enhanced automated access as part of a dispatched logistics transaction involving an externally disposed logistics transaction participant in accordance with an embodiment of the invention.

Reference will now be made in detail to exemplary embodiments. Wherever possible, the same reference numbers are used in the drawings and the description to refer to the same or like parts. However, those skilled in the art will appreciate that different embodiments may implement a particular part in different ways according to the needs of the intended deployment and operating environment for the respective embodiments.

Those skilled in the art will appreciate that the following description of an exemplary personal delivery device, how it may interact with objects and people in its proximate operating environment, how it may communicate with other devices and systems, how it may improve on how to authenticate that a potential participant to a logistics transaction is an authorized participant, how it may confirm details of the logistics transaction, and how it may respond to such auto-authentication and auto-confirmation operations implemented with technical hardware and adaptive programming that transforms the exemplary personal delivery device into a specially adapted system and apparatus as a technical solution to one or more of the above-mentioned problems.

Figure 2:
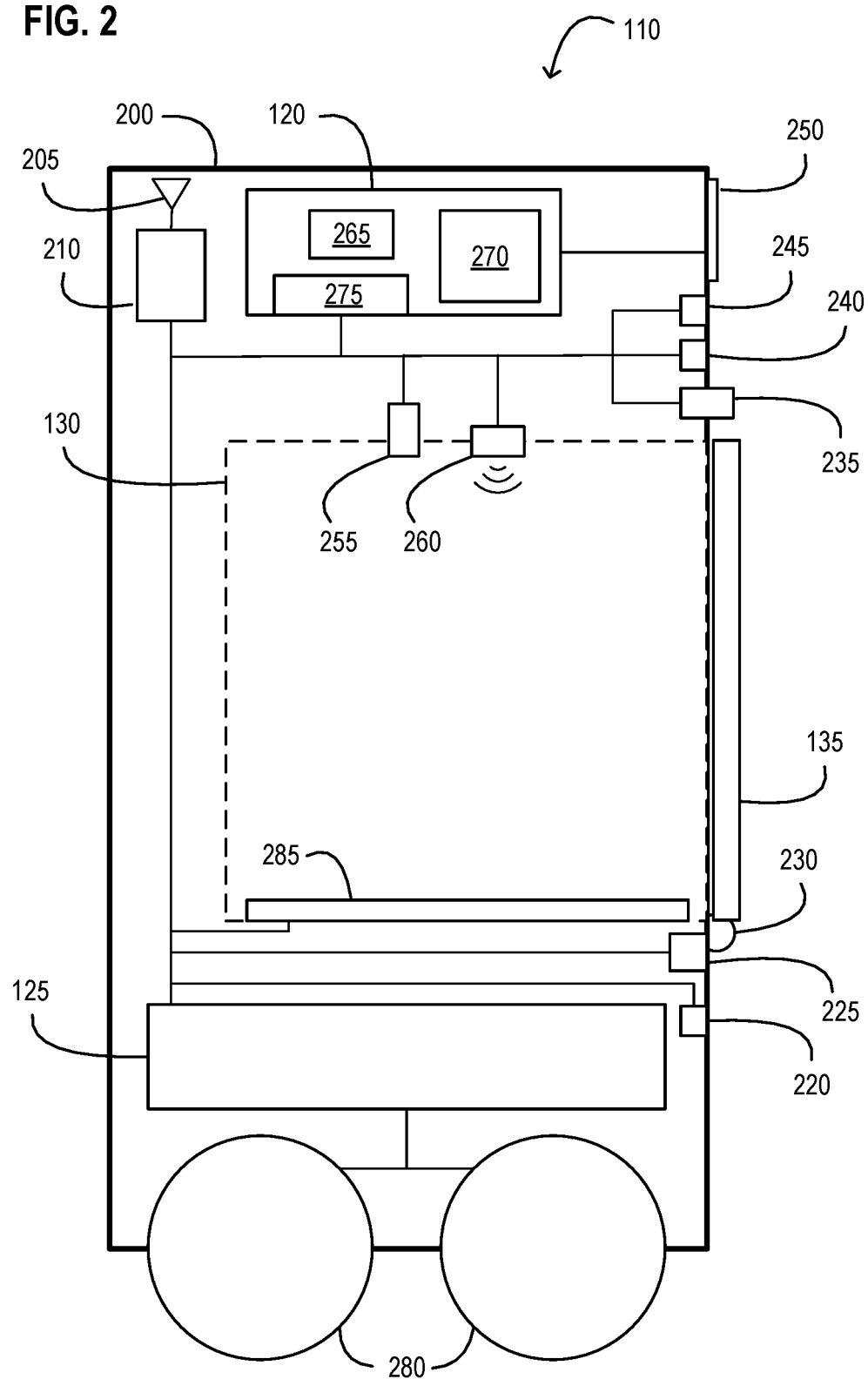
FIG. 2 is a detailed block diagram showing further details of an exemplary personal delivery device apparatus in accordance with an embodiment of the invention.
Figure 3:
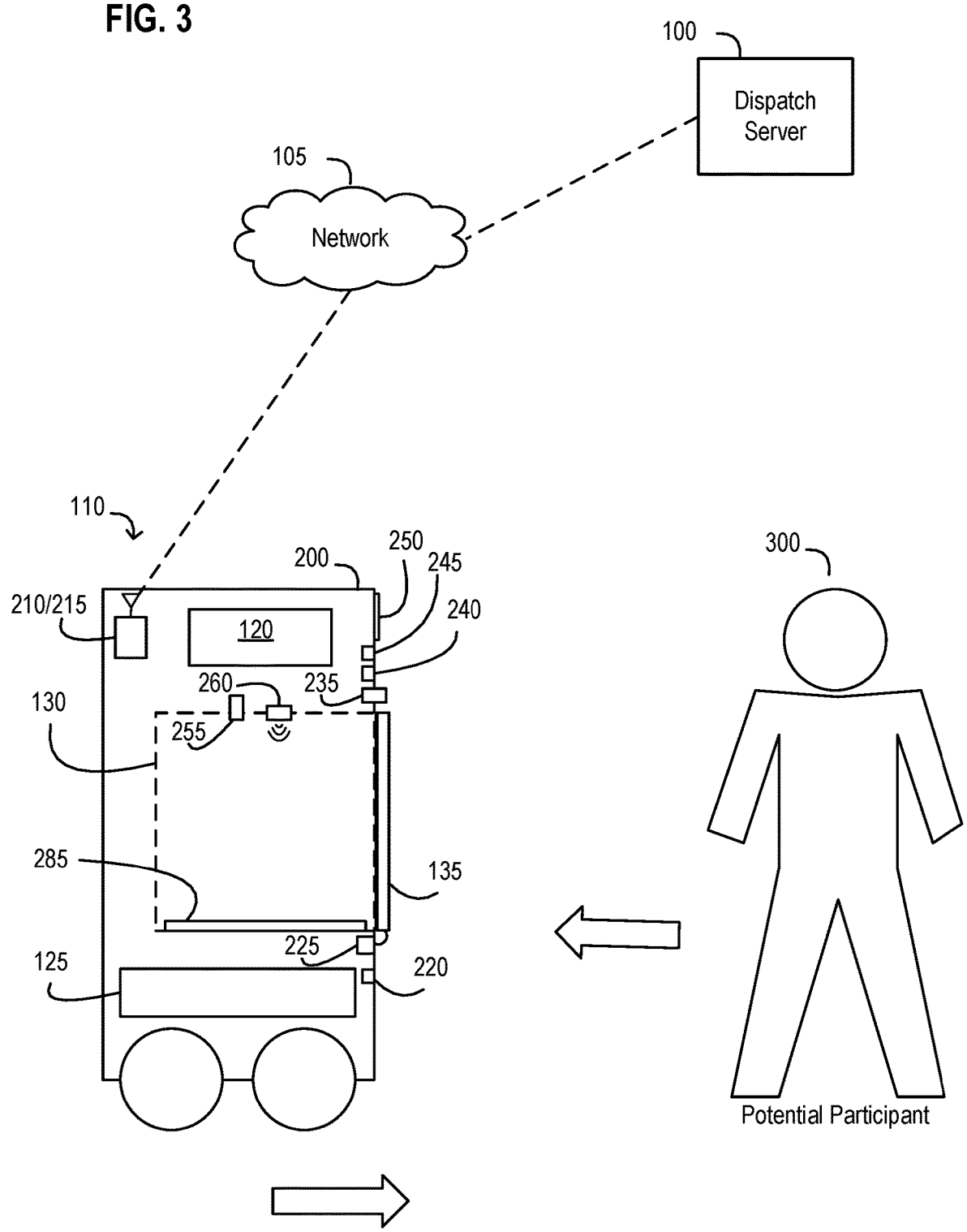
FIG. 3 is a diagram of an exemplary personal delivery device apparatus approaching a potential participant to an exemplary dispatched logistics transaction in accordance with an embodiment of the invention.

In general, the following description begins with a foundational explanation of an exemplary personal delivery device as a specially programmed and outfitted apparatus as set forth in FIGS. 1 and 2. FIG. 3 provides a general illustration of an embodiment where an exemplary personal delivery device has been deployed as part of a dispatched logistics transaction and as the exemplary personal delivery device encounters a potential participant that must be authenticated to be an authorized participant in the logistics transaction before access to within the exemplary personal delivery device may be automatically provided. FIGS. 4A-4F provide illustrations of embodiments where the exemplary personal delivery device apparatus detects and then attempts to authenticate the potential participant as a person disposed external to the personal delivery device apparatus and as an authorized participant to a dispatched logistics transaction. FIGS. 5A-5C provide exemplary illustrations of embodiments where an exemplary shipment item may be loaded into the exemplary personal delivery device once automated access is triggered, and FIGS. 6A-6B provide exemplary illustrations of embodiments where the exemplary personal delivery device deploys one or more internal sensors as part of auto-confirming aspects of the logistics transaction. FIGS. 7A-7C provide exemplary illustrations of embodiments of different exemplary corrective notifications that may be provided by the personal delivery device as exemplary responsive actions based upon auto-confirmation actions and functionality. And, FIGS. 8A-8B collectively illustrate a flow diagram of an embodiment of an exemplary method for providing enhanced automated access to a dispatched personal delivery device operative to transport a shipment item in accordance with an embodiment of the invention.

In more detail, FIG. 1 is a diagram of an exemplary personal delivery device apparatus that uses enhanced automated access as part of a dispatched logistics transaction (e.g., pickup of one or more shipment items, drop off or delivery of such items) involving an externally disposed logistics transaction participant in accordance with an embodiment of the invention. Referring now to FIG. 1, an exemplary personal delivery device 110 (a type of apparatus) is illustrated as being operative to communicate with an exemplary server 100 through exemplary network 105, and in proximity to an exemplary logistics transaction participant 115. In general, an embodiment may have server 100 being implemented in a role of a dispatch server that may initiate dispatch of the exemplary personal delivery device 110 as part of a particular dispatched logistics transaction involving one or more shipment items. In various embodiments described herein, exemplary server 100 may communicate with exemplary personal delivery device 110 during the dispatched logistics transaction to provide information and data related to the logistics transaction, may responsively interact with the exemplary personal delivery device 110 as device 110 attempts to authenticate one or more persons located external to the device 110, may responsively interact with the exemplary personal delivery device 110 as device 110 attempts to automatically confirm aspects of the logistics transaction (e.g., what has been loaded and/or unloaded), and may responsively interact with the exemplary personal delivery device 110 related to automatic responsive or corrective actions to be taken by device 110 as part of such confirmation actions.

Exemplary server 100, as shown in FIG. 1, may be implemented as a networked computing platform capable of connecting to and interacting with at least the wireless communication interface on exemplary personal delivery device 110. In other embodiments, exemplary server 100 may also capable of connecting to and interacting with one or more user access devices, such as a mobile user access device (e.g., smartphone, tablet, and the like). Those skilled in the art will appreciate that exemplary server 100 is a hardware-based component that may be implemented in a wide variety of ways. For example, server 100 may use a single processor, may be implemented as one or more parts of a multi-processor component that communicates with devices (such as device 110), or may be implemented as a computing cloud-based server. As such, those skilled in the art will further appreciate that server 100 may be implemented as a single computing system, a distributed server (e.g., separate servers for separate server related tasks), a hierarchical server (e.g., a server implemented with multiple levels where information may be maintained at different levels and tasks performed at different levels depending on implementation), or a server farm that logically allows multiple distinct components to function as one server computing platform device from the perspective of a client device (e.g., device 110). In some regional deployments, an exemplary server may include servers dedicated for specific geographic regions as information collected within different regions may include and be subject to different regulatory controls and requirements implemented on respective regional servers.

While server 100 is shown connecting through network 105, those skilled in the art will appreciate that server 100 may have a more direct or dedicated connections to other components illustrated in FIG. 1 depending upon implementation details and desired communication paths. Furthermore, those skilled in the art will appreciate that an exemplary server may contain a collection of information in a database (not shown in FIG. 1), while multiple databases maintained on multiple server platforms or network storage servers may be used in other embodiments to maintain such a collection of information access by exemplary server 100. Additionally, those skilled in the art will appreciate that a database may be implemented with cloud technology that essentially provides networked storage of collections of information that may be directly accessible to devices, such as exemplary personal delivery device 110.

Exemplary network 105 may be a general data communication network involving a variety of communication networks or paths. Those skilled in the art will appreciate that such exemplary networks or paths may be implemented with hard wired structures (e.g., LAN, WAN, telecommunication lines, telecommunication support structures and telecommunication processing equipment, etc.), wireless structures (e.g., antennas, receivers, modems, routers, repeaters, etc.) and/or a combination of both depending upon the desired implementation of a network that interconnects server 100 and other components shown in FIG. 1 in embodiments of the present invention.

As generally illustrated in FIG. 1, exemplary personal delivery device 110 may be implemented as a type of automated dispatched delivery transport vehicle or bot that includes, but is not limited to, a selectively opened storage area 130 within which items may be loaded, transported, and unloaded while being secured by an actuated door 135. An exemplary propulsion system 125 on device 110 functions to move device 110 in a desired manner—e.g., at a controlled speed and direction. Exemplary personal delivery device 110 further includes an exemplary controller 120 that may control propulsion system 125 as well as control access to within selectively opened storage area 130 for authenticated persons as part of a particular logistics transaction. As such, exemplary controller 120 may be implemented as one or more programmable processor-based units (e.g., a processor or microcontroller with memory having programmable code that specially adapts functions and operation of the exemplary personal delivery device 110). In some embodiments, controller 120 may be a single device or module. However, those skilled in the art will appreciate that in other embodiments, controller 120 may be implemented with separate devices or modules, each with their respective programming or program-based specialized functionality, for dedicated responsibilities, such as involving control of the propulsion system 125, control providing enhanced access within device 110, and control involving interactions with server 100 and any logistics transaction participant 115.

FIG. 2 is a detailed block diagram showing further details of exemplary personal delivery device apparatus 110 in accordance with an embodiment of the invention. Referring now to FIG. 2, an embodiment of exemplary personal delivery device 110, a type of mobile apparatus, is shown having a mobile delivery frame 200 within which selectively opened storage area 130 is disposed to maintain and transport one or more shipment items. Actuated door 135 is shown disposed on the mobile delivery frame 200 via hinge 230 and may be actuated by controller 120 to provide access to selectively opened storage area 130 using actuator 225. In this embodiment, actuator 225 is coupled to the actuated door 135, where actuator 225 is responsive to a door actuation signal from controller 120 to articulate the actuated door 135 between a closed position sealing the selectively opened storage area 130 and an open position providing access to the selectively opened storage area 130.

Exemplary propulsion system 125 is shown disposed on mobile delivery frame 200 and coupled to controller 120 so as to be able to move mobile delivery frame 200 in a desired manner—e.g., at a controlled speed and direction—in response to a motion control signal provided by the controller 120. Propulsion system 125 may, for example, include one or more motors and one or more steering linkages that may be controlled and actuated in response to the motion control signal from controller 120. Propulsion system 125 is shown in FIG. 2 being operatively coupled to wheels 280, which contact the ground and are propelled by propulsion system in the desired manner.

Exemplary controller 120 is shown in FIG. 2 disposed within mobile delivery frame 200 and operatively coupled to propulsion system 125, actuator 225 for door 135, a wireless communication interface 210 (and its antenna 205) used to communicate with server 100, a user interface display 250, a speaker 245, and a variety of external sensors (e.g., proximity sensor 220, external camera 235, microphone 240) and internal sensors (e.g., internal camera 255, internal LiDAR sensor 260, internal weight scale 285). An embodiment of controller 120, as shown in FIG. 2, has a processor 265, memory 270 coupled to processor 265 (e.g., including volatile memory, non-volatile memory, as well as program code that implements executable programming that specially adapts controller 120 to operate in the particular manner described herein), and interface circuitry that effectively couples controller 120 to the different peripheral devices (e.g., communications interface 210, display 250, propulsion system 125, onboard actuators, as well as external and internal sensors). For example, exemplary controller may be implemented with a single processor or logic unit, such as processor 265 having associated peripheral circuitry as dictated by the needs of the particular application. Less complex microcontrollers or discrete circuitry may be used to implement processor 265 as well as more complex and sophisticated microprocessors. Those skilled in the art will appreciate that other embodiments may implement controller 120 with discrete or separate processing devices (e.g., processors, microcontrollers, ASIC devices, FPGA devices) that interface and control each of such peripheral devices.

Controller 120 may also include location circuitry (not shown), such as a GPS chipset and antenna. Such exemplary location circuitry disposed on the mobile delivery frame 200 may allow the exemplary personal delivery device 110 to self-determine its location or to determine its location by itself. In other embodiments, alternative circuitry and techniques may be relied upon for such location circuitry (rather than GPS), such as location circuitry compatible with other satellite-based systems (e.g., the European Galileo system, the Russian GLONASS system, the Chinese Compass system), terrestrial radio-based positioning systems (e.g., cell phone tower-based or Wi-Fi-based systems), infrared positioning systems, visible light based positioning systems, and ultrasound-based positioning systems). Such exemplary location circuitry may be operatively coupled to processor 265, generate location data on a location of the exemplary personal delivery device 110, and provide the location data to processor 265 for use in operation of the exemplary personal delivery device 110. Those skilled in the art will appreciate that such location circuitry 3110 may be implemented similar to dedicated location positioning circuitry 475 (e.g., GPS circuitry) described above that allows a master node to self-determine its location or to determine its location by itself.

Exemplary wireless communication interface 210 (including its antenna 205) are coupled to controller 120 to provide wireless communications to external devices, such as server 100. Embodiments of such an exemplary wireless communication interface 210 and its antenna 205 may generally be implemented as a programmable radio and an omni-directional antenna coupled to controller 120. In other embodiments, interface 210 may use an antenna 205 with a different antenna profile when directionality may be desired. Those skilled in the art will appreciate that such an exemplary wireless communication interface 210 may be implemented with hardware, implemented with a combination of hardware and software, as well as implemented as a software-defined radio (SDR). Embodiments may have various RF characteristics of the interface's transceiver, such as the RF output power and/or the RF receiver sensitivity, be dynamically and programmatically varied under control of controller 120. In other embodiments, further RF characteristics of the interface's transceiver may be programmatically varied, such as frequency, duty cycle, timing, modulation schemes, spread spectrum frequency hopping aspects, etc., as needed to flexibly adjust the RF output signal depending upon a desired implementation and anticipated use of exemplary personal delivery device 110. Further embodiments of wireless communication interface 210 may be implemented as a wireless transceiver-based communication interface with both short-range and longer-range communication capabilities that allow for shorter range communications using shorter range communication formats (e.g., Bluetooth, Zigbee, and the like) as well as longer range communication formats (e.g., cellular, Wi-Fi, LTE 5G, LTE-M, NB-IOT (NarrowBand IoT), and LPWAN (Low Power Wide Area Network)). Those skilled in the art will appreciate that LPWAN, also commonly referred to low-power wide-area (LPWA) network or just low-power network (LPN), is a type of wide-area network wireless communication format that allows for extended range, low-bandwidth communications for power sensitive application, such as with devices that are battery powered devices (e.g., mobile logistics transport such as exemplary personal delivery device 110, and the like). Exemplary types of LPWAN may include ultra-narrowband (UNB) technology from Sigfox, random phase multiple access (RPMA) technology from Ingenu, and other long-range WAN protocol (LoRaWAN) technology as promoted by the LoRa Alliance of companies (e.g., IBM, MicroChip, Cisco, Semtech, Singtel, KPN, Bouygues Telecom). LTE-M is a communication technology that allows a node-based device (such as a sensor-based ID node or command node) to directly connect to a Long Term Evolution (4G) cellular network without a gateway and on batteries. NB-IOT is a low-power communication technology that applies a narrowband approach to cellular IoT (Internet of Things) communications allowing for usage of parts of the GSM spectrum bandwidth in unused 200 kHz bands.

Exemplary user interface display 250 (shown disposed on the exterior of mobile delivery frame 200 in FIG. 2) is coupled to controller 120 and generally allows for the display of visual information external to the exemplary personal delivery device 110. An embodiment of an exemplary user interface display 250 may, for example, be implemented with an LCD or LED display, or touchscreen interactive display interface. Other embodiments may include one or more status lights where specific status lights may represent different visual messages to be conveyed by the exemplary personal delivery device 110 (e.g., a red light or panel that may illuminate or blink to indicate a type of visual message reflecting an errant load or unload operation relative to the contents within the selectively opened storage area 130 of mobile delivery frame 200).

Exemplary speaker 245 shown disposed on the exterior of mobile delivery frame 200 in FIG. 2 is also coupled to controller 120 and generally allows for the production of audible information external to the exemplary personal delivery device 110. For example, controller 120 may cause speaker 245 to generate an audible message providing prompting instructions for participant 115 as part of the logistics transaction (e.g., loading or unloading instructions) or may generate another type of audible message reflecting an errant load or unload operation relative to the contents loaded within or unloaded from the selectively opened storage area 130 of mobile delivery frame 200.

Exemplary external sensors disposed on the mobile delivery frame 200 of device 110 may monitor an external environment relative to the mobile delivery frame 200. Each of such exemplary external sensors, as shown in FIG. 2, are coupled to controller 120 and provide their respectively generated sensor data (e.g., captured images, captured sound, captured proximity data, and the like) back to controller 120. For example, one or more external cameras 235 may be deployed at one more locations along the exterior of mobile delivery frame 200 to visually monitor the external environment near the mobile delivery frame. External camera 235 may be implemented with a single camera or, in some embodiments, may be implemented using multiple camera sensors or elements to provide an expansive field of view and visual coverage relative to the external environment surrounding mobile delivery frame 200. Those skilled in the art will appreciate that external camera 235 may be implemented using camera or sensor elements that are sensitive to the visual spectrum as well as infrared or other spectrum to provide for full light sensitivity, low light sensitivity, and sensitivity in dark environments.

Using external camera 235, controller 120 may detect a person (e.g., participant 115) disposed external to the mobile delivery frame 200 by capturing an image of that person (or a portion of that person) as the sensor data using the external camera 235. Embodiments may employ image processing and/or machine vision hardware and firmware as part of implementations of external cameras 235 and/or as part of processing performed on controller 120 when detecting a person using such captured images. For example, an embodiment may have exemplary external camera 235 capture an image of an identifier worn by the person disposed external to the mobile delivery frame 200 as the sensor data using the external camera 235. Such an identifier may, for example, be a visual anchor or identifier worn by participant 115 (e.g., a logo on a hat or uniform visible on participant 115), a symbol visible on clothing worn by the participant 115, or a visual tag visible on the participant 115 (e.g., an identification tag with participant identifier information shown on the tag—such as the participant's name, employee information, employer information, employer logo, and the like).

Exemplary proximity sensor 220 is another example of an external sensor that may be disposed on mobility delivery frame 200 and used to detect a location of a person relative to the mobile delivery frame 200. Examples of such a proximity sensor 220 may include an infrared sensor, an ultrasonic sensor, a laser sensor, a LiDAR sensor, and the like that can monitor the exterior environment of mobile delivery frame 200 and detect a location of a person within that exterior environment (or indicate that the person or other object is within a threshold distance from mobile delivery frame 200).

Exemplary microphone 240 is yet another example of an external sensor that may be disposed on mobility delivery frame 200 and used to detect a person relative to the mobile delivery frame 200. Microphone 240 may be used to capture audio data as generated sensor data, and provide such captured audio data to controller 120 for comparison of such captured audio data to reference audio information on an authorized logistics transaction participant.

As noted above, controller 120 on exemplary personal delivery device 110 shown in FIG. 2 is also operatively coupled to a variety of exemplary internal sensors (e.g., internal camera 255, internal LiDAR sensor 260, internal weight scale 285). Exemplary internal camera 255 may be implemented with a single camera or, in some embodiments, may be implemented using multiple camera sensors or elements to provide an expansive monitoring field of view and visual coverage relative to the selectively opened storage area 130 within which items/objects may be loaded, stored, and unloaded as part of a dispatched logistics transaction. For example, one embodiment may include a single internal camera 255 that monitors what is loaded, stored, and unloaded relative to the selectively opened storage area 130 within mobile delivery frame 200. However, another embodiment may deploy internal camera 255 implemented with different camera sensors disposed to monitor different parts of selectively opened storage area 130 from different angles and fields of view. Those skilled in the art will appreciate that internal camera 255 may be implemented using camera or sensor elements that are sensitive to the visual spectrum as well as infrared or other spectrum to provide for full light sensitivity, low light sensitivity, and sensitivity in dark environments.

Using internal camera 255, controller 120 may identify a change in what is within the interior of the selectively opened storage area 130 based upon the image data generated by camera 255, and confirm the completion of a dispatched logistics transaction based upon the identified change in what is within the interior of the selectively opened storage area 130. Such a change may, for example, be identified using camera 255 as a reduction or increase in what is currently stored within the interior of the selectively opened storage area 130, or a numerical change of how many objects are currently stored within the interior of the selectively opened storage area 130.

Exemplary internal LiDAR sensor 260 generates mapping data representing what is stored within the interior of the selectively opened storage area 130 as the internal sensor data. Such mapping data may provide a depth map or three-dimensional representation of what is stored within area 130 of mobile delivery frame 200, and may also be used by controller 120 to identify changes in what is within the interior of area 130 based upon the mapping data generated by internal LiDAR sensor 260.

Exemplary internal weight scale 285, as another type of internal sensor, may also be deployed to monitor what is stored within the interior of the selectively opened storage area 130 of mobile delivery frame 200. In more detail, exemplary internal weight scale 285 may monitor a weight of what is stored within the interior of the selectively opened storage area 130 and provide weight data to controller 120, which may identify a change in weight of what is stored within area 130 as part of confirming aspects of the dispatched logistics transaction.

Those skilled in the art will further appreciate that embodiments of exemplary personal delivery device 110, such as that shown in FIGS. 1 and 2, may be powered by an onboard rechargeable power source (not shown). Such an onboard rechargeable power source may, for example, be implemented by an integrated battery, a multi-battery pack or removeable power pack with one or more cells, and the like. Such an onboard rechargeable power source may involve fuel cell technology, or other energy source technologies that may have a sufficient weight to power ratio so as to be useful for powering at least the above-described components deployed as part of exemplary personal delivery device 110.

In operation and with reference to FIG. 2, an embodiment of exemplary personal delivery device 110 is an apparatus that advantageously is deployed and operates as a technical solution to provide enhanced automated access, auto-authentication, and auto-confirmation as part of a dispatched logistics transaction, which may be initiated by dispatch server 100. Such an exemplary dispatched logistics transaction involves one or more shipment items (e.g., an item ordered for pickup and/or delivery, such as a retail item or a consumable food item) and a person disposed external to the personal delivery device apparatus (e.g., logistics transaction participant 115). Generally, exemplary personal delivery device 110, such as that shown configured in FIGS. 1 and 2, in an embodiment may have controller 120 being further operative to at least detect, using a first of the external sensors (e.g., proximity sensor 220, external camera 235, microphone 240), a person disposed external to the mobile delivery frame 200. Controller 120, in this embodiment, is then further operative to authenticate that the detected person disposed external to the mobile delivery frame 200 is an authorized participant to the dispatched logistics transaction based upon sensor data generated by the first of the external sensors and provided to the controller 120. Controller 120, in this embodiment, may also then be operative to activate actuator 225 to articulate the actuated door 135 to provide actuated access to the selectively opened storage area 130 within the mobile delivery frame 200 to permit the dispatched logistics transaction (e.g., loading of one or more shipment items or unloading of one or more shipment items) by the detected person when the detected person (e.g., participant 115) has been authenticated to be the authorized participant to the dispatched logistics transaction. FIGS. 3A-7C provide further details of in further embodiments involving the operation of exemplary personal delivery device 110 as an apparatus, while FIGS. 8A-8B provides details of an embodiment of an exemplary method for providing enhanced automated access to a dispatched personal delivery device (such as exemplary personal delivery device 110) operative to transport a shipment item.

In more detail, FIG. 3 is a diagram illustrating exemplary personal delivery device 110 as an apparatus approaching a potential participant 300 as part of an exemplary dispatched logistics transaction in accordance with an embodiment of the invention. Referring now to FIG. 3, exemplary personal delivery device 110 is shown relative to potential participant 300 as device 110 and participant 300 approach each other. In this example, exemplary personal delivery device 110 may be assigned and dispatched by server 100 as part of a logistics transaction where device 110 is to pickup or deliver one or more shipment items, such as a retail item (e.g., electronics, household wares, etc.) or consumable item (e.g., restaurant food, office supplies, etc.) ordered and being fulfilled via the dispatched logistics transaction. Information regarding the dispatched logistics transaction may be sent by dispatch server 100 through network 105 to exemplary personal delivery device 110 and received by device 110 via wireless communication interface 210/205. Exemplary logistics transaction information sent by dispatch server 100 may be stored by controller 120 (e.g., within memory 270 and accessible by processor 265). Potential participant 300, as shown in FIG. 3, may or may not be authorized to access device 110 (e.g., selectively opened storage area 130 within mobile delivery frame 200).

As shown in FIGS. 4A-4F, embodiments may have exemplary personal delivery device 110 using one or more different types of external sensor data representing physical aspects of the environment proximate and next to exemplary personal delivery device 110 as part of detecting potential participant 300 as a person disposed external to device 110 and attempting to authenticate potential participant 300 as an authorized participant to the dispatched logistics transaction in accordance with an embodiment of the invention. For example, potential participant 300, as shown in FIG. 3, may be detected by controller 120 by identifying that the potential participant 300 is moving towards the mobile delivery frame using sensor data generated by at least one of the external sensors deployed on exemplary personal delivery device 110. When authenticating such a potential participant 300, controller 120 generally obtains or otherwise receives the external sensor data (e.g., image data, sound data, distance data, and/or a combination of such external sensor data) and correlates such external sensor data to at least a portion of the logistics transaction information for this particular dispatched logistics transaction (e.g., reference data associated with an authorized participant to the particular dispatched logistics transaction including but not limited to visual information related to the authorized participant, audio reference information associated with the authorized participant, location information associated with the authorized participant, and/or a combination of such reference information). Embodiments may have authentication be successful when controller 120 determines there is a match to the reference data associated with the transaction's authorized participant, or at least a threshold correlation between the external sensor data provided to controller 120 and the reference data associated with the transaction's authorized participant.

Figure 4A:
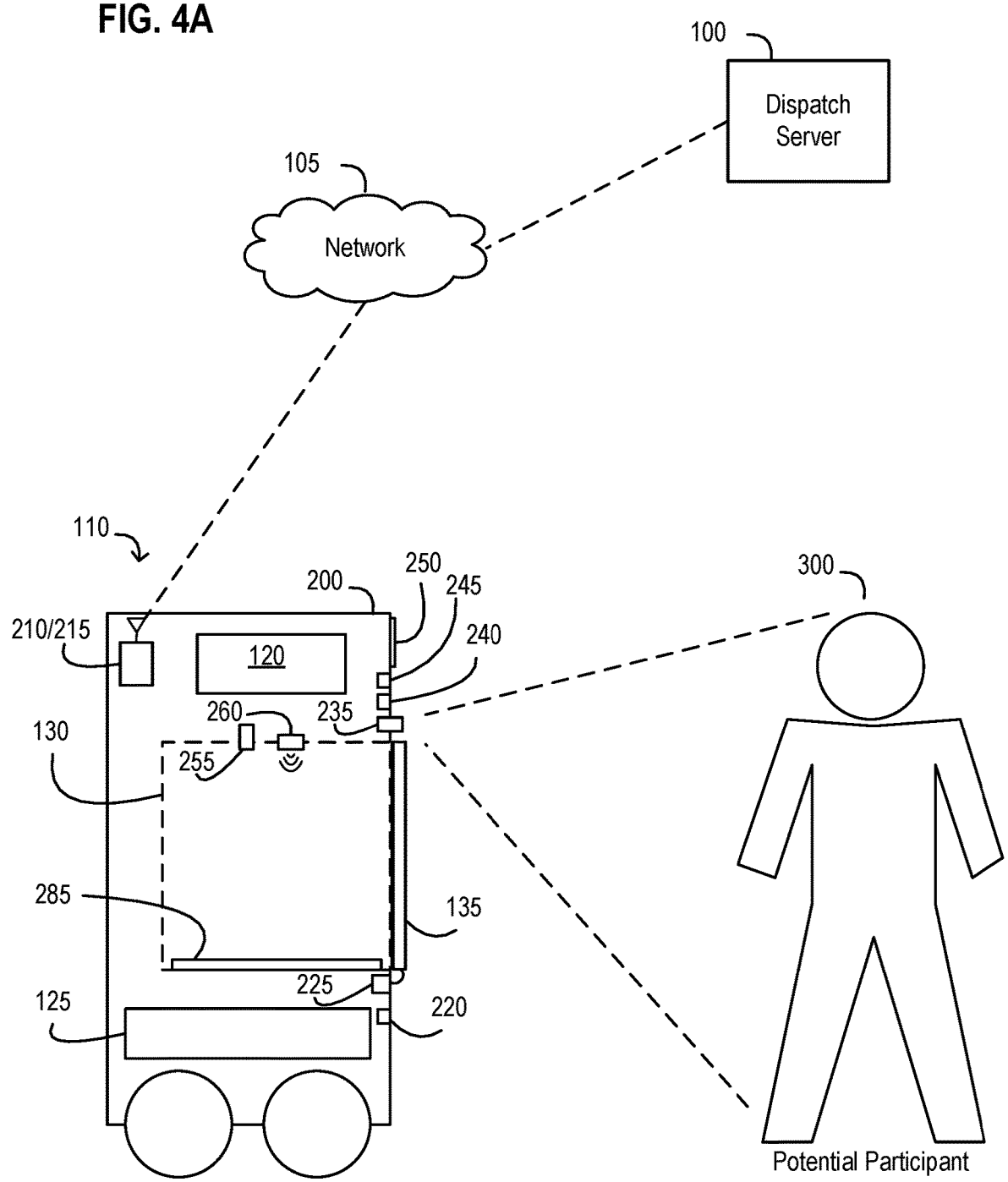
Figure 5A:
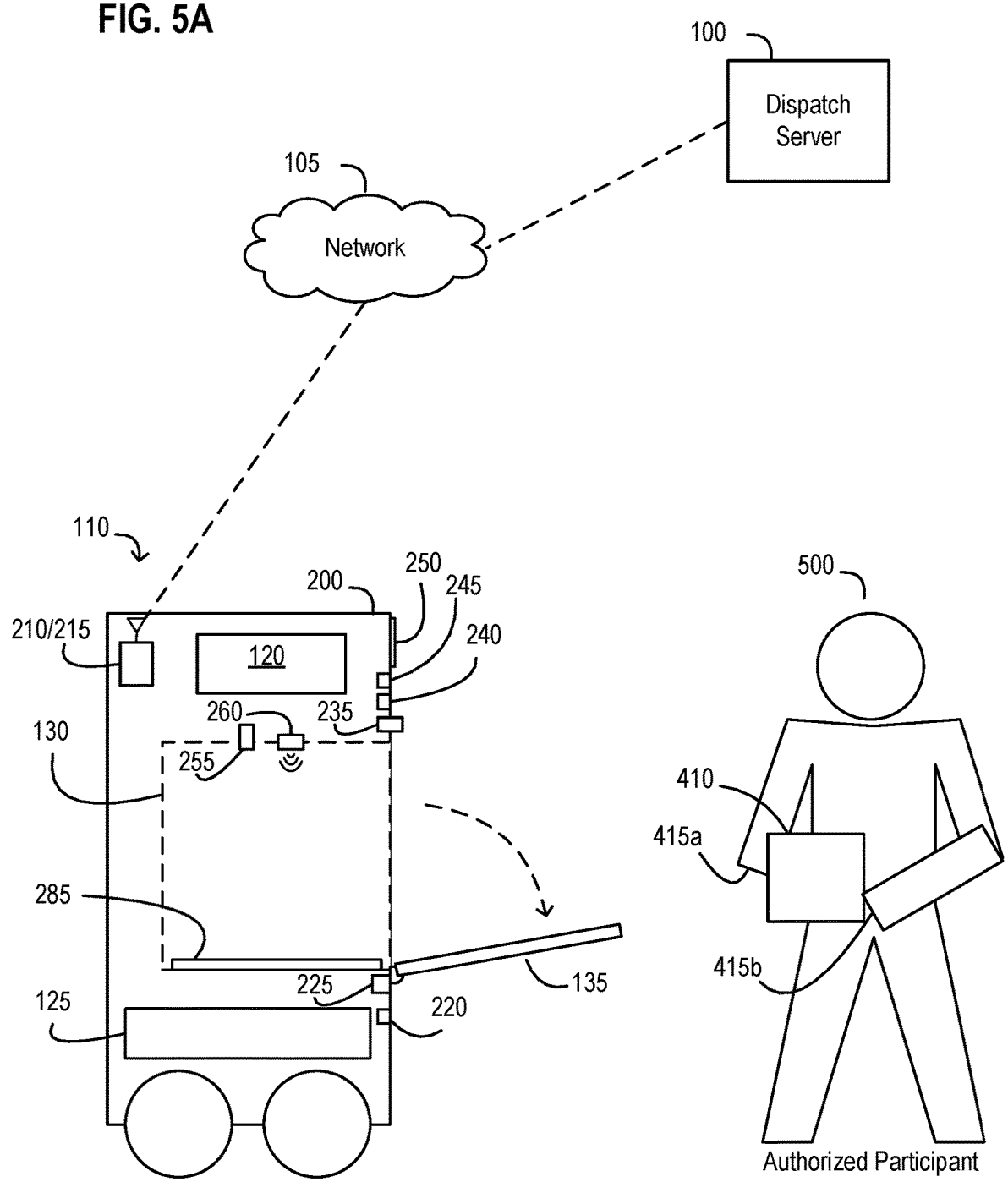
Figure 5B:
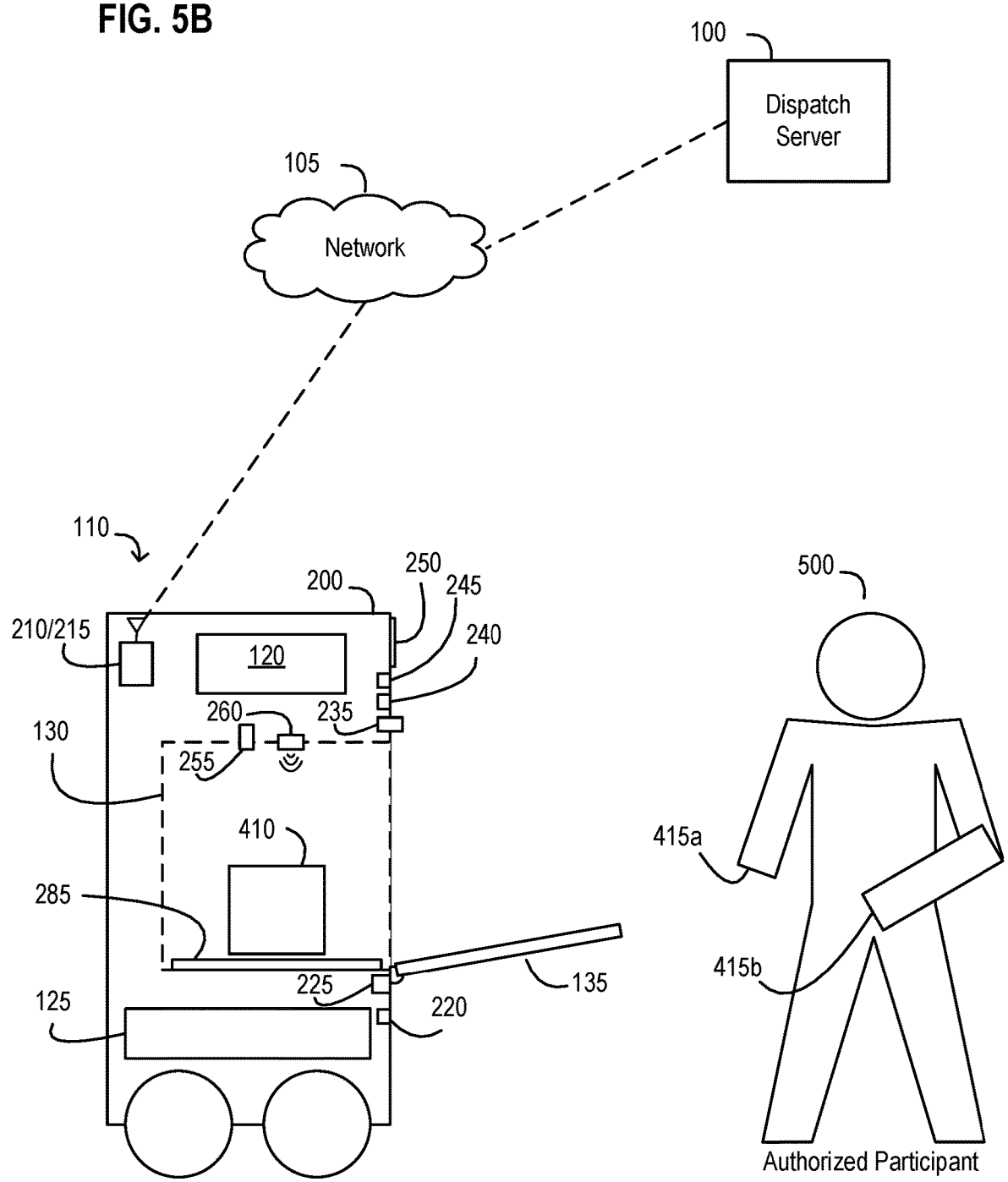

Referring now to FIG. 4A, potential participant 300 is shown external to mobile delivery frame 300. In an embodiment, exemplary personal delivery device 110 has its controller 120 programmatically operative to detect the person (i.e., potential participant 300) disposed external to the mobile delivery frame 200 by capturing an image of potential participant 300 as image sensor data using one or more elements of external camera 235. For example, an embodiment may have controller 120 receiving image sensor data from external camera 235 and process the received image sensor data to identify that an object within the field of view of external camera 235 is a person or a part of a person (e.g., potential participant 300 or features visible on participant 300). In another embodiment, external camera 235 may have supporting circuitry within it to pre-process the generated image sensor data (e.g., using a machine vision camera as the external camera 235a) and provide the results of such pre-processed information to controller 120 as the image sensor data. Based upon the captured image of the person (or portion of the person) as the sensor data generated by the external camera 235 and provided to controller 120, controller 120 is operative to authenticate that the detected potential participant 300 disposed external to the mobile delivery frame is the authorized participant to the dispatched logistics transaction. Such authentication may have controller 120 comparing the captured image of participant 300 or a portion of participant 300 to reference data associated with an authorized participant to the particular dispatched logistics transaction (e.g., exemplary reference data stored in memory 270 on exemplary personal delivery device 110) as noted above.

Figure 4B:
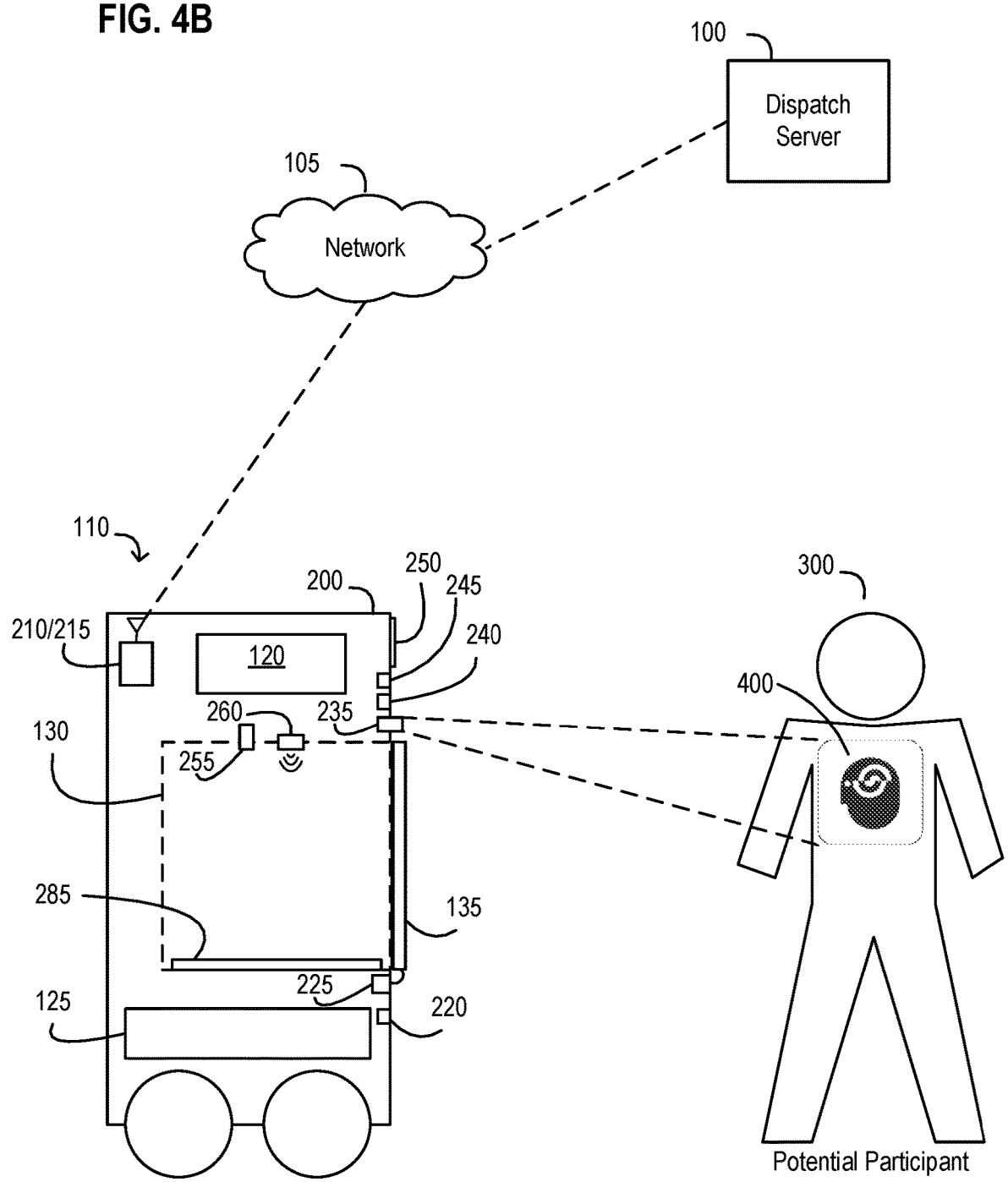
Figure 4C:
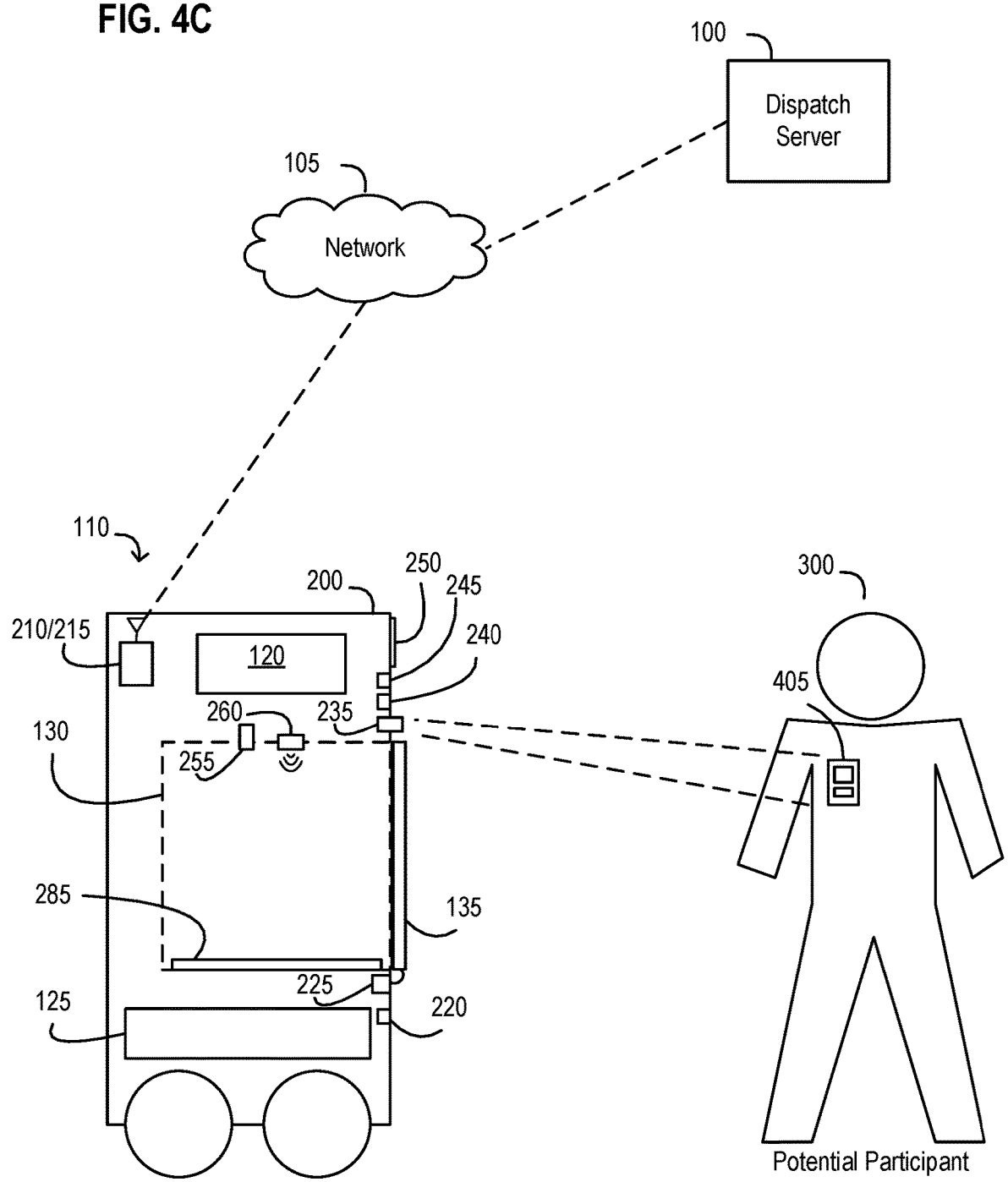

In another embodiment, the captured image of potential participant 300 may be an image of an identifier worn by participant 300 disposed external to the mobile delivery frame 200, as shown in FIGS. 4B and 4C, and controller 120 may be further operative to authenticate that potential participant 300 is the authorized participant to the dispatched logistics transaction based upon the captured image of that identifier worn by participant 300. Such authentication may have controller 120 comparing the captured image of the visual identifier worn by participant 300 or a portion of such a visual identifier worn by participant 300 to reference data associated with an authorized participant to the particular dispatched logistics transaction (e.g., exemplary reference data stored in memory 270 on exemplary personal delivery device 110) as noted above. For example, and referring now to FIG. 4B, external camera 235 may capture an image of an identifier worn by potential participant 300 where the captured image corresponds to a symbol 400 visible on clothing worn by participant 300. Such a symbol 400 may be a particular visual design (e.g., a uniform logo, stylized corporate name, stylized phrased) on a shirt, hat, jacket, or other outer visible clothing. Such a symbol 400 may be a combination of different visual designs on different clothing—e.g., one visual symbol on a hat and a different visual symbol on a shirt. Further still, such a symbol 400 may be operate as an identifier worn by participant 300 in the form of a particular color visible on clothing, a pattern of different colors visible on clothing, or a combination of a design (regardless of color) on a predetermined visible aspect of participant 300's clothing and a color on another predetermined visible aspect of participant 300's clothing.

In a further example shown in FIG. 4C, an exemplary identifier may come in the form of a visual tag 405 visible on potential participant 300. Controller 120 may be operative to capture an image of visual tag 405 or at least a portion of tag 405 (e.g., textual information on tag 405, image information on tag 405, a symbolic design appearing on tag 405, one or more colors visible on tag 405, or a combination thereof) worn by the potential participant 300 as the sensor data using external camera 235, and then authenticate that the detected person disposed external to the mobile delivery frame 200 is the authorized participant to the dispatched logistics transaction based upon the captured image of the visual tag 405 (or captured image of a particular portion of tag 405). Such authentication may have controller 120 comparing the captured image of tag 405 or a portion of tag 405 to reference data associated with an authorized participant to the particular dispatched logistics transaction (e.g., exemplary reference data stored in memory 270 on exemplary personal delivery device 110).

In another embodiment, controller 120 may be further programmatically operative to detect the person (i.e., potential participant 300) disposed external to the mobile delivery frame 200 by being operative to detect a location of that person relative to the mobile delivery frame 200 using proximity sensor 220. In more detail and with reference to FIG. 4D, an embodiment may have controller 120 receiving proximity sensor data (e.g., relative distance data) from proximity sensor 220 and process the received proximity sensor data to identify that an object is a person within a threshold distance from mobile delivery frame 200. Based upon the location of the participant 300 relative to mobile delivery frame 200 as indicated by the proximity sensor data (alone or in combination with other external sensor data), controller 120 may be operative to authenticate that the detected potential participant 300 disposed external to the mobile delivery frame 200 is the authorized participant to the dispatched logistics transaction. In more detail, such authentication may have controller 120 comparing the location of participant 300 using at least the proximity sensor data (alone or in combination with other external sensor data such as image sensor data captured by external camera 235, audio sensor data captured by microphone 240 (as shown in FIG. 4E), and/or additional location data on the current location of the exemplary personal delivery device 110 using location circuitry within controller 120) to reference data associated with an authorized participant to the particular dispatched logistics transaction (e.g., exemplary reference data stored in memory 270 on exemplary personal delivery device 110).

In further embodiments, the proximity sensor data received by controller 120 via proximity sensor 220 may be compared to a threshold distance value. When the proximity sensor data is less than such a threshold distance value (e.g., a relative distance from mobile delivery frame 200), controller 120 may be programmatically operative to trigger capture of image sensor data from external camera 235, audio sensor data from microphone 240 (as shown in FIG. 4E), and/or additional location data on the current location of the exemplary personal delivery device 110 from location circuitry within controller 120. In this way, controller 120 may authenticate that participant 300 disposed external to the mobile delivery frame is the authorized participant to the dispatched logistics transaction based upon different types of sensor data collected by different ones of the external sensors. More particularly, controller 120 may authenticate participant 300 is an authorized participant to the dispatched logistics transaction based upon different types of sensor data collected by different ones of the external sensors and comparing the multiple different types of captured or obtained external sensor data to reference data associated with an authorized participant to the particular dispatched logistics transaction (e.g., exemplary reference data stored in memory 270 on exemplary personal delivery device 110).

For example, with reference to FIG. 4E, proximity sensor data received by controller 120 via proximity sensor 220 may be compared to a threshold distance value of 6 feet. In this exemplary embodiment, controller 120 may be programmatically configured to be operative to detect that potential participant 300 disposed external to the mobile delivery frame 200 is within the 6 foot threshold distance from the mobile delivery frame, and then authenticate that the detected potential participant 300 is the authorized participant to the dispatched logistics transaction based upon (a) captured audio data as sensor data generated by microphone 240 and provided to controller 120, and (b) a comparison by controller 120 of the audio data to an audio reference related to the authorized participant to the dispatched logistics transaction. Such an audio reference may, for example, be part of the reference data associated with the authorized participant to the particular dispatched logistics transaction (e.g., exemplary reference data stored in memory 270 on exemplary personal delivery device 110). In some embodiments, controller 120 may be further operative to receive such an audio reference from dispatch server 100 (e.g., as part of the transaction reference data) using wireless communication interface 210/205 prior to detecting the potential participant 300 (e.g., upon dispatch or while in transit from the point of origin for the exemplary personal delivery device 110 prior to encountering potential participant). In other embodiments, controller 120 may be operative to request the audio reference from dispatch server 100 using wireless communication interface 210/205 upon detecting the potential participant 300 disposed external to the mobile delivery frame, and receive the audio reference from dispatch server 100 in response to the request for the audio reference.

In some embodiments, such as that shown in FIG. 4F, the potential participant 300 may have their hands 415a-415b full or otherwise occupied with a shipment item 410 to be loaded into exemplary personal delivery device 110. Referring now to FIG. 4F, such an embodiment may have controller 120 on exemplary personal delivery device 110 detecting a potential participant 300 disposed external to mobile delivery frame 200 by being operative to identify that this person is holding a shipment item 410 using, for example, external camera 235. More particularly, controller 120 may being operative to detect the potential participant 300 by being further operative to identify, using sensor data from one or more image sensing elements of the external camera 235, that the participant 300 has each hand 415a-415b occupied and is unable to physically interact with the exemplary personal delivery device 110 with either hand 415a-415b. Rather than relying upon providing physical user input via, for example, pressing keys or touching an interactive touchscreen or other physical user input device that may be deployed as a way of accepting authentication input, an embodiment may refine how exemplary personal delivery device 110 may detect a potential participant in the logistics transaction based on whether the person is carrying a shipment item. In more detail, controller 120 may use external camera 235 to identify the particular shipment item 410 being carried by the potential participant 300 as part of detecting the person disposed external to the mobile delivery frame 200 and/or as part of authenticating whether the detected person is an authorized participant to the dispatched logistics transaction. Identification of the particular shipment item 410 while being carried may be accomplished with the controller 120 using sensor data from external camera 235 that may identify aspects of the potential participant 300 (e.g., the participant's face, aspects of the participant's clothing, identifiers worn by the participant, and the like) as well as features of the particular shipment item 410 (e.g., size/shape of the item, color of the item, symbols or other visual identifiers on the item, and the like). Sensor data on such identified aspects of the potential participant 300 as well as identified aspects of the shipment item 410 may then be compared or otherwise correlated to portions of the logistics transaction information in memory 270 for this particular dispatched logistics transaction.

In some embodiments, controller 120 may have access to sufficient logistics transaction information within onboard memory 275 so as to be operative to authenticate the person disposed external to the mobile delivery frame 200 without requesting further information from server 100. However, in other embodiments, authentication may have controller 120 responsively interacting with server 100 as part of the authentication functionality of exemplary personal delivery device 110. For example, an embodiment may have controller 120 on exemplary personal delivery device 110 being operative to authenticate that the detected person disposed external to the mobile delivery frame 200 (e.g., potential participant 300) is the authorized participant to the dispatched logistics transaction based upon (a) sensor data generated by one or more of the external sensors on exemplary personal delivery device 110, and (b) an authentication response received from dispatch server 100 by controller 120 through wireless communication interface 210/205. In more detail, an embodiment may have controller 120 being operative to authenticate that the detected potential participant 300 is the authorized participant to the dispatched logistics transaction by being further operative to receive the sensor data generated by one or more of the external sensors (e.g., sensor data reflecting an observed parameter or aspect related to the detected potential participant 300); cause wireless communication interface 210/205 to transmit an authorization confirmation message to dispatch server 100 based upon the external sensor data; receive an authentication response from dispatch server 100 through wireless communication interface 210/205 (e.g., the authenticating response reflecting whether the observed parameter related to the detected potential participant 300 indicates the detected participant 300 is the authorized participant to the dispatched logistics transaction); and authenticate that detected potential participant 300 outside of mobile delivery frame 200 is the authorized participant to the dispatched logistics transaction based upon at least the authentication response received from dispatch server 100. In such an embodiment, the observed parameter may be an image of the potential participant 300 (or a portion of the participant 300) captured as the sensor data using external camera 235; an image of an identifier worn by the potential participant 300 captured as the sensor data using external camera 235; or proximity triggered captured sensor data (e.g., images or audio data). Such an identifier may, for example, include one or more of a uniform logo visible on the person, a symbol visible on clothing worn by the person, and a visual tag visible on the person.

A further embodiment may have controller 120 being operative to authenticate that a detected person disposed external to the mobile delivery frame 200 is the authorized participant to the dispatched logistics transaction based upon (a) sensor data generated by multiple external sensors deployed on exemplary personal delivery device 110 and (b) an authentication response received by controller 120 from dispatch server 100. For example, the sensor data generated by multiple external sensors on device 110 may include (i) image data generated by external camera 235 where such image data reflects an observed parameter associated with the potential participant 300 disposed external to the mobile delivery frame 200; and (ii) location data generated by proximity sensor 220 where such location data reflects a location of the detected potential participant 300 relative to the dispatched exemplary personal delivery device 110. More specifically, the image data may be generated by external camera 235 as triggered by the location data generated by proximity sensor 220 when the location data indicates the location of the person disposed external to the mobile delivery frame is within a threshold proximity distance from the mobile delivery frame. In another example, the sensor data generated by multiples external sensors on device 110 may include (i) audio data generated by microphone 240 where the audio data captured includes sound emanating from the potential participant 300 disposed external to the mobile delivery frame 200; and (ii) location data generated by proximity sensor 220 where the location data reflects a location of the potential participant 300 disposed external to the mobile delivery frame 300 relative to the mobile delivery frame 300. Such audio data may, in some embodiments, be generated by microphone 240 as triggered by the location data generated by proximity sensor 220 when the location data indicates the location of the potential participant 300 is within a threshold proximity distance from the mobile delivery frame 200.

In some embodiments, the authentication response received from dispatch server 100 may be or include a responsive action message causing controller 120 to initiate a responsive change in operation of exemplary personal delivery device 110 as part of authenticating the potential participant 130 disposed external to the mobile delivery frame 200. Such a responsive change in operation of the device 110 may, for example, have controller 120 being operative to generate an authentication notification for the detected potential participant 300 that provides information related to the responsive action message. In more detail, such an authentication notification may be generated by controller 120 as an audible message provided through speaker 245, a visual message provided through on user interface display 250, and/or a wireless communication message transmitted, using wireless communication interface 210/205, to a mobile user device (such as mobile device 700 shown in FIG. 7C) operated by the detected potential participant 300 disposed external to the mobile delivery frame 200.

Once authenticated by controller 120, embodiments may have controller 120 initiate actuation of the door 135 to provide the potential participant (now authenticated to be an authorized participant) with touchless automated access to within selectively opened storage area 130 within the mobile delivery frame 200 so that the participant may load/unload one or more shipment items as part of the dispatched logistics transaction. FIGS. 5A-5C are a series of diagrams illustrating exemplary enhanced access to a storage area within the exemplary personal delivery device apparatus in accordance with an embodiment of the invention. Referring now to FIG. 5A, exemplary authorized participant 500 is shown having been authenticated by controller 120 and where controller 120 is then operative to activate actuator 225 to articulate actuated door 135 to provide actuated access to selectively opened storage area 130 within mobile delivery frame 200 to permit the dispatched logistics transaction by the detected and authenticated authorized participant 500. As shown in FIG. 5A, controller 120 may generate a door actuation signal to cause actuator 225 to articulate the actuated door 135 to an open position providing access to within selectively opened storage area 130. As shown in FIG. 5B, authorized participant 500 may then place shipment item 410 within selectively opened storage area 130. And, as shown in FIG. 5C, controller 120 may then generate door actuation signal to cause actuator 225 to articulate the actuated door 135 to a closed position sealing the selectively opened storage area 130. In some embodiments, exemplary personal delivery device 110 may also include an actuatable lock (not shown) for door 135, which may be coupled to controller 120 and actuated in response to the door actuation signal to alternatively provide access to within selectively opened storage area 130 (e.g., cause the lock to move to an unlocked position) and to seal selectively opened storage area 130 (e.g., cause the lock to move to a locked position preventing access to within area 130).

While FIGS. 5A-5C illustrate embodiments where the dispatched logistics transaction has authorized participant 500 loading shipment item 410 into selectively opened storage area 130 of exemplary personal delivery device 110, those skilled in the art will appreciate that similar principles apply to authenticating and providing automated touchless access to area 130 for unloading one or more items from within exemplary personal delivery device 110 in an unloading aspect of a dispatched logistics transaction. In general, while a dispatched logistics transaction may be considered to involve either loading or unloading of one or more shipment items (e.g., shipment item 410), those skilled in the art will also appreciate that an exemplary dispatched logistics transaction in other embodiments may involve encounters with multiple potential participants and involve multiple authorized participants. For example, a multi-piece order may be fulfilled using an exemplary personal delivery device (such as device 110). Dispatch server 100 may initiate a multi-part dispatched logistics transaction using an exemplary personal delivery device where a first authorized participant for that dispatched logistics transaction may be responsible for loading a first shipment item, a second authorized participant for the dispatched logistics transaction may be responsible for loading a second shipment item at a different location, and a third authorized participant for the same dispatched logistics transaction may be responsive for unloading one or both shipment items. As such, a dispatched logistics transaction, as used in different embodiments herein, may involve a single loading/unloading task or, in some embodiments, involve multiple loading/unloading tasks related to a particular order being fulfilled with the dispatched logistics transaction.

Once an item is loaded or unloaded as part of a dispatched logistics transaction involving an exemplary personal delivery device 110, embodiments may further have controller 120 initiate an auto-confirmation process that automatically identifies, assesses, and confirms what has been loaded, unloaded, or changed with respect to the contents maintained within selectively opened storage area 130 using one or more internal sensors disposed on exemplary personal delivery device 110. FIGS. 6A-6B are diagrams illustrating exemplary auto-confirmation of what is stored within the storage area within the exemplary personal delivery device apparatus as a result of the dispatched logistics transaction in accordance with an embodiment of the invention.

Referring now to FIG. 6A, an embodiment has internal camera 255 (an exemplary internal sensor disposed on mobile delivery frame 200) monitoring an interior of selectively opened storage area 130. In this embodiment, controller 120 may be further operative to automatically confirm completion of the dispatched logistics transaction using internal sensor data (e.g., image data) generated by internal camera 255. In more detail, controller 120 may be further operative to automatically confirm completion of the dispatched logistics transaction by being further operative to identify a change in what is within the interior of selectively opened storage area 130 based upon the internal image data generated by camera 255, and confirm the completion of the dispatched logistics transaction based upon the identified change in what is within the interior of the selectively opened storage area. For example, such an identified change may be a reduction in what is currently stored within the interior of selectively opened storage area 130; an increase in what is currently stored within the interior of selectively opened storage area 130; or a numerical change of how many objects are currently stored within the interior of selectively opened storage area 130. As shown in FIG. 6A, exemplary internal camera 255 may generate internal image data showing the insertion of shipment item 410 (in addition to item 600 that may have already been within area 130).

Referring now to FIG. 6B, another embodiment has internal LiDAR sensor 260 (another type of exemplary internal sensor disposed on mobile delivery frame 200) monitoring the interior of selectively opened storage area 130. In this embodiment, controller 120 may be further operative to automatically confirm completion of the dispatched logistics transaction using internal sensor data (e.g., mapping data) generated by internal LiDAR sensor 260. In more detail, controller 120 may be further operative to automatically confirm completion of the dispatched logistics transaction by being further operative to identify a change in what is within the interior of selectively opened storage area 130 based upon the internal mapping data generated by LiDAR sensor 260, and confirm the completion of the dispatched logistics transaction based upon the identified change in what is within the interior of selectively opened storage area 130. Like with the embodiment described above monitoring using internal camera 255, such an identified change using mapping data from LiDAR sensor 260 may be a reduction in what is currently stored within the interior of selectively opened storage area 130; an increase in what is currently stored within the interior of selectively opened storage area 130; or a numerical change of how many objects are currently stored within the interior of selectively opened storage area 130. As shown in FIG. 6A, exemplary internal LiDAR sensor 260 may generate internal mapping data showing the insertion of shipment item 410 (in addition to item 600 that may have already been within area 130).

Still referring to FIGS. 6A and 6B, yet another embodiment has internal weight scale 285 (as another type of exemplary internal sensor disposed on mobile delivery frame 200) monitoring the interior of selectively opened storage area 130. In this embodiment, controller 120 may be further operative to automatically confirm completion of the dispatched logistics transaction using internal sensor data (e.g., weight data represent a weight of what is stored within the interior of selectively opened storage area 130) generated by internal weight scale 285. In more detail, controller 120 may be further operative to automatically confirm completion of the dispatched logistics transaction by being further operative to identify a change in weight of what is within the interior of selectively opened storage area 130 based upon the internal weight data generated by internal weight scale 285, and confirm the completion of the dispatched logistics transaction based upon the identified change in weight of what is within the interior of selectively opened storage area 130.

Still additional embodiments may have controller 120 being operative to automatically confirm completion of the dispatched logistics transaction using multiple types of internal sensor data (e.g., image data over time showing a change in what is stored within area 130, mapping data over time showing a change in what is stored within area 130, and/or weight data over time showing a change in weight of what is stored within area 130). In some embodiments, some internal sensors may be disposed to monitor particular parts of area 130 and, thus multiple sets of internal sensor data over time may be used as part of automatically confirming completion of the dispatched logistics transaction.

Upon closure of area 130 (such as that shown in FIG. 5C) and when such internal sensor data indicates an appropriate shipment item and/or the right number of shipment items have been loaded/unloaded according to what is anticipated for the dispatched logistics transaction (e.g., as reflected in the logistics transaction information stored in memory 275 of controller 120 for the particular dispatched logistics transaction involving exemplary personal delivery device 110), controller 120 confirms completion of the dispatched logistics transaction and initiates movement of device 110 away from participant 500.

However, if controller 120 is unable to autonomously confirm completion of the dispatched logistics transaction, some embodiments may have controller 120 cause or initiate a corrective change in movement of mobile delivery frame 200 (e.g., halt movement of device 110 to its next destination, change direction of movement of device 110, turn device 110 around and return to the location where area 130 was last accessed, and the like). Controller 120 may alternatively or also generate a corrective notification providing a corrective action message to the authorized participant 500. Such a corrective notification may, for example, be implemented as an audible message provided through speaker 245, a visual message provided through user interface display 250, and/or a wireless communication message provided by wireless communication interface 210/205 to a mobile user device operated by the authorized participant 500 (e.g., exemplary mobile device 700) as generally reflected in FIGS. 7A-7C. Such a corrective action message provided as part of the corrective notification may, for example, include information about errant loading of selectively opened storage area 130 for the dispatched logistics transaction and a request to correct the errant loading. In another situation, such a corrective action message provided in the corrective notification may, for example, include information about errant unloading of selectively opened storage area 130 for the dispatched logistics transaction and a request to correct the errant unloading.

In some embodiments, exemplary personal delivery device 110 may report confirmation details to dispatch server 100 or may involve dispatch server 100 as part of the auto-confirmation process. For example, an embodiment may have controller 120 being further operative to cause wireless communication interface 210/205 to transmit a content confirmation message to dispatch server 100 based upon internal sensor data generated by the internal sensor(s) monitoring what is stored within interior of selectively opened storage area 130. In more detail, the content confirmation message sent to dispatch server 100 may include a type of corrective action message indicating what is stored within the interior of selectively opened storage area 130 is inconsistent with an anticipated transaction parameter for the dispatched logistics transaction (e.g., part of the logistics transaction information stored in memory 275 of controller 120 for the particular dispatched logistics transaction involving exemplary personal delivery device 110). Such an anticipated transaction parameter may, for example, be an identification of what is stored within the interior of selectively opened storage area; a numerical value of items making up what is stored within the interior of selectively opened storage area 130; and/or a weight related to what is stored within the interior of the selectively opened storage area.

In response to the content confirmation message sent to dispatch server 100, further embodiments may have server 100 directing exemplary personal delivery device 110 as to how to initiate an appropriate response. For example, controller 120 of exemplary personal delivery device 110 may be further operative to receive, via wireless communication interface 210/205, a corrective action message from dispatch server 100 in response to the content confirmation message sent to dispatch server 100; and cause a corrective change in movement of mobile delivery frame 200 as indicated by the corrective action message.

More specifically, an embodiment with propulsion system 125 disposed on mobile delivery frame 200 may have propulsion system 125 being operative to accept the motion control signal from controller 120 that directs propulsion system 125 to move in a desired manner according to the corrective action message (e.g., halt, change speed of movement, change direction of movement). In such an embodiment, controller 120 is operative to cause the corrective change in movement of mobile delivery frame 200 by being operative to generate a corrective movement control input signal for propulsion system 125 as the motion control signal. Upon receipt of the corrective movement control input signal, propulsion system 125 alters movement of the mobile delivery frame 200.

In such an embodiment, controller 120 may be further operative to generate a corrective notification for the detected person disposed external to mobile delivery frame 200 (e.g., participant 500), where the corrective notification provides information related to the corrective action message (e.g., information about errant loading of selectively opened storage area 130 for the dispatched logistics transaction and a request to correct the errant loading, or information about errant unloading of selectively opened storage area 130 for the dispatched logistics transaction and a request to correct the errant unloading).

FIGS. 7A-7C are diagrams illustrating exemplary corrective notifications as exemplary responsive actions based upon auto-confirmation in accordance with one or more embodiments of the invention. Referring now to FIG. 7A, the corrective notification may be implemented with controller 120 generating a visual message provided through user interface display 250 on mobile delivery frame 200. As shown in FIG. 7B, the corrective notification may be implemented with controller 120 generating an audible message provided through speaker 245 on mobile delivery frame 200. And as shown in FIG. 7C, the corrective notification may be implemented with controller 120 generating a wireless communication message provided by wireless communication interface 201/205 to a mobile user device 700 operated by the detected person (e.g., authorized participant 500) disposed external to the mobile delivery frame 200. Controller 120 may access a portion of the logistics transaction information for this particular dispatched logistics transaction (e.g., reference data associated with an authorized participant to the particular dispatched logistics transaction that may identify mobile user device 700 associated with and operated by participant 500) as part of generating and causing transmission of such a wireless communication message to participant 500.

In light of the above-described embodiments involving exemplary personal delivery device 110 and its features and operation, further embodiments may focus on a system that combines exemplary personal delivery device 110 with dispatch server 100 as an embodiment of an enhanced dispatching system for a dispatched logistics transaction related to a shipment item. In general, such a system embodiment has a mobile personal delivery device (such as exemplary personal delivery device 110) and a dispatch server (such as dispatch server 100) that collectively and interactively operates as described above. For example, an embodiment of such a system may operate by initiating the dispatched logistics transaction, detecting the potential participant to the logistics transaction, authenticating whether the detected potential participant is an authorized participant in a touchless autonomous or server-assisted manner, providing access to storage within the dispatched exemplary personal delivery device (e.g., selectively opened storage area 130), auto-confirming aspects of the logistics transaction via autonomous and/or server-assisted interactions with the exemplary personal delivery device, and causing responsive autonomous and/or server-directed corrective operation of the mobile personal delivery device (e.g., movement of exemplary personal delivery device 110, and/or corrective notification(s) to the authorized participant 500) so as to provide a robust technical solution to one or more of the problems set out above.

In more detail, an enhanced dispatching system for a dispatched logistics transaction related to a shipment item is described below in accordance with an embodiment of the invention. The exemplary dispatch system in this embodiment has a dispatch server (e.g., dispatch server 100) operative to generate logistics transaction information related to the dispatched logistics transaction (as explained above), and a mobile personal delivery device (e.g., exemplary personal delivery device 110) assigned by dispatch server 100 to facilitate the dispatched logistics transaction. As part of the exemplary dispatch system, the mobile personal delivery device has a mobile delivery frame (e.g., mobile delivery frame 200), a selectively opened storage area (e.g., area 130 within frame 200) disposed within the mobile delivery frame that can maintain and transport the shipment item, an actuated door (e.g., door 135) on the mobile delivery frame that provides actuated access to the selectively opened storage area, and an actuator (e.g., door actuator 225) coupled to the actuated door. In this configuration, the actuator is responsive to a door actuation signal to articulate the actuated door between a closed position sealing the selectively opened storage area and an open position providing access to the selectively opened storage area. The system's mobile personal delivery device further includes a controller (e.g., controller 120) disposed within the mobile delivery frame, where the controller is coupled to the actuator and operative to generate the door actuation signal to cause the actuator to articulate the actuated door. The system's mobile personal delivery device also includes a wireless communication interface, one or more external sensors, and one or more internal sensors. The wireless communication interface (e.g., interface 201/205) is coupled to the controller, and operative to communicate with the dispatch server. The external sensors (e.g., external camera 235, microphone 240, proximity sensor 220, and the like) on the system's mobile personal delivery device are each disposed on the mobile delivery frame, coupled to the controller, and disposed in an orientation on the mobile delivery frame so that each external sensor is operative to monitor an external environment relative to the mobile delivery frame. The internal sensors (e.g., internal camera 255, internal LiDAR sensor 260, internal weight scale 285, and the like) within the system's mobile personal delivery device are each disposed within the mobile delivery frame, coupled to the controller, and disposed in an orientation within the mobile delivery frame to monitor an interior of the selectively opened storage area.

The controller of the system's mobile personal delivery device is programmatically adapted and specially configured to be operative to (a) detect, using the external sensor, a person disposed external to the mobile delivery frame. For example, controller 120 may use external camera 235 to detect potential participant 300 outside of mobile delivery frame 200.

The controller of the system's mobile personal delivery device is further programmatically adapted and specially configured to be operative to (b) authenticate that the detected person disposed external to the mobile delivery frame is an authorized participant to the dispatched logistics transaction based upon sensor data generated by the external sensor and provided to the controller. For example, controller 120 may use image data generated by external camera 235 to authenticate that potential participant 300 is an authorized participant to the dispatched logistics transaction (e.g., that participant 300 is the grocery store employee authorized to load area 130 of exemplary personal delivery device 110 according to the image data compared or correlated to reference data in logistics transaction information stored in memory 270).

The controller of the system's mobile personal delivery device is further programmatically adapted and specially configured to be operative to (c) activate the actuator to articulate the actuated door to provide actuated access to the selectively opened storage area within the mobile delivery frame to permit the dispatched logistics transaction by the detected person when the detected person has been authenticated to be the authorized participant to the dispatched logistics transaction. For example, controller 120 may generate a door actuation signal to articulate door 135 to an open state, which provides access to selectively opened storage area 130 within frame 200 once participant 300 has been authenticated.

The controller of the system's mobile personal delivery device is further programmatically adapted and specially configured to be operative to (d) determine an auto-confirm status of the dispatched logistics transaction using internal sensor data generated by the internal sensor that monitors the interior of the selectively opened storage area. Here, the auto-confirm status reflects whether the dispatched logistics transaction is complete (e.g., whether the right item(s) have been loaded or unloaded as part of the dispatched logistics transaction involving this authorized participant). For example, controller 120 may assess internal sensor data from internal camera 255, LiDAR sensor 260 and/or internal weight scale 285 over the time when access has been provided to authorized participant 500 to determine the auto-confirm status for the dispatched logistics transaction. Controller 120, as part of this assessment, may compare, correlate, or otherwise consider logistics transaction information relative to the internal sensor data over such time.

The controller of the system's mobile personal delivery device is further programmatically adapted and specially configured to be operative to (e) cause the wireless communication interface to transmit a content confirmation message to the dispatch server based upon the internal sensor data generated by the internal sensor and the auto-confirm status of the dispatched logistics transaction.

The system's dispatch server in this embodiment is operative to receive such a content confirmation message and responsively generate a corrective action message to the mobile personal delivery device. The controller of the system's mobile personal delivery device is further operative to receive, via the wireless communication interface, the corrective action message from the dispatch server; and cause a corrective change in operation of the mobile personal delivery device as indicated by the corrective action message. Such a corrective change in operation of the mobile personal delivery device may, for example, be causing a corrective change in movement of the mobile delivery frame as indicated by the corrective action message, and/or generating a corrective notification for the detected person disposed external to the mobile delivery frame (e.g., the authorized participant 500 that recently caused door 135 to close and seal area 130), where the corrective notification provides information related to the corrective action message (e.g., information about an errant interaction (such as errant loading and/or unloading) with the selectively opened storage area within the mobile delivery frame as part of the dispatched logistics transaction and a request to correct the errant interaction).

In a further embodiment, such a system may have the mobile personal delivery device further having a speaker coupled to the controller and disposed on an exterior of the mobile delivery frame (where the speaker can generate sound outside the mobile delivery frame), and a user interface display coupled to the controller and disposed on an exterior of the mobile delivery frame. As such, the corrective notification may be implemented as a combination of at least two of an audible message provided through the speaker, a visual message provided through the user interface display, and a wireless communication message provided by the wireless communication interface to a mobile user device operated by the detected person disposed external to the mobile delivery frame (e.g., authorized participant 500).

Further system embodiments may use types of external sensors described above, may have mobile personal delivery device use a combination of external sensors and/or triggering of some external sensors using the others of the external sensors. Further system embodiments may also use types of internal sensors described above, may have mobile personal delivery device use a combination of internal sensors and/or triggering of some internal sensors to monitor the interior storage area of the mobile personal delivery device over specific time periods. Further system embodiments may also have mobile personal delivery device interact with the dispatch server as part of the authentication process, and in other embodiments interact with the dispatch server as part of the auto-confirmation process consistent with embodiments described above relative to exemplary personal delivery device 110 and dispatch server 100.

In light of the above description of various apparatus and system embodiments described above, various embodiments for exemplary methods that provide enhanced automated access to a dispatched personal delivery device operative to transport a shipment item are described below. Such embodiments may be implemented using the exemplary personal delivery device 110 and, in some embodiments, exemplary dispatch server 100 as described above and as each operates and interacts as distinct and different elements to implement new and advantageous steps in a method that leverages such elements to provide a technical solution for accessing a personal delivery device as part of a dispatched logistics transaction, autonomous and server-assisted authentication of the potential participant to the transaction, autonomous and server-assisted confirmation of the participant's interaction with the personal delivery device during the transaction, and enhanced operation of the personal delivery device as exemplary responsive actions to the confirmation process.

For example, a general method embodiment may include a method for providing enhanced automated access to a dispatched personal delivery device (such as exemplary personal delivery device 110) operative to transport a shipment item within a selectively opened storage area within the dispatched personal delivery device as part of a dispatched logistics transaction involving the shipment item. For example, such a method in this general embodiment may begin with the step of detecting, using a first of a plurality of external sensors on the dispatched personal delivery device 110, a person (such as potential participant 300) disposed external to the dispatched personal delivery device 110. The method proceeds to have a controller (e.g., controller 120) on the dispatched personal delivery device 110 authenticating that the detected person disposed external to the dispatched personal delivery device is an authorized participant to the dispatched logistics transaction based upon sensor data generated by the first of the external sensors and provided to the controller 120. The method then proceeds to have an actuator (such as actuator 225) providing access to the selectively opened storage area 130 within the dispatched personal delivery device 110 to permit the dispatched logistics transaction by the detected person 300 when the detected person has been authenticated to be the authorized participant to the dispatched logistics transaction (such as authorized participant 500).

Consistent with the above-described method but with more detail, FIGS. 8A-8B are collectively a flow diagram of an embodiment of an exemplary method for providing enhanced automated access to a dispatched personal delivery device operative to transport a shipment item in accordance with an embodiment of the invention. Referring now to FIG. 8A, exemplary method 800 begins at step 805 where a dispatch server initiates or dispatched a mobile personal delivery device (PDD, such as exemplary personal delivery device 110) for a dispatched logistics transaction. Such a logistics transaction information may be loading or unloading of one or more shipment items into the selectively opened storage area within the dispatched personal delivery device. For example, a grocery store may use a dispatch server, such as exemplary dispatch server 100, when attempting to fulfil a particular order for groceries (i.e., one or more shipment items). The dispatch server may take in an order, and generate logistics transaction information related to the order and send the logistics transaction information to an assigned personal delivery device (such as exemplary personal delivery device 110). Device 110, with the logistics transaction information stored within its memory 270, may begin transit to pickup and/or delivery the ordered groceries.

At step 810, method 800 continues with a controller and propulsion system on the personal delivery device causing movement of the personal delivery device. For example, controller 120 and propulsion system 125 of exemplary personal delivery device 110 may cause device 110 to move from a warehouse or other logistics storage location to a grocery store in order to pickup the ordered groceries. In this example, the logistics transaction information stored within memory 270 of device 110 for this particular dispatched logistics transaction may, for example, include information on what and how many grocery items are to be picked up as part of the order, reference data associated with an authorized participant to the particular dispatched logistics transaction (e.g., visual information related to the authorized participant that will load the ordered grocery items, audio reference information associated with the authorized participant, location information associated with the authorized participant), and information on further locations where another pickup/delivery may occur as part of the dispatched logistics transaction.

At step 815, method 800 detects, using a first of multiple external sensors on the dispatched personal delivery device, whether a person is disposed external to the dispatched personal delivery device. If not, method 800 proceeds back to step 810 where the personal delivery device continues on its transit as part of the dispatched logistics transaction. But if so, step 815 proceeds to step 820.

In one embodiment of step 815, the first of the external sensors may be an external camera (such as external camera 235). As such, step 815 in this particular embodiment may involve detecting the person disposed external to the dispatched personal delivery device by capturing an image of the person disposed external to the dispatched personal delivery device as the sensor data using the external camera. For example, the captured image may be of an identifier worn by the person disposed external to the dispatched personal delivery device as the sensor data using the external camera. The identifier may, for example, be a uniform logo visible on the person, a symbol visible on clothing worn by the person, or a visual tag visible on the person. Such an identifier may, for example, be a visual anchor or identifier worn by the person (e.g., a logo on a hat or uniform visible on participant 115), a symbol visible on clothing worn by the participant 115, or a visual tag visible on the participant 115 (e.g., an identification tag with participant identifier information shown on the tag—such as the participant's name, employee information, employer information, employer logo, and the like).

In another embodiment of step 815, the first of the external sensors may be a proximity sensor (such as a LiDAR sensor). As such, step 815 in this particular embodiment may involve detecting the person disposed external to the dispatched personal delivery device by detecting a location of the person relative to the dispatched personal delivery device as the sensor data using the proximity sensor.

In yet another embodiment of step 815, detecting may be accomplished using multiple sensors, such as a microphone (e.g., microphone 240) that is triggered by a proximity sensor (e.g., proximity sensor 220). In this embodiment, step 815 becomes detecting the person disposed external to the dispatched personal delivery device using sensor data generated by the proximity sensor, where the sensor data indicates an object within a threshold distance from the dispatched personal delivery device, and then authenticating in step 820 using audio data captured by the microphone when triggered by the proximity sensor data indication of the object being within the threshold distance.

In still another embodiment of step 815, detecting may involve automated inspection of movement of a person towards the dispatched personal delivery device and/or an inspection of the hands of such a person. For example, in such an embodiment, detecting may be implemented by identifying, using an external sensor (such as an external camera, a proximity sensor, or a combination of both such external sensors), that the person disposed external to the dispatched personal delivery device is moving towards the dispatched personal delivery device. In more detail, such detecting may involve identifying, using one or more external sensors, that the person disposed external to the dispatched personal delivery device to be holding the shipment item. And in more particular detail, such detecting in step 815 may involve identifying, using one or more external sensors, that the person disposed external to the dispatched personal delivery device has each hand occupied and is unable to physically interact with the dispatched personal delivery device with either hand.

At step 820, method 800 proceeds with the controller on the dispatched personal delivery device authenticating that the detected person disposed external to the dispatched personal delivery device is an authorized participant to the dispatched logistics transaction based upon sensor data generated by the first external sensor (or a combination of external sensors) and provided to the controller. In more detail, the controller on the dispatched personal delivery device may accomplish authenticating that the detected person disposed external to the dispatched personal delivery device is the authorized participant to the dispatched logistics transaction based upon the captured image of the person as the sensor data generated by the external camera and provided to the controller. For example, the stored logistics transaction information may include visual information on the grocery store employee responsible to load the ordered groceries into the dispatched personal delivery device for this particular order and dispatched logistics transaction.

In a further embodiment, step 820 may have the controller authenticating that the detected person disposed external to the dispatched personal delivery device is the authorized participant to the dispatched logistics transaction based upon the captured image of an identifier worn by the person as the sensor data generated by the external camera and provided to the controller. Such an identifier, for example, may be a uniform logo visible on the person, a symbol visible on clothing worn by the person, and/or a visual tag visible on the person.

In still another embodiment, step 820 may have the controller authenticating that the detected person disposed external to the dispatched personal delivery device is the authorized participant to the dispatched logistics transaction based upon multiple different types of sensor data collected by different ones of the external sensors. For example, authenticating in such an embodiment of step 820 may have the controller authenticating that the detected person disposed external to the dispatched personal delivery device is the authorized participant to the dispatched logistics transaction based upon a captured image of the person as sensor data generated by the external camera when triggered by the sensor data generated by the proximity sensor. In another example, authenticating in such an embodiment of step 820 may have the controller authenticating that the detected person disposed external to the dispatched personal delivery device is the authorized participant to the dispatched logistics transaction based upon (a) capturing audio data as sensor data generated by the microphone and provided to the controller and (b) comparing the audio data to an audio reference related to the authorized participant to the dispatched logistics transaction. Such an audio reference may, for example, be reference data included in the logistics transaction information stored within memory of the personal delivery device. Such an audio reference may be provided by the dispatch server prior to detecting the person or, in some embodiments, may have the controller requesting the audio reference from the dispatch server upon detecting the person disposed external to the dispatched personal delivery device apparatus, and receiving the audio reference from the dispatch server in response to the request for the audio reference and prior to the authenticating actions taken in step 820.

At step 825, method 800 proceeds with an actuator on the dispatched personal delivery device providing access to the selectively opened storage area within the dispatched personal delivery device (per controls signals provided by the controller within the dispatched personal delivery device) to permit the dispatched logistics transaction (e.g., loading, unloading) by the detected person when the detected person has been authenticated to be the authorized participant to the dispatched logistics transaction. For example, once controller 120 authenticates that the detected person is the authorized grocery store employee that is identified and responsible to load the ordered grocery items into selectively opened storage area 130 of exemplary personal delivery device 110 based on one or more types of external sensor data, controller 120 activates actuator 225 to open door 135 and provide access to area 130 within mobile delivery frame 200.

At step 830, method 800 proceeds with monitoring of the selectively opened storage area using one or more internal sensors on the personal delivery device. In more detail, such monitoring may be conducted by the one or more internal sensors over a time period (e.g., from when access to within the personal delivery device is provided to when the personal delivery device is closed). In some embodiment, the authorized participant may provide user input to the personal delivery device indicating any loading or unloading is complete. In other embodiments, a triggering to close up the personal delivery device and no longer provide access to within the device may be accomplished in a touchless manner with the controller listening for a particular phase or audio pattern while the access to the personal delivery device is provided and initiating the door actuator to cease access once the phase or audio pattern has been identified.

At step 835, method 800 proceeds with the controller of the personal delivery device automatically confirming completion of the dispatched logistics transaction using one or more internal sensors that monitors the interior contents of the selectively opened storage area. In a further embodiment, step 835 may have the internal sensor being an internal camera (e.g., internal camera 255) that generates image data. In such an embodiment, the controller may implement step 835 with the controller on the dispatched personal delivery device identifying a change in the interior contents of the selectively opened storage area based upon the image data; and then confirming the completion of the dispatched logistics transaction based upon the change in the interior contents of the selectively opened storage area. Such a change may, for example, be identified as a reduction in what is currently stored as the interior contents of the selectively opened storage area, an increase in what is currently stored as the interior contents of the selectively opened storage area, or a change in number of how many objects are maintained as the interior contents of the selectively opened storage area.

In another embodiment of step 835, the internal sensor may be a LiDAR sensor (e.g., sensor 260) that generates mapping data representing the interior contents of the selectively opened storage area. In such an embodiment, the automatically confirming step 835 may have the controller on the dispatched personal delivery device identifying a change in the interior contents of the selectively opened storage area based upon the mapping data, and confirming the completion of the dispatched logistics transaction based upon the change in the interior contents of the selectively opened storage area. Again, such a change may, for example, be identified as a reduction in what is currently stored as the interior contents of the selectively opened storage area, an increase in what is currently stored as the interior contents of the selectively opened storage area, or a change in number of how many objects are maintained as the interior contents of the selectively opened storage area.

In yet another embodiment of step 835, the internal sensor may be an internal weight scale (e.g., scale 285) that monitors a weight of what is stored as the interior contents of the selectively opened storage area. In such an embodiment, the automatically confirming step 835 may have the controller on the dispatched personal delivery device identifying a change in weight of the interior contents of the selectively opened storage area based upon weight data generated by the internal weight scale, and confirming the completion of the dispatched logistics transaction based upon the change in weight of the interior contents of the selectively opened storage area. In more detail, such a change in weight may be over a predetermined period of time, such as for the period of time when the access has been automatically provided to within the dispatched personal delivery device for the dispatched logistics transaction.

After step 835, method 800 proceeds through transition A to step 840 on FIG. 8B. Referring now to FIG. 8B at step 840, method 800 proceeds with the controller on the dispatched personal delivery device transmitting (e.g., via wireless communication interface 210/205 and network 105) a content confirmation message to a dispatch server (e.g., server 100) based upon sensor data generated by the internal sensor monitoring the interior contents of the selectively opened storage area. Such a content confirmation message transmitted to the dispatch server provides the server with a rapid record, based on actual sensor data, of what was done relative to the contents stored within the personal delivery device as it relates to the particular dispatched logistics transaction.

In a more detailed embodiment, step 835 may have the content confirmation message being or at least include a corrective action message indicating that the interior contents of the selectively opened storage area are inconsistent with an anticipated transaction parameter for the dispatched logistics transaction. Such an anticipated transaction parameter may be part of the logistics transaction information stored within memory on the personal delivery device. More particularly, the anticipated transaction parameter may be an identification of the interior contents of the selectively opened storage area (e.g., what specific items are now maintained within area 130 within mobile delivery frame 200 of exemplary personal delivery device 110), a number (i.e., numeric value) of items making up the interior contents of the selectively opened storage area, and/or a weight related to the interior contents of the selectively opened storage area.

At step 845, method 800 proceeds with the controller on the dispatched personal delivery device receiving a corrective action message from the dispatch server in response to the content confirmation message sent to the dispatch server. For example, the content confirmation message may have indicated to dispatch server 100 that a particular grocery item was not loaded into area 130 of exemplary personal delivery device 110 when it was anticipated to be loaded for this particular dispatched logistics transaction related to a particular grocery order. The dispatch server 100, in this example, may send a correction action message as part of step 845 back to exemplary personal delivery device 110 that generally provides instructions to the exemplary personal delivery device 110 (e.g., what movement to take, what information to generate for notifying the authorized participant about a corrective action to take).

At step 850, method 800 proceeds with the controller on the dispatched personal delivery device causing a corrective change in movement of the dispatched personal delivery device as indicated by the corrective action message. In more detail, this may have the controller sending signals to an onboard propulsion system, such as propulsion system 125 (a system on the personal delivery device that controls movement and steering for the device). Such a corrective change in movement may, for example, change the speed of the dispatched personal delivery device and/or direction of the dispatched personal delivery device.

At step 855, method 800 has the controller more specifically implementing the corrective change per the corrective action message by having the controller on the dispatched personal delivery device generating a corrective notification for the detected person disposed external to the dispatched personal delivery device (e.g., the authorized participant 500). Such a corrective notification provides information related to the corrective action message (e.g., information about errant loading of the dispatched personal delivery device for the dispatched logistics transaction and a request to correct the errant loading of the dispatched personal delivery device; or information about errant unloading of the dispatched personal delivery device for the dispatched logistics transaction and a request to correct the errant unloading of the dispatched personal delivery device). An embodiment may have step 855 implement the corrective notification as, for example, an audible message provided through a speaker on the dispatched personal delivery device, a visual message provided through a user interface display on the dispatched personal delivery device, and/or a wireless communication message provided to the detected person disposed external to the dispatched personal delivery device (e.g., via messaging to mobile device 700 operated by the authorized participant).

In a further embodiment of method 800, authentication in step 820 may involve interactions with the dispatch server as opposed to being more of an autonomous process. For example, a further embodiment of method 800 may have step 820 implemented with the controller on the dispatched personal delivery device authenticating that the detected person disposed external to the dispatched personal delivery device is the authorized participant to the dispatched logistics transaction based upon (a) sensor data generated by the one or more of the external sensors and (b) an authentication response received from a dispatch server by the controller on the dispatched personal delivery device.

In more detail, a further embodiment of method 800 may implement step 820 with the controller on the dispatched personal delivery device receiving the sensor data generated by one or more of the external sensors; transmitting an authorization confirmation message to a dispatch server based upon the sensor data generated by the first of the external sensors; receiving an authentication response from the dispatch server; and authenticating that the detected person disposed external to the dispatched personal delivery device is the authorized participant to the dispatched logistics transaction based upon at least the authentication response received from the dispatch server.

In such an embodiment, the sensor data generated by the one or more external sensors may reflect an observed parameter related to the detected person disposed external to the dispatched personal delivery device. As such, the controller, in step 820, may operate so as to be transmitting an authorization confirmation message to a dispatch server based upon the sensor data reflecting the observed parameter related to the detected person disposed external to the dispatched personal delivery device; receiving an authentication response from the dispatch server reflecting whether the observed parameter related to the detected person indicates the detected person is the authorized participant to the dispatched logistics transaction; and authenticating that the detected person disposed external to the dispatched personal delivery device is the authorized participant to the dispatched logistics transaction based upon at least the authentication response received from the dispatch server. In this embodiment, such an observed parameter may, for example, be an image of the person disposed external to the dispatched personal delivery device (where the image is captured as the sensor data using an external camera as one of the external sensors); an image of an identifier (e.g., the identifier being one of or a combination of a uniform logo visible on the person, a symbol visible on clothing worn by the person, and a visual tag visible on the person) worn by the person disposed external to the dispatched personal delivery device (where the image of the identifier is captured as the sensor data using an external camera as one of the external sensors); an image of the person disposed external to the dispatched personal delivery device (where the image of the person is captured as the sensor data using an external camera as one of the external sensors triggered by a proximity sensor as a second external sensor); and audio data captured from the person disposed external to the dispatched personal delivery device (where the audio data is captured as the sensor data using a microphone as one of the external sensors when triggered by a proximity sensor as a second external sensor).

In still another embodiment of method 800, authentication in step 820 may have the controller on the dispatched personal delivery device authenticating that the detected person disposed external to the dispatched personal delivery device is the authorized participant to the dispatched logistics transaction based upon (a) sensor data generated by multiple ones of the external sensors and provided to the controller and (b) an authentication response received from a dispatch server by the controller on the dispatched personal delivery device. Such sensor data from multiple external sensors in this embodiment may, for example, include image data generated by an external camera as a first external sensor (where the image data reflects an observed parameter associated with the person disposed external to the dispatched personal delivery device); and location data generated by a proximity sensor as a second external sensor (where the location data reflects a location of the person disposed external to the dispatched personal delivery device relative to the dispatched personal delivery device). In such an embodiment, the image data may be generated by the external camera as triggered by the location data from the proximity sensor when the location data indicates the location of the person disposed external to the dispatched personal delivery device is within a threshold proximity distance from the dispatched personal delivery device.

Such sensor data from multiple external sensors in another embodiment may, for example, include audio data generated by a microphone as a first external sensor (where the audio data is captured including at least sound emanating from the person disposed external to the dispatched personal delivery device); and location data generated by a proximity sensor as a second external sensor (where the location data reflects a location of the person disposed external to the dispatched personal delivery device relative to the dispatched personal delivery device). In such an embodiment, the audio data may be generated by the microphone as triggered by the location data from the proximity sensor when the location data indicates the location of the person disposed external to the dispatched personal delivery device is within a threshold proximity distance from the dispatched personal delivery device.

Still further embodiments of method 800 may have authenticating that involves an authentication received from a dispatch server (as noted above), but where the authentication response received from the dispatch server is or includes a responsive action message causing a responsive change in operation of the dispatched personal delivery device as part of the authenticating step 820. For example, such a responsive change in operation may have the controller on the dispatched personal delivery device generating an authentication notification for the detected person disposed external to the dispatched personal delivery device, where the authentication notification provides information related to the responsive action message and may come in the form of an audible message provided through a speaker on the dispatched personal delivery device, a visual message provided through a user interface display on the dispatched personal delivery device, and/or a wireless communication message provided to the detected person disposed external to the dispatched personal delivery device.

Those skilled in the art will appreciate that such a method as disclosed and explained above in various examples may be implemented using exemplary personal delivery device 110 having controller 120 running one or more parts of programmatic code stored in memory 270 and executed by processor 265 to control operations of exemplary personal delivery device 110 as part of providing enhanced automated access to a dispatched personal delivery device operative to transport a shipment item within a selectively opened storage area within the dispatched personal delivery device as part of a dispatched logistics transaction involving the shipment item. Such code may be stored on a non-transitory computer-readable medium, such as memory storage 270 within controller 120 on device 110. Thus, when executing such code, the controller 120 (e.g., processor 265 implementing exemplary controller 120) may be operative to perform operations or steps from the exemplary methods disclosed above and variations of that method.

In summary, it should be emphasized that the sequence of operations to perform any of the exemplary methods and variations of such methods described in the embodiments above and herein are merely exemplary, and that a variety of sequences of operations may be followed while still being true and in accordance with the principles of the present invention as understood by one skilled in the art.

At least some portions of exemplary embodiments outlined above may be used in association with portions of other exemplary embodiments to improve and enhance how a dispatched personal delivery device (such as an autonomous transport vehicle, autonomous logistics bot, or the like) may be deployed to pickup, transport, and deliver items/objects being moved, delivered, transported, or otherwise shipped while deploying technical solutions that enhance how to access the device, authenticate who should access the device, confirm aspects of the logistics transaction related to the device, and initiate automatic responsive tasks related to such confirmation operations. Moreover, at least some of the exemplary embodiments disclosed herein may be used independently from one another and/or in combination with one another and may have applications to devices, components, systems, and methods not disclosed herein.

Further, those skilled in the art will appreciate that embodiments may provide one or more advantages, and not all embodiments described above necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention, as recited in the embodiments below, is intended to cover modifications and variations.

What is claimed is:

1. A method for providing enhanced automated access to a dispatched personal delivery device operative to transport a shipment item within a selectively opened storage area within the dispatched personal delivery device as part of a dispatched logistics transaction involving the shipment item, the method comprising the steps of:

detecting, using a first of a plurality of external sensors on the dispatched personal delivery device, a person disposed external to the dispatched personal delivery device, detecting that the person is carrying the shipment item, and identifying the shipping item being carried by the person;

in response to detecting the person, detecting the person is carrying the shipping item, and identifying the shipping item being carried by the person, authenticating, by a controller on the dispatched personal delivery device, that the detected person disposed external to the dispatched personal delivery device is an authorized participant to the dispatched logistics transaction based upon sensor data generated by the first of the external sensors and provided to the controller;

providing, by an actuator on the dispatched personal delivery device operatively coupled to the controller, access to the selectively opened storage area within the dispatched personal delivery device to permit the dispatched logistics transaction by the detected person when the detected person has been authenticated to be the authorized participant to the dispatched logistics transaction;

automatically confirming completion of the dispatched logistics transaction using a combination of multiple internal sensors that monitor the interior contents of the selectively opened storage area and using a combination of multiple types of sensor data produced by the multiple internal sensors, wherein the multiple internal sensors comprise an internal camera that generates image data, a LIDAR sensor that generates mapping data representing the interior contents of the selectively opened storage area, and an internal weight scale monitoring a weight of what is stored as the interior contents of the selectively opened storage area to generate weight data, and wherein the automatically confirming step further comprises identifying, by the controller on the dispatched personal delivery device, a change in the interior contents of the selectively opened storage area based upon a combination of the image data, the mapping data, and the weight data; and confirming, by the controller on the dispatched personal delivery device, the completion of the dispatched logistics transaction based upon the change in the interior contents of the selectively opened storage area; and initiating, automatically, movement of the dispatched personal delivery device, by the controller, when the controller confirms completion of the dispatched logistics transaction.

2. The method of claim 1, wherein the first of the external sensors comprises an external camera;

wherein the detecting step comprises detecting the person disposed external to the dispatched personal delivery device by capturing an image of the person disposed external to the dispatched personal delivery device as the sensor data using the external camera; and wherein the authenticating step comprises authenticating, by the controller on the dispatched personal delivery device, that the detected person disposed external to the dispatched personal delivery device is the authorized participant to the dispatched logistics transaction based upon the captured image of the person as the sensor data generated by the external camera and provided to the controller.

3. The method of claim 1, wherein the first of the external sensors comprises an external camera;

wherein the detecting step comprises detecting the person disposed external to the dispatched personal delivery device by capturing an image of an identifier worn by the person disposed external to the dispatched personal delivery device as the sensor data using the external camera; and wherein the authenticating step comprises authenticating, by the controller on the dispatched personal delivery device, that the detected person disposed external to the dispatched personal delivery device is the authorized participant to the dispatched logistics transaction based upon the captured image of the identifier worn by the person as the sensor data generated by the external camera and provided to the controller.

4. The method of claim 3, wherein the identifier worn by the person disposed external to the dispatched personal delivery device comprises a uniform logo visible on the person.

5. The method of claim 3, wherein the identifier worn by the person disposed external to the dispatched personal delivery device comprises a symbol visible on clothing worn by the person.

6. The method of claim 3, wherein the identifier worn by the person disposed external to the dispatched personal delivery device comprises a visual tag visible on the person.

7. The method of claim 1, wherein the first of the external sensors comprises a proximity sensor; and wherein the detecting step comprises detecting the person disposed external to the dispatched personal delivery device by detecting a location of the person relative to the dispatched personal delivery device as the sensor data using the proximity sensor.

8. The method of claim 7, wherein the proximity sensor comprises a LiDAR sensor.

9. The method of claim 7, wherein a second of the external sensors comprises an external camera; and wherein the authenticating step comprises authenticating, by the controller on the dispatched personal delivery device, that the detected person disposed external to the dispatched personal delivery device is the authorized participant to the dispatched logistics transaction based upon a captured image of the person as sensor data generated by the external camera when triggered by the sensor data generated by the proximity sensor.

10. The method of claim 1, wherein the first of the external sensors comprises a microphone and wherein a second of the external sensors comprises a proximity sensor;
   wherein the detecting step comprises detecting the person disposed external to the dispatched personal delivery device using sensor data generated by the proximity sensor, the sensor data indicating an object within a threshold distance from the dispatched personal delivery device; and
   wherein the authenticating step comprises authenticating, by the controller on the dispatched personal delivery device, that the detected person disposed external to the dispatched personal delivery device is the authorized participant to the dispatched logistics transaction based upon (a) capturing audio data as sensor data generated by the microphone and provided to the controller and (b) comparing the audio data to an audio reference related to the authorized participant to the dispatched logistics transaction.

11. The method of claim 10, further comprising the step of receiving the audio reference from the dispatch server prior to detecting the person disposed external to the dispatched personal delivery device.

12. The method of claim 10, further comprising the steps of:
   requesting the audio reference from the dispatch server upon detecting the person disposed external to the dispatched personal delivery device; and
   receiving the audio reference from the dispatch server in response to the request for the audio reference and prior to the authenticating step.

13. The method of claim 1, wherein the authenticating step comprises authenticating, by the controller on the dispatched personal delivery device, that the detected person disposed external to the dispatched personal delivery device is the authorized participant to the dispatched logistics transaction based upon a plurality of different types of sensor data collected by different ones of the external sensors.

14. The method of claim 1, wherein the detecting step comprises identifying, using the first of the external sensors, that the person disposed external to the dispatched personal delivery device is moving towards the dispatched personal delivery device.

15. The method of claim 1, wherein the detecting step comprises identifying, using the first of the external sensors, that the person disposed external to the dispatched personal delivery device has each hand occupied and is unable to physically interact with the dispatched personal delivery device with either hand.

16. The method of claim 1, wherein the dispatched logistics transaction comprises loading the shipment item into the selectively opened storage area within the dispatched personal delivery device.

17. The method of claim 1, wherein the dispatched logistics transaction comprises unloading the shipment item from the selectively opened storage area within the dispatched personal delivery device.

18. The method of claim 1, wherein the change in the interior contents comprises a reduction in what is currently stored as the interior contents of the selectively opened storage area.

19. The method of claim 1, wherein the change in the interior contents comprises an increase in what is currently stored as the interior contents of the selectively opened storage area.

20. The method of claim 1, wherein the change in the interior contents comprises a change in number of how many objects are maintained as the interior contents of the selectively opened storage area.

21. The method of claim 1, further comprising the step of transmitting, by the controller on the dispatched personal delivery device, a content confirmation message to a dispatch server based upon sensor data generated by the internal sensors monitoring the interior contents of the selectively opened storage area.

22. The method of claim 21, wherein the content confirmation message comprises a corrective action message indicating the interior contents of the selectively opened storage area is inconsistent with an anticipated transaction parameter for the dispatched logistics transaction.

23. The method of claim 22, wherein the anticipated transaction parameter comprises an identification of the interior contents of the selectively opened storage area.

24. The method of claim 22, wherein the anticipated transaction parameter comprises a number of items making up the interior contents of the selectively opened storage area.

25. The method of claim 22, wherein the anticipated transaction parameter comprises a weight related to the interior contents of the selectively opened storage area.

26. The method of claim 21, further comprising the steps of:
   receiving, by the controller on the dispatched personal delivery device, a corrective action message from the dispatch server in response to the content confirmation message sent to the dispatch server; and
   causing, by the controller on the dispatched personal delivery device, a corrective change in movement of the dispatched personal delivery device as indicated by the corrective action message.

27. The method of claim 26, wherein the corrective change further comprises generating, by the controller on the dispatched personal delivery device, a corrective notification for the detected person disposed external to the dispatched personal delivery device, the corrective notification providing information related to the corrective action message.

28. The method of claim 27, wherein the corrective notification comprises an audible message provided through a speaker on the dispatched personal delivery device.

29. The method of claim 27, wherein the corrective notification comprises a visual message provided through a user interface display on the dispatched personal delivery device.

30. The method of claim 27, wherein the corrective notification comprises a wireless communication message provided to the detected person disposed external to the dispatched personal delivery device.

31. The method of claim 27, wherein the information related to the corrective action message comprises information about errant loading of the dispatched personal delivery device for the dispatched logistics transaction and a request to correct the errant loading of the dispatched personal delivery device.

32. The method of claim 27, wherein the information related to the corrective action message comprises information about errant unloading of the dispatched personal delivery device for the dispatched logistics transaction and a request to correct the errant unloading of the dispatched personal delivery device.

33. The method of claim 1, wherein the authenticating step comprises authenticating, by the controller on the dispatched personal delivery device, that the detected person disposed external to the dispatched personal delivery device is the authorized participant to the dispatched logistics transaction based upon (a) sensor data generated by the first of the external sensors and provided to the controller and (b) an authentication response received from a dispatch server by the controller on the dispatched personal delivery device.

34. The method of claim 1, wherein authenticating step comprises:
receiving, by the controller on the dispatched personal delivery device, the sensor data generated by the first of the external sensors;
transmitting, by the controller on the dispatched personal delivery device, an authorization confirmation message to a dispatch server based upon the sensor data generated by the first of the external sensors;
receiving, by the controller on the dispatched personal delivery device, an authentication response from the dispatch server; and
authenticating, by the controller on the dispatched personal delivery device, that the detected person disposed external to the dispatched personal delivery device is the authorized participant to the dispatched logistics transaction based upon at least the authentication response received from the dispatch server.

35. The method of claim 1, wherein authenticating step comprises:
receiving, by the controller on the dispatched personal delivery device, the sensor data generated by the first of the external sensors, the sensor data reflecting an observed parameter related to the detected person disposed external to the dispatched personal delivery device;
transmitting, by the controller on the dispatched personal delivery device, an authorization confirmation message to a dispatch server based upon the sensor data reflecting the observed parameter related to the detected person disposed external to the dispatched personal delivery device;
receiving, by the controller on the dispatched personal delivery device, an authentication response from the dispatch server reflecting whether the observed parameter related to the detected person indicates the detected person is the authorized participant to the dispatched logistics transaction; and
authenticating, by the controller on the dispatched personal delivery device, that the detected person disposed external to the dispatched personal delivery device is the authorized participant to the dispatched logistics transaction based upon at least the authentication response received from the dispatch server.

36. The method of claim 35, wherein the observed parameter comprises an image of the person disposed external to the dispatched personal delivery device, the image being captured as the sensor data using an external camera as the first of the external sensors.

37. The method of claim 35, wherein the observed parameter comprises an image of an identifier worn by the person disposed external to the dispatched personal delivery device, the image of the identifier being captured as the sensor data using an external camera as the first of the external sensors.

38. The method of claim 37, wherein the identifier worn by the person disposed external to the dispatched personal delivery device comprises one from a group consisting of a uniform logo visible on the person, a symbol visible on clothing worn by the person, and a visual tag visible on the person.

39. The method of claim 37, wherein the identifier worn by the person disposed external to the dispatched personal delivery device comprises at least a combination of two from a group consisting of a uniform logo visible on the person, a symbol visible on clothing worn by the person, and a visual tag visible on the person.

40. The method of claim 35, wherein the observed parameter comprises an image of the person disposed external to the dispatched personal delivery device, the image of the person being captured as the sensor data using an external camera as the first of the external sensors when triggered by a proximity sensor as a second of the external sensors.

41. The method of claim 35, wherein the observed parameter comprises audio data captured from the person disposed external to the dispatched personal delivery device, the audio data being captured as the sensor data using a microphone as the first of the external sensors when triggered by a proximity sensor as a second of the external sensors.

42. The method of claim 1, wherein the authenticating step comprises authenticating, by the controller on the dispatched personal delivery device, that the detected person disposed external to the dispatched personal delivery device is the authorized participant to the dispatched logistics transaction based upon (a) sensor data generated by multiple ones of the external sensors and provided to the controller and (b) an authentication response received from a dispatch server by the controller on the dispatched personal delivery device.

43. The method of claim 42, wherein the sensor data generated by multiples ones of the external sensors comprises:
image data generated by an external camera as a first of the external sensors, the image data reflecting an observed parameter associated with the person disposed external to the dispatched personal delivery device; and
location data generated by a proximity sensor as a second of the external sensors, the location data reflecting a location of the person disposed external to the dispatched personal delivery device relative to the dispatched personal delivery device.

44. The method of claim 43, wherein the image data is generated by the external camera as triggered by the location data generated by the proximity sensor when the location data indicates the location of the person disposed external to the dispatched personal delivery device is within a threshold proximity distance from the dispatched personal delivery device.

45. The method of claim 42, wherein the sensor data generated by multiples ones of the external sensors comprises:
audio data generated by a microphone as a first of the external sensors, the audio data being captured including at least sound emanating from the person disposed external to the dispatched personal delivery device; and
location data generated by a proximity sensor as a second of the external sensors, the location data reflecting a location of the person disposed external to the dispatched personal delivery device relative to the dispatched personal delivery device.

46. The method of claim 45, wherein the audio data is generated by the microphone as triggered by the location data generated by the proximity sensor when the location data indicates the location of the person disposed external to the dispatched personal delivery device is within a threshold proximity distance from the dispatched personal delivery device.

47. The method of claim 33, wherein the authentication response received from the dispatch server comprises a responsive action message causing a responsive change in operation of the dispatched personal delivery device as part of the authenticating step.

48. The method of claim 47, wherein the responsive change further comprises generating, by the controller on the dispatched personal delivery device, an authentication notification for the detected person disposed external to the dispatched personal delivery device, the authentication notification providing information related to the responsive action message.

49. The method of claim 48, wherein the authentication notification comprises an audible message provided through a speaker on the dispatched personal delivery device.

50. The method of claim 48, wherein the authentication notification comprises a visual message provided through a user interface display on the dispatched personal delivery device.

51. The method of claim 48, wherein the authentication notification comprises a wireless communication message provided to the detected person disposed external to the dispatched personal delivery device.

52. A personal delivery device apparatus using enhanced automated access as part of a dispatched logistics transaction initiated by a dispatch server, the dispatched logistics transaction involving a shipment item and a person disposed external to the personal delivery device apparatus, the personal delivery device apparatus comprising:
   a mobile delivery frame, the person disposed external to the personal delivery device apparatus being disposed external to the mobile delivery frame;
   a selectively opened storage area disposed within the mobile delivery frame, the selectively opened storage area being operative to maintain and transport the shipment item;
   an actuated door disposed on the mobile delivery frame, the actuated door providing actuated access to the selectively opened storage area;
   an actuator coupled to the actuated door, the actuator being responsive to a door actuation signal to articulate the actuated door between a closed position sealing the selectively opened storage area and an open position providing access to the selectively opened storage area;
   a propulsion system disposed on the mobile delivery frame for moving the mobile delivery frame in response to a motion control signal;
   a controller disposed within the mobile delivery frame, the controller being coupled to the actuator and operative to generate the door actuation signal to cause the actuator to articulate the actuated door, the controller being further coupled to the propulsion system and operative to generate the motion control signal;
   a wireless communication interface coupled to the controller, the wireless communication interface being operative to communicate with the dispatch server;
   a plurality of external sensors disposed on the mobile delivery frame, the external sensors monitoring an external environment relative to the mobile delivery frame, wherein each of the external sensors being coupled to the controller;
   a plurality of internal sensors coupled to the controller;
   wherein the controller being further operative to
      detect, using a first of the external sensors, the person disposed external to the mobile delivery frame, detect that the person is carrying the shipment item, and identifying the shipment item being carried;
      in response to detecting the person, detect the person is carrying the shipment item, and identify the shipment item being carried, authenticate that the detected person disposed external to the mobile delivery frame is an authorized participant to the dispatched logistics transaction based upon sensor data generated by the first of the external sensors and provided to the controller;
      activate the actuator to articulate the actuated door to provide actuated access to the selectively opened storage area within the mobile delivery frame to permit the dispatched logistics transaction by the detected person when the detected person has been authenticated to be the authorized participant to the dispatched logistics transaction;
      automatically confirm completion of the dispatched logistics transaction using a combination of the multiple internal sensors that monitor the interior contents of the selectively opened storage area and using a combination of multiple types of sensor data produced by the multiple internal sensors, wherein the multiple internal sensors comprises an internal camera that generates image data of what is stored within the interior of the selectively opened storage area as the internal sensor data, a LIDAR sensor that generates mapping data representing the interior contents of the selectively opened storage area, and an internal weight scale monitoring a weight of what is stored as the interior contents of the selectively opened storage area to generate weight data, and wherein the controller being operative to automatically confirm completion of the dispatched logistics transaction by being further operative to:
         identify a change in what is within the interior of the selectively opened storage area based upon a combination of the image data, the mapping data, and the weight data; and
         confirm the completion of the dispatched logistics transaction based upon the identified change in what is within the interior of the selectively opened storage area; and
      initiate, automatically, movement of the dispatched personal delivery device, by the controller, when the controller confirms completion of the dispatched logistics transaction.

53. The apparatus of claim 52, wherein the first of the external sensors comprises an external camera;
   wherein the controller is operative to detect the person disposed external to the mobile delivery frame by capturing an image of the person disposed external to the mobile delivery frame as the sensor data using the external camera; and
   wherein the controller is operative to authenticate that the detected person disposed external to the mobile delivery frame is the authorized participant to the dispatched logistics transaction based upon the captured image of the person as the sensor data generated by the external camera and provided to the controller.

54. The apparatus of claim 52, wherein the first of the external sensors comprises an external camera;
  wherein the controller is operative to detect the person disposed external to the mobile delivery frame by being operative to capture an image of an identifier worn by the person disposed external to the mobile delivery frame as the sensor data using the external camera; and
  wherein the controller is operative to authenticate that the detected person disposed external to the mobile delivery frame is the authorized participant to the dispatched logistics transaction based upon the captured image of the identifier worn by the person disposed external to the mobile delivery frame as the sensor data generated by the external camera and provided to the controller.

55. The apparatus of claim 54, wherein the identifier worn by the person disposed external to the mobile delivery frame comprises a uniform logo visible on the person.

56. The apparatus of claim 54, wherein the identifier worn by the person disposed external to the mobile delivery frame comprises a symbol visible on clothing worn by the person.

57. The apparatus of claim 54, wherein the identifier worn by the person disposed external to the mobile delivery frame comprises a visual tag visible on the person.

58. The apparatus of claim 52, wherein the first of the external sensors comprises a proximity sensor; and
  wherein the controller is operative to detect the person disposed external to the mobile delivery frame by being operative to detect a location of the person relative to the mobile delivery frame as the sensor data using the proximity sensor.

59. The apparatus of claim 58, wherein the proximity sensor comprises a LiDAR sensor.

60. The apparatus of claim 58, wherein a second of the external sensors comprises an external camera; and
  wherein the controller is operative to authenticate that the detected person disposed external to the mobile delivery frame is the authorized participant to the dispatched logistics transaction based upon a captured image of the person as sensor data generated by the external camera when triggered by the sensor data generated by the proximity sensor.

61. The apparatus of claim 52, wherein the first of the external sensors comprises a microphone and wherein a second of the external sensors comprises a proximity sensor;
  wherein the controller is operative to detect the person disposed external to the mobile delivery frame using sensor data generated by the proximity sensor, the sensor data indicating an object within a threshold distance from the mobile delivery frame; and
  wherein the controller is operative to authenticate that the detected person disposed external to the mobile delivery frame is the authorized participant to the dispatched logistics transaction based upon:
    (a) captured audio data as sensor data generated by the microphone and provided to the controller, and
    (b) a comparison by the controller of the audio data to an audio reference related to the authorized participant to the dispatched logistics transaction.

62. The apparatus of claim 61, wherein the controller being further operative to receive the audio reference from the dispatch server using the wireless communication interface prior to detecting the person disposed external to the mobile delivery frame.

63. The apparatus of claim 61, wherein the controller being further operative to
  request the audio reference from the dispatch server using the wireless communication interface upon detecting the person disposed external to the mobile delivery frame; and
  receive the audio reference from the dispatch server using the wireless communication interface in response to the request for the audio reference.

64. The apparatus of claim 52, wherein the controller being further operative to authenticate that the detected person disposed external to the mobile delivery frame is the authorized participant to the dispatched logistics transaction based upon a plurality of different types of sensor data collected by different ones of the external sensors.

65. The apparatus of claim 52, wherein the controller being operative to detect the person disposed external to the mobile delivery frame by being further operative to identify that the person disposed external to the mobile delivery frame is moving towards the mobile delivery frame using the first of the external sensors.

66. The apparatus of claim 52, wherein the controller being operative to detect the person disposed external to the mobile delivery frame by being further operative to identify, using sensor data from the first of the external sensors, that the person disposed external to the mobile delivery frame has each hand occupied and is unable to physically interact with the dispatched personal delivery device apparatus with either hand.

67. The apparatus of claim 52, wherein the dispatched logistics transaction comprises loading the shipment item into the selectively opened storage area within the mobile delivery frame.

68. The apparatus of claim 52, wherein the dispatched logistics transaction comprises unloading the shipment item from the selectively opened storage area within the mobile delivery frame.

69. The apparatus of claim 52, wherein the change comprises a reduction in what is currently stored within the interior of the selectively opened storage area.

70. The apparatus of claim 52, wherein the change comprises an increase in what is currently stored within the interior of the selectively opened storage area.

71. The apparatus of claim 52, wherein the change comprises a numerical change of how many objects are currently stored within the interior of the selectively opened storage area.

72. The apparatus of claim 52, wherein the controller is further operative to cause the wireless communication interface to transmit a content confirmation message to the dispatch server based upon sensor data generated by the internal sensor monitoring what is stored within the interior of the selectively opened storage area.

73. The apparatus of claim 72, wherein the content confirmation message comprises a corrective action message indicating what is stored within the interior of the selectively opened storage area is inconsistent with an anticipated transaction parameter for the dispatched logistics transaction.

74. The apparatus of claim 73, wherein the anticipated transaction parameter comprises an identification of what is stored within the interior of the selectively opened storage area.

75. The apparatus of claim 73, wherein the anticipated transaction parameter comprises a numerical value of items making up what is stored within the interior of the selectively opened storage area.

76. The apparatus of claim 73, wherein the anticipated transaction parameter comprises a weight related to what is stored within the interior of the selectively opened storage area.

77. The apparatus of claim 72, wherein the controller is further operative to:
receive, via the wireless communication interface, a corrective action message from the dispatch server in response to the content confirmation message sent to the dispatch server; and
cause a corrective change in movement of the mobile delivery frame as indicated by the corrective action message.

78. The apparatus of claim 77, wherein the propulsion system disposed on the mobile delivery frame is operative to accept the motion control signal from the controller that directs the propulsion system to move in a desired manner;
wherein the controller is operative to cause the corrective change in movement of the mobile delivery frame by being operative to generate a corrective movement control input signal for the propulsion system as the motion control signal; and
wherein the propulsion system, upon receipt of the corrective movement control input signal, alters movement of the mobile delivery frame.

79. The apparatus of claim 77, wherein the controller is further operative to generate a corrective notification for the detected person disposed external to the mobile delivery frame, the corrective notification providing information related to the corrective action message.

80. The apparatus of claim 79, further comprising a speaker coupled to the controller and disposed on an exterior of the mobile delivery frame, the speaker being mounted relative to the exterior of the mobile delivery frame to generate sound outside the mobile delivery frame; and
wherein the corrective notification comprises an audible message provided through the speaker on the mobile delivery frame.

81. The apparatus of claim 79, further comprising a user interface display coupled to the controller and disposed on an exterior of the mobile delivery frame; and
wherein the corrective notification comprises a visual message provided through the user interface display on the mobile delivery frame.

82. The apparatus of claim 79, wherein the corrective notification comprises a wireless communication message provided by the wireless communication interface to a mobile user device operated by the detected person disposed external to the mobile delivery frame.

83. The apparatus of claim 79, wherein the information related to the corrective action message comprises information about errant loading of the selectively opened storage area within the mobile delivery frame for the dispatched logistics transaction and a request to correct the errant loading.

84. The apparatus of claim 79, wherein the information related to the corrective action message comprises information about errant unloading of the selectively opened storage area within the mobile delivery frame for the dispatched logistics transaction and a request to correct the errant unloading.

85. The apparatus of claim 52, wherein the controller is operative to authenticate that the detected person disposed external to the mobile delivery frame is the authorized participant to the dispatched logistics transaction based upon:
(a) sensor data generated by the first of the external sensors and provided to the controller, and
(b) an authentication response received from the dispatch server by the controller through the wireless communication interface.

86. The apparatus of claim 52, wherein the controller is operative to authenticate that the detected person disposed external to the mobile delivery frame is the authorized participant to the dispatched logistics transaction by being further operative to:
receive the sensor data generated by the first of the external sensors;
cause the wireless communication interface to transmit an authorization confirmation message to the dispatch server based upon the sensor data generated by the first of the external sensors;
receive an authentication response from the dispatch server through the wireless communication interface; and
authenticate that the detected person disposed external to the mobile delivery frame is the authorized participant to the dispatched logistics transaction based upon at least the authentication response received from the dispatch server.

87. The apparatus of claim 52, wherein the controller is operative to authenticate that the detected person disposed external to the mobile delivery frame is the authorized participant to the dispatched logistics transaction by being further operative to:
receive the sensor data generated by the first of the external sensors, the sensor data reflecting an observed parameter related to the detected person disposed external to the mobile delivery frame;
cause the wireless communication interface to transmit an authorization confirmation message to the dispatch server based upon the sensor data reflecting the observed parameter related to the detected person disposed external to the mobile delivery frame;
receive an authentication response from the dispatch server through the wireless communication interface, the authentication response reflecting whether the observed parameter related to the detected person indicates the detected person is the authorized participant to the dispatched logistics transaction; and
authenticate that the detected person disposed external to the mobile delivery frame is the authorized participant to the dispatched logistics transaction based upon at least the authentication response received from the dispatch server.

88. The apparatus of claim 87, wherein the observed parameter comprises an image of the person disposed external to the mobile delivery frame, the image being captured as the sensor data using an external camera as the first of the external sensors.

89. The apparatus of claim 87, wherein the observed parameter comprises an image of an identifier worn by the person disposed external to the mobile delivery frame, the image of the identifier being captured as the sensor data using an external camera as the first of the external sensors.

90. The apparatus of claim 89, wherein the identifier worn by the person disposed external to the dispatched personal delivery device comprises at least one from a group consisting of a uniform logo visible on the person, a symbol visible on clothing worn by the person, and a visual tag visible on the person.

91. The apparatus of claim 89, wherein the identifier worn by the person disposed external to the dispatched personal delivery device comprises at least a combination of two from a group consisting of a uniform logo visible on the person, a symbol visible on clothing worn by the person, and a visual tag visible on the person.

92. The apparatus of claim 87, wherein the observed parameter comprises an image of the person disposed external to the mobile delivery frame, the image of the person being captured as the sensor data using an external camera as the first of the external sensors when triggered by a proximity sensor as a second of the external sensors.

93. The apparatus of claim 87, wherein the observed parameter comprises audio data captured from the person disposed external to the mobile delivery frame, the audio data being captured as the sensor data using a microphone as the first of the external sensors when triggered by a proximity sensor as a second of the external sensors.

94. The apparatus of claim 52, wherein the controller is operative to authenticate that the detected person disposed external to the mobile delivery frame is the authorized participant to the dispatched logistics transaction based upon:
   (a) sensor data generated by multiple ones of the external sensors and provided to the controller, and
   (b) an authentication response received from a dispatch server by the controller on the dispatched personal delivery device.

95. The apparatus of claim 94, wherein the sensor data generated by multiples ones of the external sensors comprises:
   image data generated by an external camera as a first of the external sensors, the image data reflecting an observed parameter associated with the person disposed external to the mobile delivery frame; and
   location data generated by a proximity sensor as a second of the external sensors, the location data reflecting a location of the person disposed external to the dispatched personal delivery device relative to the dispatched personal delivery device.

96. The apparatus of claim 95, wherein the image data is generated by the external camera as triggered by the location data generated by the proximity sensor when the location data indicates the location of the person disposed external to the mobile delivery frame is within a threshold proximity distance from the mobile delivery frame.

97. The apparatus of claim 94, wherein the sensor data generated by multiples ones of the external sensors comprises:
   audio data generated by a microphone as a first of the external sensors, the audio data being captured including at least sound emanating from the person disposed external to the mobile delivery frame; and
   location data generated by a proximity sensor as a second of the external sensors, the location data reflecting a location of the person disposed external to the mobile delivery frame relative to the mobile delivery frame.

98. The apparatus of claim 97, wherein the audio data is generated by the microphone as triggered by the location data generated by the proximity sensor when the location data indicates the location of the person disposed external to the mobile delivery frame is within a threshold proximity distance from the mobile delivery frame.

99. The apparatus of claim 85, wherein the authentication response received from the dispatch server comprises a responsive action message causing the controller to initiate a responsive change in operation of the dispatched personal delivery device apparatus as part of authenticating the person disposed external to the mobile delivery frame.

100. The apparatus of claim 99, wherein the responsive change in operation of the dispatched personal delivery device apparatus has the controller being operative to generate an authentication notification for the detected person disposed external to the mobile delivery frame, the authentication notification providing information related to the responsive action message.

101. The apparatus of claim 100, further comprising a speaker coupled to the controller and disposed on an exterior of the mobile delivery frame, the speaker being mounted relative to the exterior of the mobile delivery frame to generate sound outside the mobile delivery frame; and
   wherein the authentication notification generated by the controller comprises an audible message provided through the speaker on the mobile delivery frame.

102. The apparatus of claim 100, further comprising a user interface display coupled to the controller and disposed on an exterior of the mobile delivery frame; and
   wherein the authentication notification generated by the controller comprises a visual message provided through on the user interface display on the mobile delivery frame.

103. The apparatus of claim 100, wherein the authentication notification generated by the controller comprises a wireless communication message transmitted, using the wireless communication interface, to a mobile user device operated by the detected person disposed external to the mobile delivery frame.

104. An enhanced dispatching system for a dispatched logistics transaction related to a shipment item, the dispatch system comprising:
   a dispatch server operative to generate logistics transaction information related to the dispatched logistics transaction; and
   a mobile personal delivery device assigned by the dispatch server to facilitate the dispatched logistics transaction, the mobile personal delivery device comprising
   a mobile delivery frame;
   a selectively opened storage area disposed within the mobile delivery frame, the selectively opened storage area being operative to maintain and transport the shipment item;
   an actuated door disposed on the mobile delivery frame, the actuated door providing actuated access to the selectively opened storage area;
   an actuator coupled to the actuated door, the actuator being responsive to a door actuation signal to articulate the actuated door between a closed position sealing the selectively opened storage area and an open position providing access to the selectively opened storage area;
   a controller disposed within the mobile delivery frame, the controller being coupled to the actuator and operative to generate the door actuation signal to cause the actuator to articulate the actuated door;
   a wireless communication interface coupled to the controller, the wireless communication interface being operative to communicate with the dispatch server;
   at least one external sensor disposed on the mobile delivery frame, the external sensor being coupled to the controller and disposed in an orientation on the mobile delivery frame to monitor an external environment relative to the mobile delivery frame; and
   multiple internal sensors disposed within the mobile delivery frame, the multiple internal sensors being coupled to the controller and disposed in an orientation within the mobile delivery frame to monitor an interior of the selectively opened storage area; and wherein the controller of the mobile personal delivery device being further operative to detect, using the external sensor, a person disposed external to the mobile delivery frame, detecting that the person is carrying the shipment item, and identify the shipment item being carried, in response to detecting the person, detecting the person is carrying the shipment item, and identifying the shipment item being carried, authenticate that the detected person disposed external to the mobile delivery frame is an authorized participant to the dispatched logistics transaction based upon sensor data generated by the external sensor and provided to the controller, activate the actuator to articulate the actuated door to provide actuated access to the selectively opened storage area within the mobile delivery frame to permit the dispatched logistics transaction by the detected person when the detected person has been authenticated to be the authorized participant to the dispatched logistics transaction, determine an auto-confirm status of the dispatched logistics transaction using a combination of multiple types of internal sensor data generated by the multiple internal sensors that monitor the interior of the selectively opened storage area, the auto-confirm status reflecting whether the dispatched logistics transaction is complete, wherein the multiple internal sensors comprise an internal camera that generates image data of what is stored within the interior of the selectively opened storage area as the internal sensor data, a LiDAR sensor that generates mapping data representing the interior contents of the selectively opened storage area, and an internal weight scale monitoring a weight of what is stored as the interior contents of the selectively opened storage area to generate weight data; and wherein the controller being operative to automatically confirm completion of the dispatched logistics transaction by being further operative to:

identify a change in what is within the interior of the selectively opened storage area based upon a combination of the image data, the mapping data, and the weight data; and confirm the completion of the dispatched logistics transaction based upon the identified change in what is within the interior of the selectively opened storage area;

cause the wireless communication interface to transmit a content confirmation message to the dispatch server based upon the internal sensor data generated by the internal sensor and the auto-confirm status of the dispatched logistics transaction; and initiating, automatically, movement of the dispatched personal delivery device, by the controller, when the controller confirms completion of the dispatched logistics transaction wherein the dispatch server being operative to receive the content confirmation message sent to the dispatch server, and generate a corrective action message to the mobile personal delivery device in response to the content confirmation message; and wherein the controller on the mobile personal delivery device is further operative to receive, via the wireless communication interface, the corrective action message from the dispatch server; and cause a corrective change in operation of the mobile personal delivery device as indicated by the corrective action message.

105. The system of claim 104, wherein the controller on the mobile personal delivery device is operative to cause the corrective change in operation of the mobile personal delivery device by being further operative to cause a corrective change in movement of the mobile delivery frame as indicated by the corrective action message.

106. The system of claim 104, wherein the controller on the mobile personal delivery device is operative to cause the corrective change in operation of the mobile personal delivery device by being further operative to generate a corrective notification for the detected person disposed external to the mobile delivery frame, the corrective notification providing information related to the corrective action message.

107. The system of claim 106, wherein the mobile personal delivery device further comprises:

a speaker coupled to the controller and disposed on an exterior of the mobile delivery frame, the speaker being operative to generate sound outside the mobile delivery frame; and a user interface display coupled to the controller and disposed on an exterior of the mobile delivery frame; and wherein the corrective notification comprises a combination of at least two of an audible message provided through the speaker on the mobile delivery frame, a visual message provided through the user interface display, and a wireless communication message provided by the wireless communication interface to a mobile user device operated by the detected person disposed external to the mobile delivery frame.

108. The system of claim 106, wherein the information related to the corrective action message comprises information about an errant interaction with the selectively opened storage area within the mobile delivery frame as part of the dispatched logistics transaction and a request to correct the errant interaction.

* * * * *